US011204597B2

(12) United States Patent
Small et al.

(10) Patent No.: US 11,204,597 B2
(45) Date of Patent: *Dec. 21, 2021

(54) OUTER SPACE DIGITAL LOGISTICS SYSTEM

(71) Applicant: Moog Inc., East Aurora, NY (US)

(72) Inventors: George L. Small, Williamsville, NY (US); James F. van Oss, Buffalo, NY (US); James A. Regenor, Orchard Park, NY (US); Paul K. Guerrier, Orchard Park, NY (US); George Baggs, Hamburg, NY (US); Jason C. Jones, East Aurora, NY (US)

(73) Assignee: Moog Inc., East Aurora, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 15/848,926

(22) Filed: Dec. 20, 2017

(65) Prior Publication Data

US 2018/0136633 A1     May 17, 2018

Related U.S. Application Data

(63) Continuation-in-part of application No. 15/600,576, filed on May 19, 2017.

(Continued)

(51) Int. Cl.
*G06Q 20/40* (2012.01)
*G06Q 30/02* (2012.01)
(Continued)

(52) U.S. Cl.
CPC .......... *G05B 19/4099* (2013.01); *B33Y 50/02* (2014.12); *G06Q 20/065* (2013.01);
(Continued)

(58) Field of Classification Search
CPC ......... G05B 19/00–46; G05B 2219/00–50401; B33Y 50/00–02; G06Q 20/00–425; G06Q 2220/00–18
See application file for complete search history.

(56) References Cited

U.S. PATENT DOCUMENTS 5,768,384 A     6/1998  Berson
7,343,209 B2 *  3/2008  Anelle ................... G06F 30/15
                                                            700/87
(Continued)

FOREIGN PATENT DOCUMENTS

CN     104484584 A     4/2015
CN     104608382 A     5/2015
(Continued)

OTHER PUBLICATIONS

Herzberg, Benjamin: "Now, in the hyper-connected and ever evolving world, transparency is the new power." https://www.provenance.org/whitepaper © 2016 Project Provenance Ltd (17 pages).
(Continued)

*Primary Examiner* — John W Hayes
*Assistant Examiner* — Chenyuh Kuo
(74) *Attorney, Agent, or Firm* — Rowland Richards, Esq.; Timothy W. Menasco, Esq.; Harter Secrest & Emery LLP

(57) ABSTRACT

A method for verifying and authenticating additive manufactured products utilizing extraterrestrial communication including generating a product geometry file, recording to a distributed transaction register stored on a server network having a plurality of node servers a first transaction reflecting the product geometry file, the first transaction having a first output associated with the first transaction and including a blockchain address, transmitting the first output between a terrestrial transceiver that is communicatively connected to the server network and an extraterrestrial transceiver that is communicatively connected to the terrestrial transceiver,
(Continued)

and printing, with a 3D additive printer, a product that utilizes the product geometry file.

9 Claims, 38 Drawing Sheets

Related U.S. Application Data

(60) Provisional application No. 62/339,636, filed on May 20, 2016, provisional application No. 62/366,994, filed on Jul. 26, 2016, provisional application No. 62/470,428, filed on Mar. 13, 2017.

(51) Int. Cl.
| | |
|---|---|
| G06Q 20/32 | (2012.01) |
| G06Q 20/34 | (2012.01) |
| G06Q 20/38 | (2012.01) |
| G05B 19/4099 | (2006.01) |
| G06Q 20/06 | (2012.01) |
| B33Y 50/02 | (2015.01) |

(52) U.S. Cl.
CPC ............ *G06Q 20/4014* (2013.01); *G05B 2219/49007* (2013.01); *G06Q 2220/00* (2013.01)

(56) References Cited

U.S. PATENT DOCUMENTS

| | | | | |
|---|---|---|---|---|
| 7,418,236 | B2* | 8/2008 | Levin | H04B 7/18508 |
| | | | | 455/12.1 |
| 8,882,048 | B2 | 11/2014 | Levin et al. | |
| 9,306,750 | B2 | 4/2016 | Syngkon et al. | |
| 9,656,426 | B2 | 5/2017 | Snyder et al. | |
| 2005/0234823 | A1 | 10/2005 | Schimpf | |
| 2013/0026241 | A1* | 1/2013 | Sakahashi | G06K 19/06037 |
| | | | | 235/494 |
| 2014/0279177 | A1 | 9/2014 | Stump | |
| 2015/0108687 | A1 | 4/2015 | Snyder et al. | |
| 2015/0144284 | A1 | 5/2015 | Snyder et al. | |
| 2015/0154575 | A1 | 6/2015 | Krieger | |
| 2015/0170242 | A1 | 6/2015 | Bjorndahl | |
| 2015/0253761 | A1 | 9/2015 | Nelson et al. | |
| 2015/0309502 | A1* | 10/2015 | Breitgand | G06Q 30/0185 |
| | | | | 700/98 |
| 2015/0379510 | A1 | 12/2015 | Smith | |
| 2016/0082652 | A1 | 3/2016 | Snyder et al. | |
| 2016/0098723 | A1* | 4/2016 | Feeney | G06Q 20/065 |
| | | | | 705/75 |
| 2016/0098730 | A1 | 4/2016 | Feeney | |
| 2016/0164884 | A1* | 6/2016 | Sriram | G06Q 50/28 |
| | | | | 705/51 |
| 2016/0171354 | A1 | 6/2016 | Glasgow et al. | |
| 2016/0180061 | A1 | 6/2016 | Pogorelik et al. | |
| 2016/0185471 | A1 | 6/2016 | Blincow | |
| 2016/0221265 | A1 | 8/2016 | Snyder et al. | |
| 2016/0243759 | A1 | 8/2016 | Snyder et al. | |
| 2017/0232300 | A1 | 8/2017 | Tran et al. | |
| 2017/0255171 | A1 | 9/2017 | Avula et al. | |
| 2017/0279783 | A1* | 9/2017 | Milazzo | B29C 64/00 |

FOREIGN PATENT DOCUMENTS

| | | |
|---|---|---|
| CN | 105014975 A | 11/2015 |
| CN | 105034376 A | 11/2015 |
| CN | 105172134 A | 12/2015 |
| CN | 204977467 U | 1/2016 |
| CN | 105415532 A | 3/2016 |
| CN | 105479741 A | 4/2016 |
| CN | 205601182 U | 9/2016 |
| CN | 106541142 A | 3/2017 |
| CN | 105014975 B | 6/2017 |
| WO | 2015024129 A1 | 2/2015 |

OTHER PUBLICATIONS

Nash, Kim S.: "IBM Pushes Blockchain into the Supply Chain" The Wall Street Journal article, Jul. 14, 2016 (3 Pages).

Trouton, Stuart et al.: "3D opportunity for blockchain—Additive manufacturing links the digital thread". Deloitte Insights, Nov. 17, 2016 (20 pages).

Kerikmae, Tanel et al.: "Theorising on Digital Legal (Outer)Space". The Future of Law and eTechnologies. 2016 (239 pages).

Kennedy, Andrew.: "Overlords, vassals, serfs? How Space Colonies, the Future of the Space Economy and Feudalism are connected". Chronolith Foundation, calle Goles 48, bajo, Seville 41002, Spain (58 pages).

Cahan, Bruce et al.: "Outer Frontiers of Banking—Financing Space Explorers and Safeguarding Terrestrial Finance". International Astronautical Congress, 2015 (16 pages).

Selva, Daniel et al.: "Distributed Earth Satellite Systems: What Is Needed to Move Forward?" Journal of Aerospace Information Systems, vol. 14, No. 8, Aug. 2017 (27 pages).

Boroujerdi, Robert and Wolf, Christopher "Themes, Dreams and Flying Machines" The Goldman Sachs Group, Inc. Dec. 2, 2015 (25 pages).

Kuznetsova, Elizaveta: "Transformation of Logistics and Supply Chain Management in Context of Developing Additive Manufacturing" Master's Thesis, St. Petersburg University, 2016 (82 pages).

Adler, Richard: "Navigating Continual Disruption" A Report on the 2014 Aspen Institute Roundtable on Institutional Innovation, 2015 (74 pages).

Copyright Protection in Additive Manufacturing with Blockchain Approach (Holland) Web. https://www.researchgate.netpublication/318277458_Copyright_Protection_in_Additive_Manufacturing_with_Blockchain_Approach (5 pages).

International Search Report and Written Opinion of the International Searching Authority dated Jul. 19, 2017 (17 pages).

European Patent Office, Decision to Refuse mailed in corresponding European Patent Application No. 17730290.8, dated Oct. 6, 2021.

* cited by examiner

CUSTOMER REQUIREMENTS PROCESS STATE - I/O DATABASE

| PROCESS STATE | INPUT/OUTPUT | DESCRIPTION |
|---|---|---|
| 1 | DESCRIPTION | CUSTOMER ORDER   50 |
| 1 | INPUT | NONE |
| 1 | OUTPUT | CUSTOMER REQUIREMENTS DOCUMENT   102 |
| 1 | OUTPUT | CUSTOMER IP ARTIFACT(S)   105 |
| 1 | OUTPUT | DESIGN AUTHORITY ARTIFACT(S)   106 |
| 1 | OUTPUT | OTHER IP ARTIFACT(S)   107 |

FIG. 8

DESIGN IMPLEMENTATION REQUIREMENTS PROCESS STATE - I/O DATABASE

| PROCESS STATE | INPUT/OUTPUT | DESCRIPTION |
|---|---|---|
| 2 | DESCRIPTION | DESIGN IMPLEMENTATION REQUIREMENTS   51 |
| 2 | INPUT | CUSTOMER REQUIREMENTS DOCUMENT   102 |
| 2 | INPUT | CUSTOMER IP ARTIFACT(S)   105 |
| 2 | INPUT | DESIGN AUTHORITY ARTIFACT(S)   106 |
| 2 | INPUT | OTHER IP ARTIFACT(S)   107 |
| 2 | OUTPUT | SOLID MODEL(PRT FILE) - GEOMETRY DEFINITION   108 |
| 2 | OUTPUT | PRODUCT MANUFACTURING INFORMATION   109 |
| 2 | OUTPUT | MATERIAL REQUIREMENT (COMPOSITION)   110 |
| 2 | OUTPUT | QUALITY REQUIREMENT   111 |
| 2 | OUTPUT | MANUFACTURING PROCESS REQUIREMENTS (WHAT MACHINE MODEL)   112 |
| 2 | OUTPUT | PART SERIAL NUMBER   113 |
| 2 | OUTPUT | MATERIAL REQUIREMENT (COMPOSITION)   115 |
| 2 | OUTPUT | PART NUMBER   114 |

FIG. 9

MANUFACTURING PRE-PROCESSING PROCESS STATE - I/O DATABASE

| PROCESS STATE | INPUT/OUTPUT | DESCRIPTION |
|---|---|---|
| 3 | DESCRIPTION | MANUFACTURING PRE-PROCESSING (AKA CAD GEOMETRY FILE) 52 |
| 3 | INPUT | SOLID MODEL (PRT FILE) - GEOMETRY DEFINITION 108 |
| 3 | INPUT | PRODUCT MANUFACTURING INFORMATION 109 |
| 3 | OUTPUT | STL FILE, AMF FILE, EQUIVALENT OTHER 125 |

FIG. 13

POWDER PROCUREMENT AND STOCKING PROCESS STATE - I/O DATABASE

| PROCESS STATE | INPUT/OUTPUT | DESCRIPTION |
|---|---|---|
| 4 | DESCRIPTION | POWDER PROCUREMENT AND STOCKING PROCESS 53 |
| 4 | INPUT | MATERIAL REQUIREMENT (COMPOSITION) 115 |
| 4 | OUTPUT | NEW POWDER 122 |

FIG. 14

MACHINE CALIBRATION PARAMETER GENERATION PROCESS STATE - I/O DATABASE

| PROCESS STATE | INPUT/OUTPUT | DESCRIPTION |
|---|---|---|
| 5 | DESCRIPTION | MACHINE CALIBRATION PARAMETER GENERATION 54 |
| 5 | INPUT | MATERIAL REQUIREMENT (COMPOSITION) 115 |
| 5 | INPUT | MANUFACTURING PROCESS REQUIREMENTS 112 |
| 5 | OUTPUT | (WHAT MACHINE MODEL) MACHINE CALIBRATION SETTINGS 119 |
| 5 | OUTPUT | MANUFACTURER CAGE CODE 120 |
| | OUTPUT | MACHINE SERIAL NUMBER USED FOR MANUFACTURE 121 |

FIG. 15

POWDER INSPECTION PROCESS STATE - I/O DATABASE

| PROCESS STATE | INPUT/OUTPUT | DESCRIPTION |
|---|---|---|
| 6 | DESCRIPTION | POWDER INSPECTION PROCESS 55 |
| 6 | INPUT | NEW POWDER 122 |
| 6 | INPUT | USED POWDER 123 |
| 6 | OUTPUT | INSPECTED POWDER 126 |

FIG. 18

MACHINE PRE-PROCESSING TRANSFORMATION
PROCESS STATE - I/O DATABASE

| PROCESS STATE | INPUT/OUTPUT | DESCRIPTION |
|---|---|---|
| 9 | DESCRIPTION | MACHINE PRE-PROCESSOR TRANSFORMATION 56 |
| 9 | INPUT | STL FILE, AMF FILE, EQUIVALENT OTHER 125 |
| 9 | INPUT | PRODUCT MANUFACTURING INFORMATION 109 |
| 9 | INPUT | MATERIAL REQUIREMENT (COMPOSITION) 115 |
| 9 | INPUT | MANUFACTURING PROCESS REQUIREMENTS (WHAT MACHINE MODEL) 112 |
| 9 | INPUT | 2D OR 3D BAR CODE OR PART GLYPH 129 |
| 9 | OUTPUT | MACHINE TOOL PATH FILE 130 |

FIG. 19

ADDITIVE MANUFACTURING PROCESS STATE - I/O DATABASE

| PROCESS STATE | INPUT/OUTPUT | DESCRIPTION |
|---|---|---|
| 10 | DESCRIPTION | LPBM PRINT  57 |
| 10 | INPUT | MACHINE TOOL PATH FILE  130 |
| 10 | INPUT | INSPECTED POWDER  126 |
| 10 | INPUT | MACHINE CALIBRATION SETTINGS  119 |
| 10 | INPUT | PART SERIAL NUMBER  113 |
| 10 | INPUT | PART NUMBER  114 |
| 10 | INPUT | MANUFACTURER CAGE CODE  120 |
| 10 | INPUT | MANUFACTURING PROCESS REQUIREMENTS (WHAT MACHINE MODEL)  112 |
| 10 | INPUT | MACHINE SERIAL NUMBER USED FOR MANUFACTURE  121 |
| 10 | INPUT | 2D OR 3D BAR CODE OR PART GLYPH  129 |
| 10 | OUTPUT | PIECE PART  132 |
| 10 | OUTPUT | USED POWDER  123 |
| 10 | OUTPUT | VERIFICATION COUPONS  134 |

FIG. 22

PART POST PROCESSING PROCESS STATE - I/O DATABASE

| PROCESS STATE | INPUT/OUTPUT | DESCRIPTION |
|---|---|---|
| 11 | DESCRIPTION | PART POST PROCESSING  58 |
| 11 | INPUT | PIECE PART  132 |
| 11 | INPUT | PRODUCT MANUFACTURING INFORMATION  109 |
| 11 | OUTPUT | POST PROCESSED (FINISHED) PART  133 |

FIG. 23

PART INSPECTION PROCESS STATE - I/O DATABASE

| PROCESS STATE | INPUT/OUTPUT | DESCRIPTION |
|---|---|---|
| 12 | DESCRIPTION | PART POST INSPECTION 59 |
| 12 | INPUT | POST PROCESSED (FINISHED) PART 133 |
| 12 | INPUT | SOLID MODEL (PRT FILE) - GEOMETRY DEFINITION 108 |
| 12 | INPUT | PRODUCT MANUFACTURING INFORMATION 109 |
| 12 | INPUT | QUALITY REQUIREMENT 111 |
| 12 | INPUT | VERIFICATION COUPONS 134 |
| 12 | OUTPUT | POST PROCESSED, FINISHED AND INSPECTED PART 135 |
| 12 | OUTPUT | INSPECTION RECORD 136 |
| 12 | OUTPUT | CERTIFICATION OF COMPLIANCE 138 |

FIG. 26

PART END USER DELIVERY PROCESS STATE - I/O DATABASE

| PROCESS STATE | INPUT/OUTPUT | DESCRIPTION |
|---|---|---|
| 13 | DESCRIPTION | PART END USER DELIVERY 60 |
| 13 | INPUT | POST PROCESSED, FINISHED AND INSPECTED PART 135 |
| 13 | INPUT | INSPECTION RECORD 136 |
| 13 | INPUT | CERTIFICATION OF COMPLIANCE 138 |
| 13 | OUTPUT | POST PROCESSED, FINISHED AND INSPECTED PART 135 |
| 13 | OUTPUT | INSPECTION RECORD 136a |
| 13 | OUTPUT | CERTIFICATION OF COMPLIANCE 138a |
| 13 | INPUT | CERTIFICATION OF AUTHENTICITY 139 |
| 13 | OUTPUT | 2D OR 3D BAR CODE OR PART GLYPH 129 |
| 13 | OUTPUT | INVOICE 140 |

FIG. 27

OUTER SPACE DIGITAL LOGISTICS SYSTEM

TECHNICAL FIELD

This disclosure relates to manufacturing in outer space, and more particularly to a system that traces a manufactured part through its product lifecycle and records a series of authenticating transactions in a digital distributed ledger.

DESCRIPTION OF RELATED ART

U.S. Patent Application Publication No. 2016/0098723 entitled "System and Method for Block-Chain Verification of Goods" is directed to a method that includes scanning, by a computing device, using a code scanner, an address from a code affixed to a product, verifying, by the computing device, that the address is associated with a crypto-currency transaction recorded at a transaction register, obtaining, by the computing device, at least one current transaction datum, and determining, based on the verification and the at least one current transaction datum, that the product is authentic.

U.S. Patent Application Publication No. 2016/0098730 entitled "System and Method for Block-Chain Verification of Goods" is also directed to a method that includes obtaining, by a first computing device, a first address, exporting, by the first computing device, the first address to a first code affixed to a first product, filing, by the first computing device, a first crypto-currency transaction to the first address, at a transaction register, receiving, by a second computing device, from a code scanner, the first address, scanned from the first code affixed to the first product, verifying, by the second computing device, the first crypto-currency transaction at the transaction register, using the first address, and identifying, by the second computing device, based on the verification, that the first product is authentic.

Outer space is one of the harshest environments known to humankind. In outer space, failures are unacceptable as there is a high risk of harm to health and death. Parts of manufacture that are constructed must be substantially identical to the original or "correct" corresponding part. There are no "second chances" in outer space. In order to have a higher rate of success in this harsh environment, a manufacturing process should ensure data, process, and performance integrity for 3D manufacturing of parts. In outer space, the logistics process may be shortened by building and/or printing parts for repair and replacement on a space-based entity such as a spacecraft, a space station, or a space colony. These space-based customers may purchase digital supply items (e.g., as digital data) from a product catalog and convert the digital supply item to a physical part of manufacture by additive printing in outer space.

Therefore, a need exists for a system that can ensure the quality of a printed item of manufacture includes the integrity of the supply chain source, integrity of digital data delivery and receipt, and integrity of the printed item of manufacture on the receiving end of the supply chain.

BRIEF SUMMARY

With parenthetical reference to the corresponding parts, portions or surfaces of the disclosed embodiment, merely for purposes of illustration and not by way of limitation, an exemplary embodiment of the present disclosure provides a method for the verification and authentication of additive manufactured product comprising the steps of: receiving, from a customer (19), at least one customer requirement for a product (101); developing (210), from the at least one customer requirement, at least one manufacturing requirement (37) for the product; generating (218, 228, 236, 254), from the manufacturing requirement, a product geometry file (125) and at least one printer parameter (119, 120, 121, 122, 128, 130); recording (225, 243, 260), by a first computing device (27a), to a distributed transaction register (17), a first transaction (90c) reflecting the product geometry file; printing (262), with a 3D additive printer (31) meeting the printer parameter, a product (132) using the product geometry file; obtaining a first output (84c) from the distributed transaction register that is associated with the first transaction; generating (306) a unique code (129) reflecting the first output; embedding (274) within the product the unique code; recording (271, 281), by a second computing device (27b), to the distributed transaction register, a second transaction (90i) reflecting the printing of the product and the first output; obtaining a second output (84i) from the distributed transaction register that is associated with the second transaction; whereby the product geometry file and the printing of the product may be verified with the unique code and the second output such that the product may be authenticated.

The at least one customer requirement for the product may be selected from a group consisting of quality parameters, material composition requirements, product definitions, manufacturing requirements and an IP artifact (105). The at least one manufacturing requirement for the product may be selected from a group consisting of product size, product weight, product strength, product geometry (109), a computer aided design (CAD) file (108), material requirements (110), and an IP artifact (106). The product geometry file may comprise an additive manufacturing file or a stereolithography file (125). The distributed transaction register may comprise a blockchain, and the step of recording the first transaction may comprise the step of recording the first transaction to a first block of the blockchain. The first transaction may comprise a transaction datum and the first output. The first output may comprise a blockchain address and the transaction datum may comprise a cryptographic hash digest reflecting the product geometry file. The step of recording the second transaction may comprise the step of recording the second transaction to a second block of the blockchain. The second transaction may comprise a transaction datum and the second output. The second output may comprise a blockchain address and the transaction datum may comprise a cryptographic hash digest reflecting the printing of the product. The step of embedding to the product the unique code reflecting the first output may comprise the step of printing the product with the unique code or etching the product with the unique code.

The method may comprise the steps of: generating, from the manufacturing requirement, as the at least one printer parameter, at least one 3D additive printer material parameter (122) and at least one 3D additive printer calibration parameter (119); recording (243) to the distributed transaction register the first transaction such that the first transaction reflects the at least one 3D additive printer material parameter and the at least one 3D additive printer calibration parameter; printing, with the 3D additive printer meeting the 3D additive printer calibration parameter, the product using the product geometry file and the at least one 3D additive printer material parameter; whereby the at least one 3D additive printer material parameter and the at least one 3D additive printer calibration parameter may be verified with the unique code such that the product may be authenticated. The at least one 3D additive printer calibration parameter may be selected from a group consisting of speed, power, scan rate, and feed rate. The at least one 3D additive printer material parameter may be selected from a group consisting of aluminum, titanium, stainless steel, cobalt chrome, inconel, maraging steel, hastalloy-X, and copper. The distributed transaction register may comprise a blockchain, and the step of recording the first transaction may comprise the step of recording the first transaction to a first block of the blockchain. The step of recording the first transaction may comprise the step of recording to the first block an entry reflecting the product geometry file, the 3D additive printer calibration parameter, and the 3D additive printer material parameter.

The method may comprise the steps of: recording (208), by a third computing device, to the distributed transaction register, a third transaction (90a) reflecting the at least one customer requirement for the product; obtaining a third output from the distributed transaction register that is associated with the third transaction; recording, by a fourth computing device, to the distributed transaction register, a fourth transaction (90b) reflecting the at least one manufacturing requirement for the product; obtaining a fourth output from the distributed transaction register that is associated with the fourth transaction; wherein the fourth output reflects the third output and the first output reflects the fourth output; whereby the at least one customer requirement for the product and the at least one manufacturing requirement for the product may be verified with the unique code such that the product may be authenticated. The at least one customer requirement for the product may be selected from a group consisting of quality parameters, material composition requirements, product definitions, manufacturing requirements and an IP artifact. The at least one manufacturing requirement for the product may be selected from a group consisting of product size, product weight, product strength, product geometry, a computer aided design file, material requirements, and an IP artifact. The distributed transaction register may comprise a blockchain, and the step of recording the third transaction may comprise the step of recording the third transaction to a third block of the blockchain and the step of recording the fourth transaction may comprise the step of recording the fourth transaction to a fourth block of the blockchain. The method may comprise the steps of: recording (281), by a fifth computing device, to the distributed transaction register, a fifth transaction (90j) reflecting the embedding or affixing to the product the unique code reflecting the second output; obtaining a fifth output from the distributed transaction register that is associated with the fifth transaction and the second output; inspecting (283) the product; recording (292), by a sixth computing device, to the distributed transaction register, a sixth transaction (90k) reflecting the inspection of the product; whereby the embedding or affixing to the product the unique code and the inspection of the product may be verified with the distributed transaction register. The distributed transaction register may comprise a blockchain, and the step of recording the fifth transaction may comprise the step of recording the fifth transaction to a fifth block of the blockchain and the step of recording the sixth transaction may comprise the step of recording the sixth transaction to a sixth block of the blockchain. The method may comprise the steps of: obtaining a sixth output from the distributed transaction register that is associated with the sixth transaction and the fifth output; delivering the product to an end user; recording (304), by a seventh computing device, to the distributed transaction register, a seventh transaction (90L) reflecting the delivery of the product to the end user; whereby the delivery of the product to the end user may be verified with the distributed transaction register. The method may comprise the steps of obtaining a seventh output from the distributed transaction register that is associated with the seventh transaction and the sixth output; installing the product for end use; recording, by a eighth computing device, to the distributed transaction register, an eighth transaction reflecting the installation of the product for end use; whereby the installation of the product for end use may be verified with the distributed transaction register. The distributed transaction register may comprise a blockchain, and the step of recording the seventh transaction may comprise the step of recording the seventh transaction to a seventh block of the blockchain and the step of recording the eighth transaction may comprise the step of recording the eighth transaction to an eighth block of the blockchain.

The method may comprise the step of generating a transaction record reflecting the first transaction and the second transaction from the distributed transaction register. The method may comprise the steps of: scanning, by a computing device, the unique code embedded in or affixed to the product; verifying (41), by the computing device, that the code is associated with the second output of the distributed transaction register; obtaining, by the computing device, at least one current transaction datum (85); and determining (306), based on the verification and the at least one current transaction datum, that the product is authentic.

Another exemplary embodiment of the present disclosure provides a database system comprising: at least one customer requirement for a product; at least one manufacturing requirement for the product developed from the at least one customer requirement; a product geometry file generated from the manufacturing requirement; a distributed transaction register having a first transaction reflecting the product geometry file; the distributed transaction register having a second transaction reflecting a printing of the product with an additive printer meeting a printer parameter; whereby the product geometry file and the printing of the product may be verified with a unique code such that the product may be authenticated.

Another exemplary embodiment of the present disclosure provides a computer system comprising: a first computing device configured to communicate with a server network (16) having a plurality of node servers (14) storing a distributed transaction ledger (17); a second computing device configured to communicate with the server network having the plurality of node servers storing the distributed transaction ledger; a 3D additive printer (31) for printing a product; a mechanism for embedding or affixing a code to a product; whereby the first computing device is configured to record to the distributed transaction register a first transaction reflecting a product geometry file generated from at least one manufacturing requirement for a product; whereby the 3D additive printer is configured to print the product using the product geometry file; one of the first, second or a third computing device is configured to generate a unique product code that reflects the first transaction; whereby the mechanism is configured to embed or affix the unique product code reflecting the first transaction to the product; whereby the second computing device is configured to record to the distributed transaction register a second transaction reflecting the printing of the product; whereby the product geometry file may be verified with the unique code and an output from the second transaction such that the product may be authenticated. The 3D additive printer may comprise the mechanism for embedding or affixing the unique product code to the product.

Another exemplary embodiment of the present disclosure provides a method of verifying, the method comprising: (a) receiving a plurality of products from a plurality of entities (35, 36), wherein each one of the plurality of products has an associated distributed transaction register storing product information; (b) determining the product information from the distributed transaction register; and (c) aggregating the product information. The product information may comprise at least one of product requirements (101), product processes (62) or materials (61), product custody (63), product remuneration (64), and product intellectual property (106). The distributed transaction register may be one of a private digital ledger and a public digital ledger. The method may further comprise transferring the aggregated product information and an end product to a third party (29), wherein the end product may be a combination of the plurality of products. The method may further comprising, prior to receiving the plurality of products, receiving access to the distributed transaction register storing product information.

Another exemplary embodiment of the present disclosure provides an apparatus for verification, the apparatus comprising: at least one processor and at least one memory storing computer program instructions, wherein the at least one memory with the computer program instructions may be configured with the at least one processor to cause the apparatus to at least: in response to receiving a plurality of products from a plurality of entities, determine a product information from a distributed transaction register, wherein each one of the plurality of products has an associated distributed transaction register storing product information; and aggregate the product information. The product information may comprise at least one of product requirements, product processes or materials, product custody, product remuneration, and product intellectual property. The at least one memory with the computer program instructions may be configured with the at least one processor to further cause the apparatus to at least prior to receiving the plurality of products, receive access to the distributed transaction register storing product information. The distributed transaction register may be one of a private digital ledger and a public digital ledger.

Another exemplary embodiment of the present disclosure provides a non-transitory computer-readable medium tangibly comprising computer program instructions, which, when executed by a processor, causes the processor to at least: in response to receiving a plurality of products from a plurality of entities, determine a product information from a distributed transaction register, wherein each one of the plurality of products has an associated distributed transaction register storing product information; and aggregate the product information. The product information may comprise at least one of product requirements, product processes or materials, product custody, product remuneration, and product intellectual property. The processor may be further caused to prior to receiving the plurality of products, receive access to the distributed transaction register storing product information. The distributed transaction register may be one of a private digital ledger and a public digital ledger.

Another exemplary embodiment of the present disclosure provides a method for the provenance, verification and authentication of a manufactured product, comprising the steps of receiving, from a customer, at least one customer requirement for a product, developing at least one IP artifact, deriving at least one manufacturing requirement, and generating a product geometry file for the product, recording, by a first computing device, to a distributed transaction register, a first transaction reflecting certification of the product geometry file incorporating the IP artifact and the manufacturing requirement, obtaining a first output reflecting the first transaction, printing the product with a 3D printer, recording, by a second computing device, to the distributed transaction register, a second transaction reflecting the printing of the product and the first output, obtaining a second output reflecting the second transaction, embedding within the product a unique code reflecting the second output, whereby the product geometry file and the printing of the product may be verified with the unique code such that the product may be authenticated as genuine.

Another exemplary embodiment of the present disclosure provides a method of tracking, the method comprising: (a) associating an information with a part, the information comprising at least one of a patent, invention, trademark, copyright, work of authorship, or know-how embodied in the item; and (b) recording the associated information of the part within a database, wherein the recording further may comprise encrypting the associated information within the database and assigning a unique identifier to the part. The database may be a public or a private ledger. The database may be a PLM. The method may further comprise encrypting the recorded associated information of the part.

Another exemplary embodiment of the present disclosure provides a database system. The database system includes at least one customer requirement for a product, at least one IP artifact, at least one manufacturing requirement for the product developed from the at least one customer requirement, and a product geometry file generated from the manufacturing requirement and the one IP artifact. The database system further includes a distributed transaction register having a first transaction reflecting the product geometry file, the distributed transaction register having a second transaction reflecting a printing of the product with an additive printer meeting at least one printer parameter, and whereby the product geometry file and the printing of the product may be verified with a unique code such that the product may be authenticated as genuine.

Another exemplary embodiment of the present disclosure provides a method including associating an information with a part, the information comprising at least one of a patent, invention, trademark, copyright, work of authorship, or know-how embodied in the item, and recording the associated information of the part within a database, wherein the recording further comprises encrypting the associated information within the database and assigning a unique identifier to the part.

It is an object of the present disclosure to provide a method, apparatus, computer-readable medium, database system, and computing system for verification and provenance.

Yet another exemplary embodiment of the present disclosure provides a method for verifying and authenticating additive manufactured products utilizing extraterrestrial communication (400). The method may include receiving, from a customer (410), at least one customer requirement for a product (540); developing, from the at least one customer requirement, at least one manufacturing requirement for the product (540); generating, from the manufacturing requirement, a product geometry file (125) and at least one printer parameter (119); recording, by a first computing device (27a), to a distributed transaction register (17) stored on a server network (16) having a plurality of node servers (14), a first transaction (90c) reflecting the product geometry file (125), the first transaction (90c) having a first output (84c) that is associated with the first transaction (90c), the first output (84c) including a blockchain address; transmitting, from the first computing device (27a) to a second computing device (430), the first output (84c) from the distributed transaction register (17) that is associated with the first transaction (90c), the product geometry file (125), and the at least one printer parameter (119), the transmitting the first output (84c) includes transmitting between a terrestrial transceiver (460) that is communicatively connected to the server network (16) and an extraterrestrial transceiver (460) that is communicatively connected to the terrestrial transceiver (460), the second computing device (430) being configured to communicate with the server network (16) having the plurality of node servers (14) storing the distributed transaction register (17) by at least the terrestrial transceiver (460) and the extraterrestrial transceiver (460); printing, with a 3D additive printer (530) that is connected to the second computing device (430), the product (540) that meets the at least one printer parameter (119) and utilizes the product geometry file (125); generating, by the second computer device (430), a unique product code reflecting the first output (84c) of the first transaction (90c); recording, by the second computing device (430), to the distributed transaction register (17), a second transaction (90i) reflecting the printing of the product (540) and the first output (84c), the second transaction (90i) having a second output that is associated with the second transaction (90i), the second output including a blockchain address; and embedding, by a mechanism, the unique product code reflecting the first output (84c) within or affixing to the product (540), whereby the product geometry file (125) and the printing of the product (540) is verified with the unique product code and the second output from the second transaction (90i) such that the product (540) is authenticated.

Yet another embodiment of the present disclosure is disclosed wherein the at least one customer requirement for the product (540) is selected from a group consisting of quality parameters, material composition requirements, product definitions, manufacturing requirements, and an IP artifact; the at least one manufacturing requirement for the product is selected from a group consisting of product size, product weight, product strength, product geometry, a computer aided design (CAD) file, and an IP artifact (106); the product geometry file (109) comprises an additive manufacturing file or a stereolithography file (125); the distributed transaction register (17) comprises a blockchain, and wherein the recording the first transaction comprises recording the first transaction to a first block of the blockchain; the recording the second transaction (90i) comprises recording the second transaction (90i) to a second block of the blockchain; the first transaction further comprises a first transaction datum and the second transaction (90i) further comprises a second transaction datum; the first transaction datum comprises a cryptographic hash digest reflecting the product geometry file (109) and the second transaction datum comprises a cryptographic hash digest reflecting the printing of the product; the embedding the unique product code reflecting the first output (84c) comprises printing the product with the unique product code or etching the product (540) with the unique product code; generating, from the manufacturing requirement, at least one 3D additive printer material parameter (122) and at least one 3D additive printer calibration parameter (119); and printing, with the 3D additive printer (530) meeting the 3D additive printer calibration parameter (119), the product (540) using the at least one 3D additive printer material parameter (122), wherein the first transaction (90c) reflects the at least one 3D additive printer material parameter (122) and the at least one 3D additive printer calibration parameter (119), and wherein the at least one 3D additive printer material parameter (122) and the at least one 3D additive printer calibration parameter (119) is verified with the unique product code such that the product (540) is authenticated; the at least one 3D additive printer calibration parameter (119) is selected from a group consisting of speed, power, scan rate, and feed rate; the at least one 3D additive printer material parameter (122) is selected from a group consisting of aluminum, titanium, stainless steel, cobalt chrome, inconel, maraging steel, hastalloy-X, and copper; the distributed transaction register (17) comprises a blockchain, and wherein the recording the first transaction comprises recording the first transaction to a first block of the blockchain; the recording the first transaction (90c) comprises recording to the first block an entry reflecting the product geometry file (125), the at least one 3D additive printer calibration parameter (119), and the at least one 3D additive printer material parameter (122); recording, by a third computing device, to the distributed transaction register (17), a third transaction (90a) reflecting the at least one customer requirement for the product (540); obtaining a third output from the distributed transaction register (17) that is associated with the third transaction (90a); recording, by a fourth computing device, to the distributed transaction register (17), a fourth transaction (90b) reflecting the at least one manufacturing requirement for the product (540); obtaining a fourth output from the distributed transaction register (17) that is associated with the fourth transaction (90b); wherein the fourth output reflects the third output and the first output reflects the fourth output; wherein the at least one customer requirement for the product and the at least one manufacturing requirement for the product (540) is verified with the unique product code such that the product (540) is authenticated; recording, by a fifth computing device, to the distributed transaction register, a fifth transaction (90j) reflecting the embedding the unique product code reflecting the first output; obtaining a fifth output from the distributed transaction register (17) that is associated with the fifth transaction (90j) and the second output; inspecting the product; recording, by a sixth computing device, to the distributed transaction register, a sixth transaction (90k) reflecting the inspecting of the product (540); wherein the embedding the unique product code and the inspecting of the product (540) is verified with the distributed transaction register (17); obtaining a sixth output from the distributed transaction register that is associated with the sixth transaction (90k) and the fifth output; delivering the product to an end user; recording, by a seventh computing device, to the distributed transaction register (17), a seventh transaction (90l) reflecting the delivering of the product (540) to the end user; wherein the delivering of the product to the end user is verified with the distributed transaction register (17); obtaining a seventh output from the distributed transaction register (17) that is associated with the seventh transaction (90l) and the sixth output; installing the product for end use; recording, by a eighth computing device, to the distributed transaction register (17), an eighth transaction reflecting the installing of the product for end use; wherein the installing of the product for end use is verified with the distributed transaction register (17); the distributed transaction register (17) comprises a blockchain; the recording the first transaction (90c) comprises recording the first transaction (90c) to a first block of the blockchain; the recording the second transaction (90i) comprises recording the second transaction (90i) to a second block of the blockchain; the recording the third transaction comprises recording the third transaction (90a) to a third block of the blockchain; the recording the fourth transaction (90b) comprises recording the fourth transaction (90b) to a fourth block of the blockchain; the recording the fifth transaction (90j) comprises recording the fifth transaction (90j) to a fifth block of the blockchain; the recording the sixth transaction (90k) comprises recording the sixth transaction (90k) to a sixth block of the blockchain; the recording the seventh transaction (90l) comprises recording the seventh transaction (90l) to a seventh block of the blockchain; and the recording the eighth transaction comprises recording the eighth transaction to an eighth block of the blockchain; generating a transaction record reflecting the first transaction (90c) and the second transaction (90i) from the distributed transaction register (17); scanning, by a ninth computing device, the unique product code embedded within or affixed to the product (540); verifying, by the ninth computing device, that the unique product code is associated with the second output of the distributed transaction register (17); and obtaining, by the ninth computing device, at least one transaction datum (85); and determining, based on the verifying and the at least one transaction datum (85), that the product (540) is authentic; training an artificial intelligence module for closed loop control of an additive manufacturing machine operable to perform additive manufacturing processes to build parts, the training of the artificial intelligence module including: inputting to the artificial intelligence module additive manufacturing build parameter configuration files corresponding to a plurality of parts; inputting to the artificial intelligence module sequential time-based parameter data collected in-process by the additive manufacturing machine; inputting to the artificial intelligence module build layer image classification data generated by a convolutional neural network (640) configured to evaluate build layer images (630) captured in-process; inputting to the artificial intelligence module post-process image classification data generated by at least one other convolutional neural network (640) configured to evaluate images of a part captured post-process; and evaluating the additive manufacturing build parameter configuration files (830), the sequential time-based parameter data (714), the build layer image classification data (721), and the post-process image classification data by means of the artificial intelligence module; inputting to the artificial intelligence module melt pool data collected in-process by the additive manufacturing machine (530); and evaluating the melt pool data (713) by means of the artificial intelligence module.

A further exemplary embodiment of the present disclosure provides a system for verifying and authenticating additive manufactured products utilizing extraterrestrial communication (400). The system may include a server network (16) having a plurality of node servers (14) storing a distributed transaction register (17); a first computing device (27a) being configured to communicate with the server network (16) having the plurality of node servers (14) storing the distributed transaction register (17), the first computing device (27a) being further configured to record to the distributed transaction register (17) a first transaction (90c) reflecting a product geometry file (125) generated from at least one manufacturing requirement for a product (540), the first transaction (90c) having a first output (84c) that is associated with the first transaction (90c), the first output (84c) including a blockchain address; a terrestrial transceiver (460) communicatively connected to the server network (16) to transmit and receive data; an extraterrestrial transceiver (460) communicatively connected to the terrestrial transceiver (460) to transmit and receive data; a second computing device (430) being configured to communicate with the server network (16) having the plurality of node servers (14) storing the distributed transaction register (17) by at least the terrestrial transceiver (460) and the extraterrestrial transceiver (460); a 3D additive printer (530) being configured to communicate with the second computing device (430) and to print the product (540), the 3D additive printer (530) being further configured to print the product (540) using the product geometry file (125); and a mechanism being configured to communicate with the second computing device (430) and to embed or affix a unique product code reflecting the first output (84c) to the product (540), whereby one of the first, second, or a third computing device is configured to generate the unique product code that reflects the first output (84c) of the first transaction (90c), whereby the second computing device (430) is further configured to record to the distributed transaction register (17) a second transaction (90i) reflecting printing of the product and the first output (84c), the second transaction (90i) having a second output that is associated with the second transaction (90i), the second output including a blockchain address, and whereby the product geometry file (125) is verified with the unique product code and the second output from the second transaction (90i) such that the product (540) is authenticated.

A further exemplary embodiment of the present disclosure is disclosed wherein the 3D additive printer (530) comprises the mechanism for embedding or affixing the unique product code to the product (540); an additive manufacturing system (400) for building a part layer-by-layer according to an additive manufacturing build process, the additive manufacturing system (400) including: an additive manufacturing machine (530) including a powder bed (2024) and an energy source (2028), wherein a beam of energy from the energy source (2028) is scanned relative to a layer of powder in the powder bed (2024) to build each layer of the part by fusion; a build parameter configuration file (830) storing an initial set of build parameters for building the part in the additive manufacturing machine (530), wherein the initial set of build parameters is based at least in part on a geometric model of the part; a closed-loop control structure for adjusting the initial set of build parameters in-process, the closed loop control structure including a slow control loop having a trained artificial intelligence module (850); and a build layer image sensor arranged to acquire layer images of the part layers in-process; wherein the initial set of build parameters, a time-based sequence (714) of adjusted build parameters corresponding to the build process, and the layer images are transmitted as inputs to the trained artificial intelligence module; a fast control loop having a state machine (840); and a melt-pool monitoring system arranged to acquire real-time melt pool data (712) representative of a melt pool formed by the energy source (2028) in-process; wherein the melt pool data is transmitted as an input to the trained artificial intelligence module (850) and as an input to the state machine (840); the trained artificial intelligence module is trained using evaluation data from a first convolutional neural network (640) configured to evaluate layer images acquired in-process, and at least one second convolutional neural network (640) configured to evaluate images of finished parts acquired post-process; the at least one second convolutional neural network (640) includes a convolutional neural network (640) configured to evaluate two-dimensional images of sectioned parts; the at least one second convolutional neural network (640) includes a convolutional neural network (640) configured to evaluate three-dimensional images of parts (732); the trained artificial intelligence module (850) is a deep learning module having a recurrent artificial neural network.

The following will describe embodiments of the present invention, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE DRAWINGS

FIG. 8 is a database disclosing the process inputs and outputs of an embodiment of the customer requirements process state shown in FIG. 6.

FIG. 9 is a database disclosing the process inputs and outputs of an embodiment of the design implementation requirements process state shown in FIG. 7.

FIG. 13 is a database disclosing the process inputs and outputs of an embodiment of the manufacturing pre-processing requirements process state shown in FIG. 10.

FIG. 14 is a database disclosing the process inputs and outputs of an embodiment of the powder procurement and stocking process state shown in FIG. 11.

FIG. 15 is a database disclosing the process inputs and outputs of an embodiment of the machine calibration parameter generation process state shown in FIG. 12.

FIG. 18 is a database disclosing the process inputs and outputs of an embodiment of the powder inspection process state shown in FIG. 16.

FIG. 19 is a database disclosing the process inputs and outputs of an embodiment of the machine pre-processing transformation process state shown in FIG. 17.

FIG. 22 is a database disclosing the process inputs and outputs of an additive manufacturing process state shown in FIG. 20.

FIG. 23 is a database disclosing the process inputs and outputs of an embodiment of the part post-processing process state shown in FIG. 21.

FIG. 26 is a database disclosing the process inputs and outputs of an embodiment of the part inspection process state shown in FIG. 24.

FIG. 27 is a database disclosing the process inputs and outputs of an embodiment of the part end user delivery requirements process state shown in FIG. 25.

DETAILED DESCRIPTION OF THE EMBODIMENTS

Figure 1:
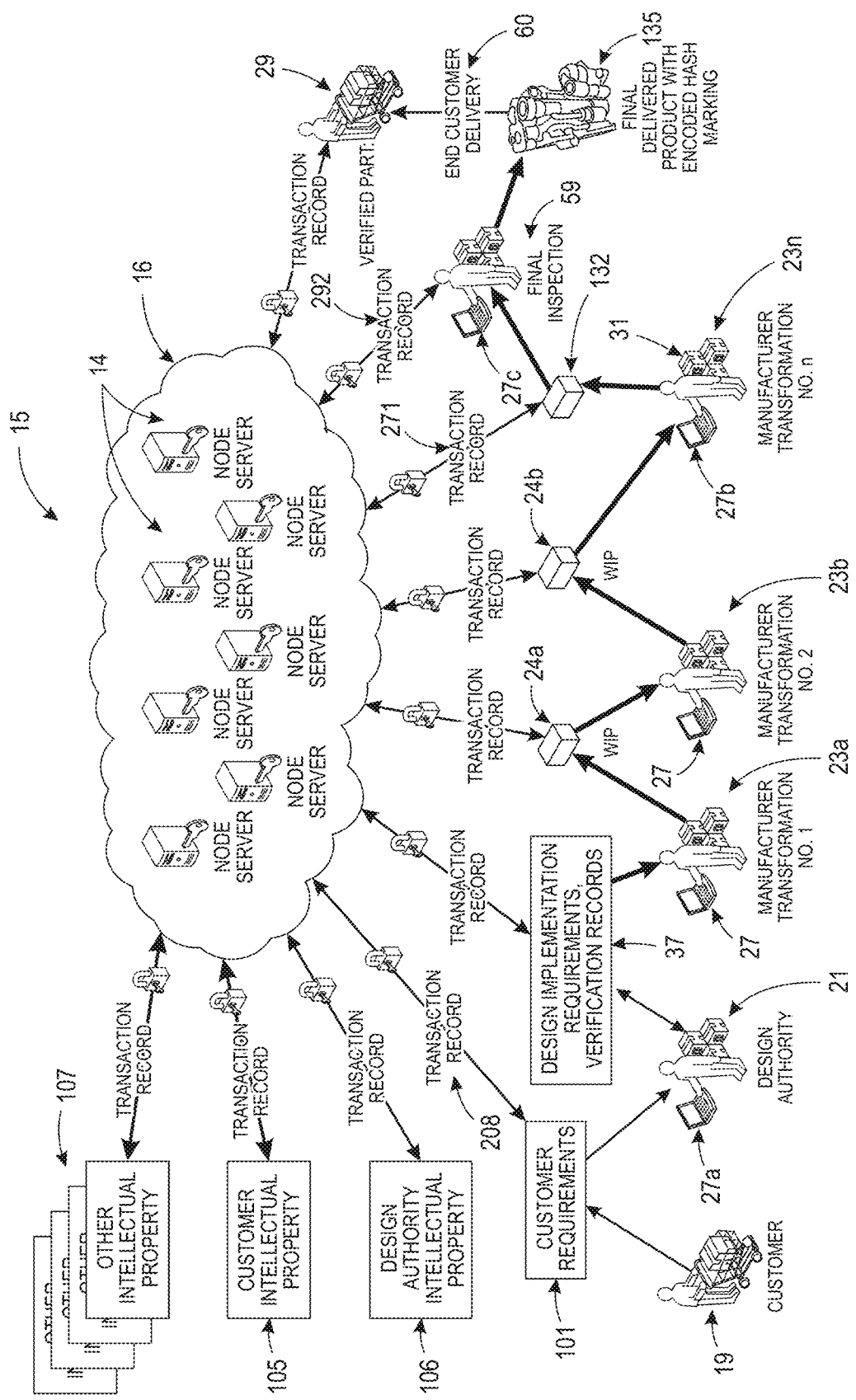
FIG. 1 is a schematic diagram showing an embodiment of the disclosed virtual distributed inventory management system and ledger with traceability and authentication at each transaction for a manufactured part.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention.

Exemplary embodiments of the present invention are described largely in the context of a fully functional computer system for executing a method of securely tracing manufactured parts. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, solid state media, or other suitable media. Examples of recordable media include magnetic disks in hard drives or diskettes, compact disks for optical drives, magnetic tape, solid state memory devices, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the disclosed method as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

The flowcharts and block diagrams in FIGS. 1-43 illustrate the architecture, functionality, and operation of possible implementations of systems and methods according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Digital systems generally include one or more processors that execute software, and various hardware devices that can be controlled by the software. For example, digital systems include computer systems such as desktops, laptops, net tops, servers, workstations, etc.; mobile devices such as cellular phones, personal digital assistants, smart phones, etc.; and other special purpose devices. The hardware devices may generally provide certain functionality such as storage (e.g. disk drives, flash memory, optical drives, etc.), communications (e.g. networking, wireless operation, etc.), and other input/output functionality (touch screen, keyboard, mouse, display, audio, etc.).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component. Computing Devices.

Figure 35:
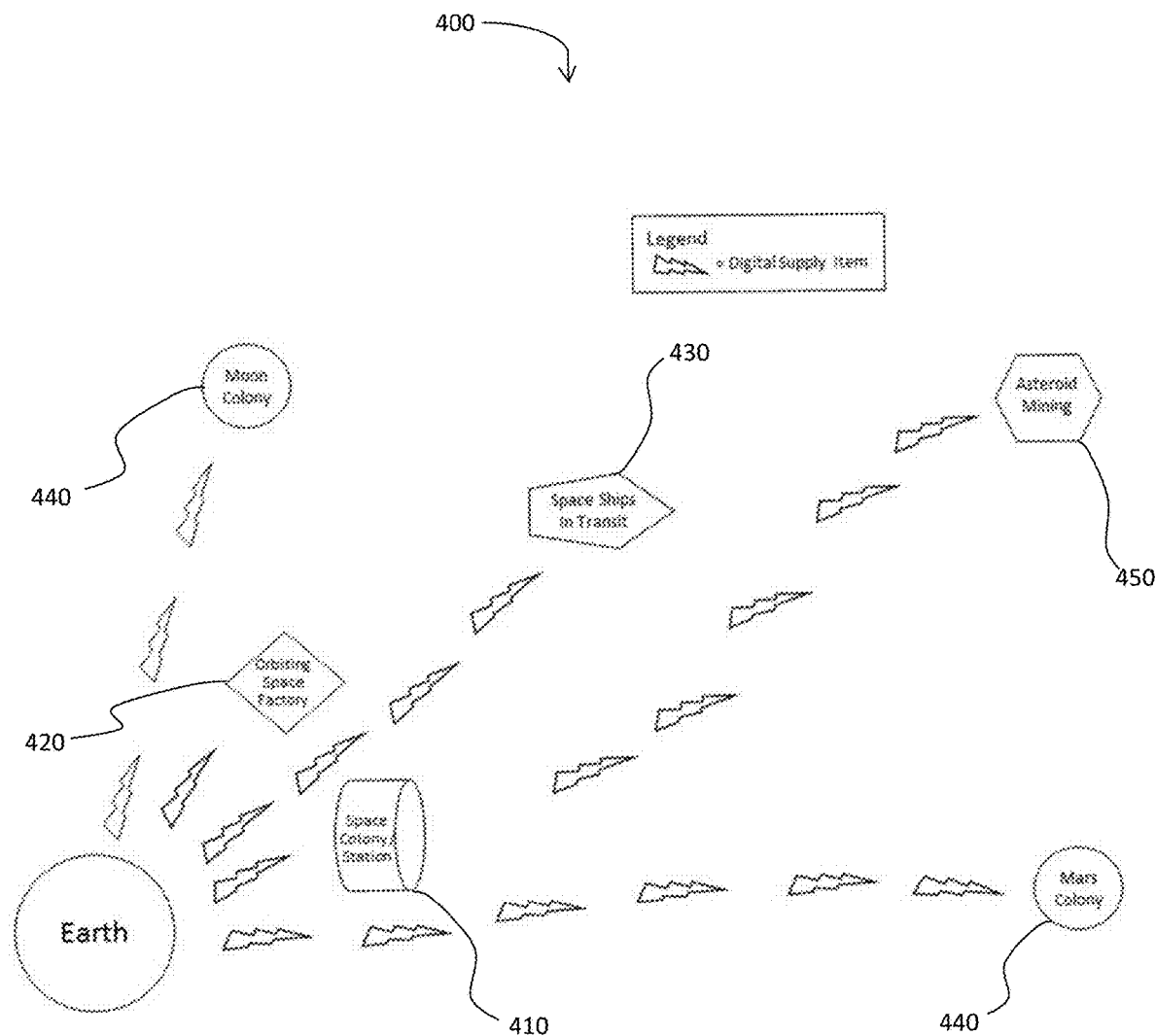
FIG. 35 is a schematic diagram of an embodiment of a virtual distributed inventory management system with traceability and authentication for additively manufactured parts in outer space.

Referring now to the distributed computer network illustrated in FIGS. 1 and 35, the computing devices of the system embodiments discussed herein, including computing devices 27, 27a and 27b, comprise a main memory, such as random access memory (RAM), and may also include a secondary memory. Secondary memory may include, for example, a hard disk drive, a removable storage drive or interface, connected to a removable storage unit, or other similar means. As will be appreciated by persons skilled in the relevant art, a removable storage unit includes a computer usable storage medium having stored therein computer software and/or data. Examples of additional means creating secondary memory may include a program cartridge and cartridge interface (such as that found in video game devices), a removable memory chip (such as an EPROM, or PROM) and associated socket, and other removable storage units and interfaces which allow software and data to be transferred from the removable storage unit to the computer system. In some embodiments, to "maintain" data in the memory of a computing device means to store that data in that memory in a form convenient for retrieval as required by the algorithm at issue, and to retrieve, update, or delete the data as needed.

The subject computing device may also include a communications interface. The communications interface allows software and data to be transferred between the computing device and external devices. The communications interface may include a modem, a network interface (such as an Ethernet card), a communications port, a PCMCIA slot and card, or other means to couple the computing device to external devices. Software and data transferred via the communications interface may be in the form of signals, which may be electronic, electromagnetic, optical, or other signals capable of being received by the communications interface. These signals may be provided to the communications interface via wire or cable, fiber optics, a phone line, a cellular phone link, and radio frequency link or other communications channels. Other devices may be coupled to the computing device via the communications interface. In some embodiments, a device or component is "coupled" to a computing device if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device may be coupled to a second computing device (not shown); for instance, a server may be coupled to a client device, as described below in greater detail.

The communications interface in the system embodiments discussed herein facilitates the coupling of the computing device with data entry devices, the device's display, and network connections, whether wired or wireless. In some embodiments, "data entry devices" are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location and altitude on the surface of the Earth. Navigation facilities can include a receiver configured to communicate with the Global Positioning System or with similar satellite networks, as well as any other system that mobile phones or other devices use to ascertain their location, for example by communicating with cell towers. A code scanner coupled to a computing device is a device that can extract information from a "code" attached to an object. In one embodiment, a code contains data concerning the object to which it is attached that may be extracted automatically by a scanner; for instance, a code may be a bar code whose data may be extracted using a laser scanner. A code may include a quick-read (QR) code whose data may be extracted by a digital scanner or camera. A code may include a radiofrequency identification (RFID) tag; the code may include an active RFID tag. The code may include a passive RFID tag. A computing device may also be coupled to a code exporter; in an embodiment, a code exporter is a device that can put data into a code. For instance, where the code is a two-dimensional image printed on paper, or a three dimensional printed object, or another object, the code exporter may be a printer. Where the code is a non-writable RFID tag, the code exporter may be a device that can produce a non-writable RFID tag. Where the code is a writable RFID tag, the code exporter may be an RFID writer; the code exporter may also be a code scanner, in some embodiments.

In some embodiments, a computing device's "display" is a device coupled to the computing device, by means of which the computing device can display images. Display include without limitation monitors, screens, television devices, and projectors.

Computer programs (also called computer control logic) are stored in main memory and/or secondary memory. Computer programs may also be received via the communications interface. Such computer programs, when executed, enable the processor device to implement the system embodiments discussed below. Accordingly, such computer programs represent controllers of the system. Where embodiments are implemented using software, the software may be stored in a computer program product and loaded into the computing device using a removable storage drive or interface, a hard disk drive, or a communications interface.

The computing device may also store data in database accessible to the device. A database is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor, a communication infrastructure, at least a main memory, and usually a communications interface, not all devices will necessarily house these facilities separately. For instance, in some forms of computing devices as defined above, processing and memory could be distributed through the same hardware device, as in a neural net or grid, and thus the communications infrastructure could be a property of the configuration of that particular hardware device. Many devices do practice a physical division of tasks as set forth above, however, and practitioners skilled in the art will understand the conceptual separation of tasks as applicable even where physical components are merged.

The systems may be deployed in a number of ways, including on a stand-alone computing device, a set of computing devices working together in a network, such as server network 16, or a web application. Persons of ordinary skill in the art will recognize a web application as a particular kind of computer program system designed to function across a network, such as the Internet. Web application platforms typically include at least one client device, which is a computing device as described above. The client device connects via some form of network connection to a network, such as the Internet. The network may be any arrangement that links together computing devices, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network is at least one server, such as node servers 14, which is also a computing device as described above, or a set of computing devices that communicate with each other and work in concert by local or network connections. Of course, practitioners of ordinary skill in the relevant art will recognize that a web application can, and typically does, run on several servers and a vast and continuously changing population of client devices. Computer programs on both the client device and the server configure both devices to perform the functions required of the web application. Web applications can be designed so that the bulk of their processing tasks are accomplished by the server, as configured to perform those tasks by its web application program, or alternatively by the client device. Some web applications are designed so that the client device solely displays content that is sent to it by the server, and the server performs all of the processing, business logic, and data storage tasks. Such "thin client" web applications are sometimes referred to as "cloud" applications, because essentially all computing tasks are performed by a set of servers and data centers visible to the client only as a single opaque entity, often represented on diagrams as a cloud.

Many computing devices, as defined herein, come equipped with a specialized program, known as a web browser, which enables them to act as a client device at least for the purposes of receiving and displaying data output by the server without any additional programming. Web browsers can also act as a platform to run so much of a web application as is being performed by the client device, and it is a common practice to write the portion of a web application calculated to run on the client device to be operated entirely by a web browser. Such browser-executed programs are referred to herein as "client-side programs," and frequently are loaded onto the browser from the server at the same time as the other content the server sends to the browser. However, it is also possible to write programs that do not run on web browsers but still cause a computing device to operate as a web application client. Thus, as a general matter, web applications require some computer program configuration of both the client device (or devices) and the server. The computer program that comprises the web application component on either computing device's system configures that device's processor to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Encryption Methods.

Figure 3:
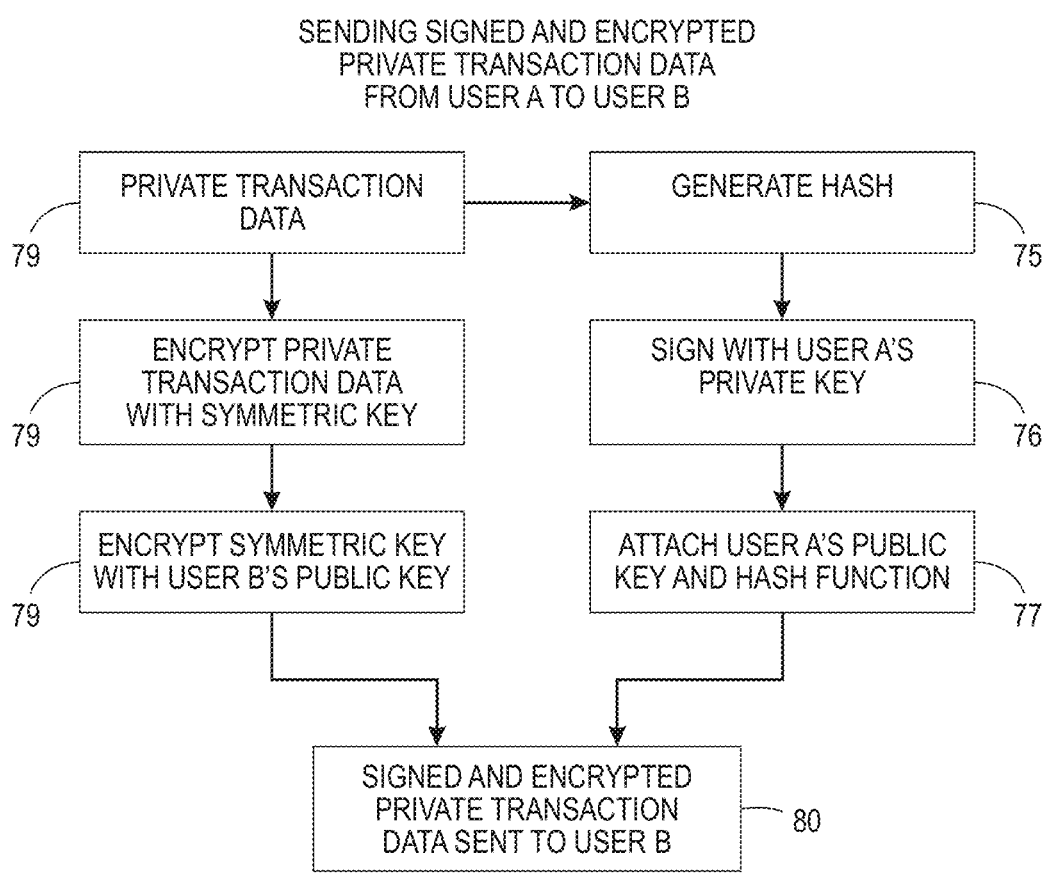
FIG. 3 is a flowchart disclosing the method steps of an embodiment for sending encrypted transaction data from a first user to a second user.
Figure 4:
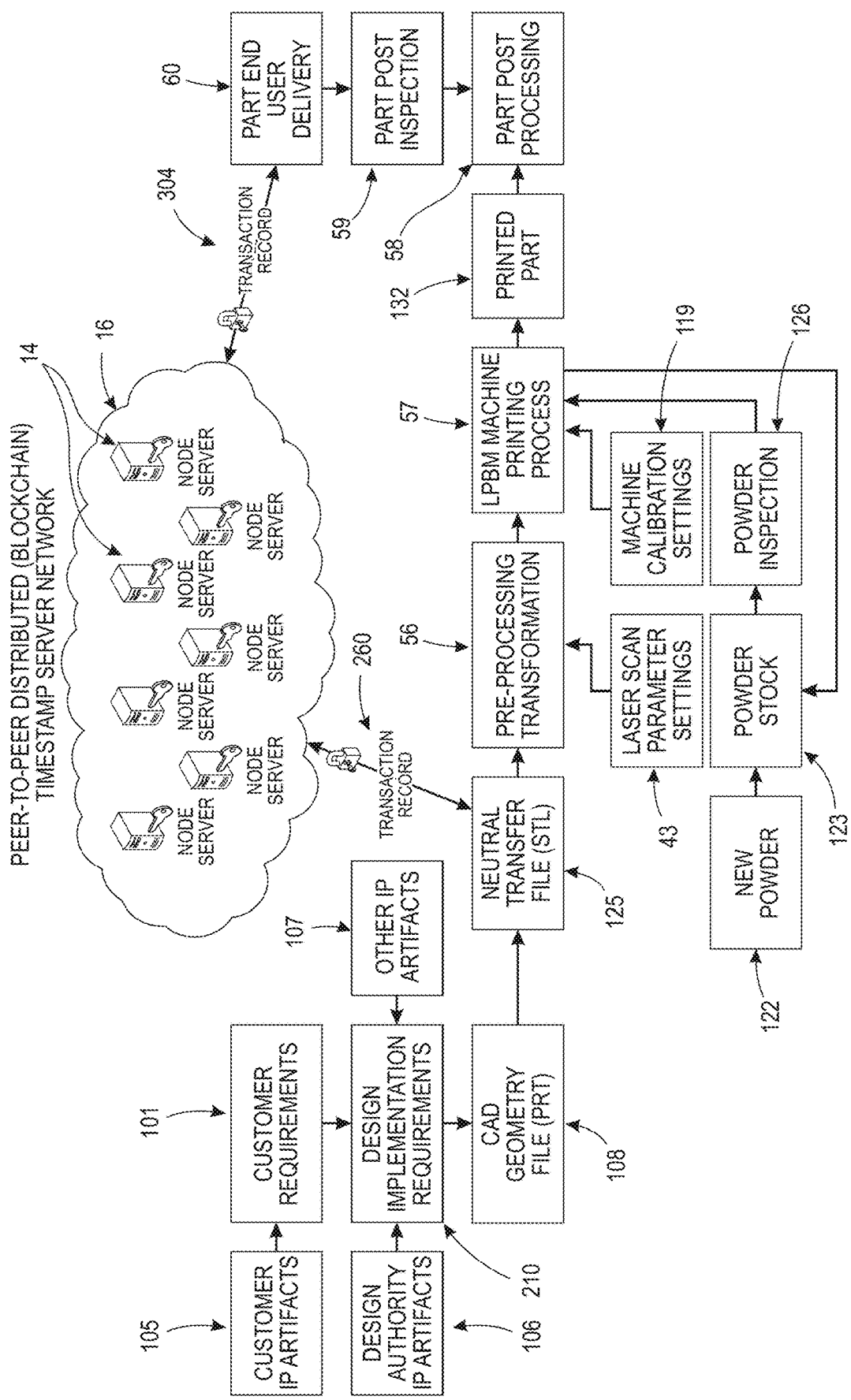
FIG. 4 is a flowchart disclosing the major process states of the disclosed virtual distributed ledger system.
Figure 5A:
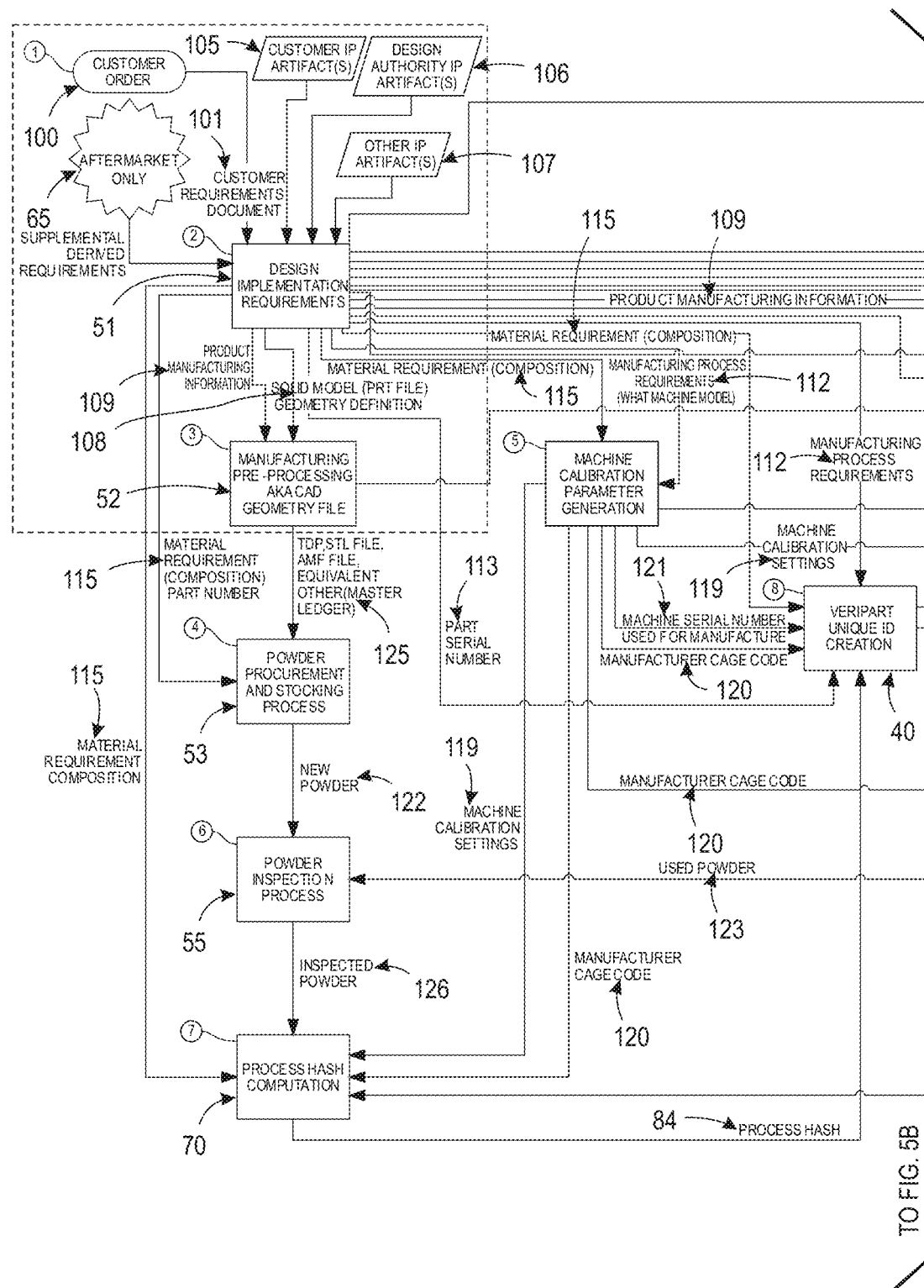
FIGS. 5A and 5B are a schematic diagram disclosing the major process states, and inputs and outputs for each state, of an embodiment of the disclosed virtual distributed ledger system.
Figure 5B:
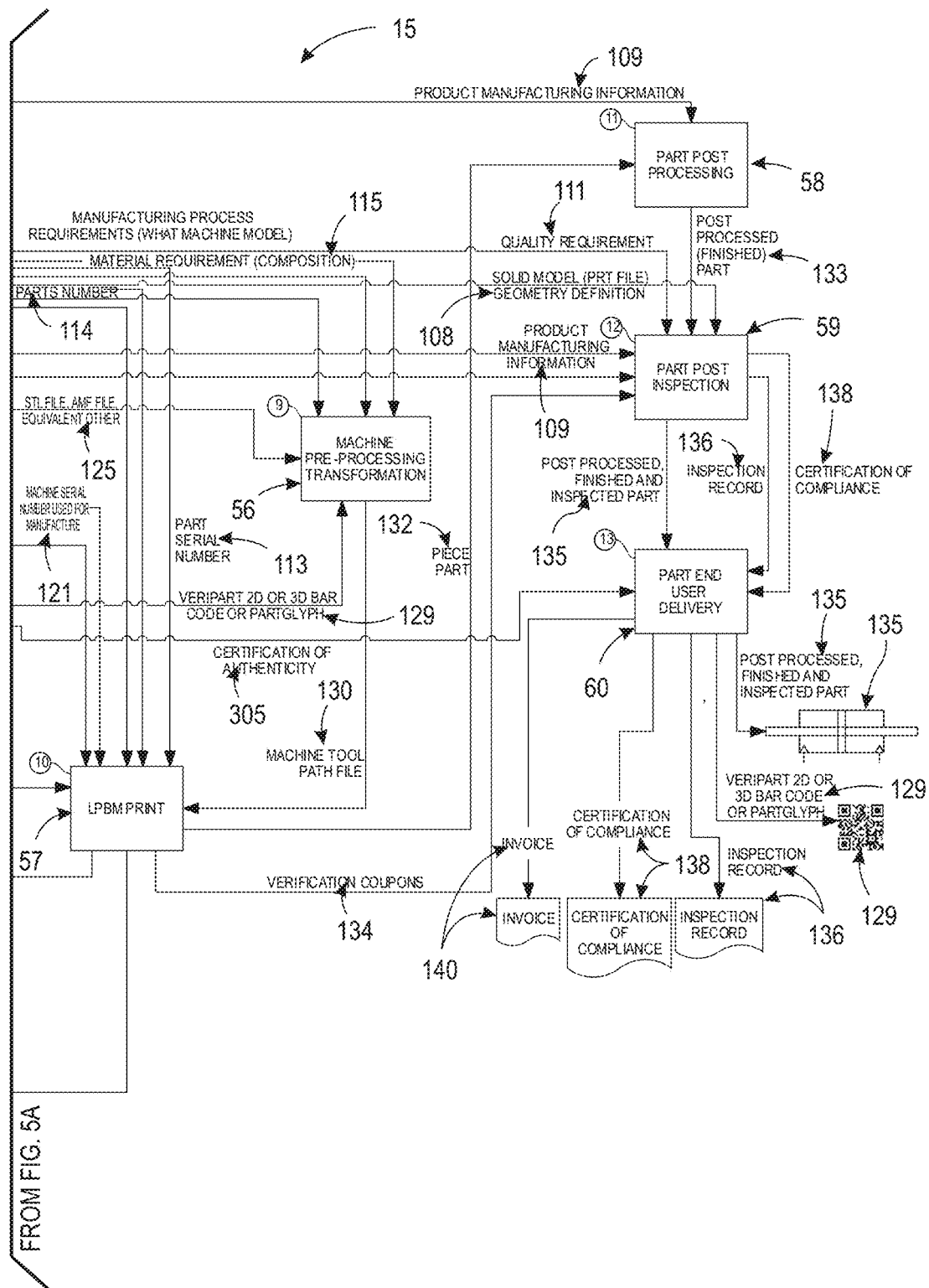

Referring now to the method steps illustrated in FIG. 3, the subject computing device may employ one or more security measures to protect the computing device or its data. For instance, the computing device may protect data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext is unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

The one or more client devices and the one or more servers may communicate using any protocol according to which data may be transmitted from the client to the server and vice versa. As a non-limiting example, the client and server may exchange data using the Internet protocol suite, which includes the transfer control protocol (TCP) and the Internet Protocol (IP), and is sometimes referred to as TCP/IP. In some embodiments, the client and server encrypt data prior to exchanging the data, using a cryptographic system as described above. In one embodiment, the client and server exchange the data using public key cryptography; for instance, the client and the server may each generate a public and private key, exchange public keys, and encrypt the data using each other's' public keys while decrypting it using each other's' private keys.

In some embodiments, the client authenticates the server or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum. The authorization may be the authorization to access a given process. In some embodiments, the certificate may identify the certificate authority.

The linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publically available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity, and links the file to the entity in a verifiable way. The digital signature may be incorporated in a digital certificate, which is a document authenticating the entity possessing the private key by authority of the issuing certificate authority, and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

The server and client may communicate using a security combining public key encryption, private key encryption, and digital certificates. For instance, the client may authenticate the server using a digital certificate provided by the server. The server may authenticate the client using a digital certificate provided by the client. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between the client and the server; for instance, the secret may be a private key for a private key cryptographic system. The secret may be a datum from which the private key may be derived. The client and server may then use that private key cryptographic system to exchange information until the exchange in which they are communicating ends. In some embodiments, this handshake and secure communication protocol is implemented using the secure sockets layer (SSL) protocol. In other embodiments, the protocol is implemented using the transport layer security (TLS) protocol. The server and client may communicate using hyper-text transfer protocol secure (HTTPS).

In the embodiment illustrated in FIG. 3, signed and encrypted private transaction data 36 is sent from a first user A to a second user B by generating a hash 75, signing with the first user's private key 76 and attaching the first user's public key and hash function 77. The private transaction data is encrypted with a symmetric key 78 and the symmetric key is encrypted with the second user's public key 79. The signed and encrypted private transaction data is then sent to the second user B 80.

Blockchain.

In one embodiment, the blockchain is a transaction register or ledger that records one or more new transactions in a data item known as a block. The blocks may be created in a way that places the blocks in chronological order, and links each block (b) to a previous block (a) in the chronological order, so that any computing device may traverse the blocks in reverse chronological order to verify any transactions listed in the blockchain. As an example, each new block (b) may be required to contain a cryptographic hash describing the previous block (a). In some embodiments, the blockchain contains a single first block, known as a "genesis block."

The creation of a new block (b) may be computationally expensive; for instance, the creation of a new block (b) may be designed by a protocol accepted by all participants in forming the blockchain to take a powerful set of computing devices a certain period of time to produce. Where one block (a) takes less time for a given set of computing devices to produce the block (a), the protocol may adjust the algorithm to produce the next block (b) so that it will require more steps; where one block (a) takes more time for a given set of computing devices to produce the block (a), protocol may adjust the algorithm to produce the next block (b) so that it will require fewer steps. As an example, the protocol may require a new block (b) to contain a cryptographic hash describing its contents; the cryptographic hash may be required to satisfy a mathematical condition, achieved by having the block (b) contain a number, called a nonce, whose value is determined after the fact by the discovery of the hash that satisfies the mathematical condition. Continuing the example, the protocol may be able to adjust the mathematical condition so that the discovery of the hash describing a block and satisfying the mathematical condition requires more or less steps, depending on the outcome of the previous hashing attempt. The mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, the production of a new block (b) according to the protocol is known as "mining."

In some embodiments, the protocol also creates an incentive to mine new blocks. The incentive may be financial; for instance, successfully mining a new block (b) may result in the person or entity that mines the block (b) receiving a predetermined amount of currency, such as fiat currency or crypto-currency. In other embodiments, the incentive may be redeemed for particular products or services; the incentive may be a gift certificate with a particular business, for instance. In some embodiments, the incentive is sufficiently attractive to cause participants to compete for the incentive by trying to race each other to the creation of blocks. Each block (b) created in the blockchain may contain a record or transaction describing one or more addresses that receive an incentive, such as virtual currency, as the result of successfully mining the block (b).

Where two entities simultaneously create new blocks, the blockchain may develop a fork; the protocol may determine which of the two alternate branches in the fork is the valid new portion of the blockchain by evaluating, after a certain amount of time has passed, which branch is longer. "Length" may be measured according to the number of blocks in the branch. Length may be measured according to the total computational cost of producing the branch. The protocol may treat only transactions contained the valid branch as valid transactions. When a branch is found invalid according to this protocol, transactions registered in that branch may be recreated in a new block in the valid branch; the protocol may reject "double spending" transactions. As a result, in some embodiments the creation of fraudulent transactions requires the creation of a longer blockchain branch by the entity attempting the fraudulent transaction than the branch being produced by the rest of the participants; as long as the entity creating the fraudulent transaction is likely the only one with the incentive to create the branch containing the fraudulent transaction, the computational cost of the creation of that branch may be practically infeasible, guaranteeing the validity of all transactions in the blockchain. In some embodiments, where the algorithm producing the blocks (a-b) involves a cryptographic hash using a well-designed hashing algorithm, attempts to avoid the computational work necessary to create the hashes by simply inserting a fraudulent transaction in a previously created block may be thwarted by the "avalanche effect," whereby a small alteration of any data within the blockchain causes the output of the blockchain to change drastically; this means that alterations are readily detectable to any person wishing to validate the hash of the attempted fraudulent block.

In another embodiment, the transaction register (a) is an alternative chain. In one embodiment, an alternative chain is one or more blocks that are incorporated into a blockchain, by including at least one hash representing data in the alternative chain in at least one block in the blockchain that is mined; where the mathematical puzzle involved in creating the new block is the production of a new hash, the additional hash in the block may not affect the degree of difficulty, and thus miners are not put at a computational disadvantage incorporating the alternative chain. The alternative chain may be incorporated using one or more Merkle trees. The Merkle tree may be a structure containing a hash of each datum in the alternative chain as leaf notes, with each internal node containing a hash of all of its child nodes; thus, by the avalanche principle, the root of a Merkle tree may be a hash that recursively represents all the data hashed in the Merkle tree, and thus a set of data in the alternative chain, so that incorporation of the root in a block in the blockchain amounts to incorporation of the data from the alternative chain that the Merkle tree represents. A miner may charge a fee for incorporating the alternative chain in a block the miner mines. In an embodiment, verification of a transaction filed in the alternative chain involves first locating the transaction in the alternative chain, verifying its digital signature, and verifying each hash between that location and the blockchain block (for instance by verifying each hash in the Merkle tree from the leaf corresponding to the transaction to the root), verifying the hash of the block incorporating the alternative chain, and then verifying the block up the blockchain as described above.

In some embodiments, the virtual transactions track currency in the form of crypto-currency. In one embodiment, a crypto-currency is a digital currency such as Bitcoin, Peercoin, Namecoin, and Litecoin. The crypto-currency may be decentralized, with no particular entity controlling it; the integrity of the crypto-currency may be maintained by adherence by its participants to established protocols for exchange and for production of new currency, which may be enforced by software implementing the crypto-currency. The crypto-currency may be centralized, with its protocols enforced or hosted by a particular entity. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. The mathematical puzzles may be the same as the algorithms used to make productions of blocks in a blockchain computationally challenging; the incentive for producing blocks may include the grant of new crypto-currency to the miners. Quantities of crypto-currency may be exchanged using crypto-currency transactions as described above.

In some embodiments, the owner of crypto-currency keeps his or her currencies in a crypto-currency wallet, which is defined as any facility that stores crypto-currency. The storage of crypto-currency may be the storage of the public and private keys associated with crypto-currency received by the owner. In some embodiments, the user stores the crypto-currency in a virtual wallet, which is located at what amounts to a "crypto-currency bank"; the virtual wallets are exchanges and firms that are located through the Internet. The virtual wallets may accept fiat as payment and provide the user with crypto-currency or other chosen crypto-currencies to hold within their virtual account. In other embodiments, the user keeps crypto-currency in a local wallet, which is a storage device (i.e. hard drive, memory device) that the user can physically move and store in any manner he or she wants. If a user with a local wallet wants to use his or her crypto-currency the user must hook it back up to a computer device that has wallet software on it and then he or she can move the crypto-currency around. In other embodiments, the user keeps crypto-currency in a physical wallet that stores one or more addresses associated with the crypto-currency in physical form, in addition to the corresponding private keys permitting expenditure as described below, such as a paper wallet in which a user prints out his or her crypto-currency from his or her local wallet storage device or his or her virtual wallet. A paper wallet may be a piece of paper with one or more QR codes on it that, once scanned, can be put on a local or virtual wallet or spent by scanning the QR codes right into a point of sale system. A physical wallet may keep the private and public keys associated with crypto-currency in any code readable by a code scanner as described above.

Wallets may have "cold storage" or "hot storage." Since the rampant hacking and stealing of Bitcoin wallets that has been done firms have created "cold storage." "Cold storage" is storage of one's crypto-currency in a location that is not connected to the Internet and sometimes is not even located where virtual wallets are kept. Virtual wallets refer to "hot storage" or "hot wallet" as a term that their contents are exposed to hackers via the virtual wallets. These "hot wallets" are full of coins being used. References to hot and cold wallets are now main-stream for wallet companies. The ratio of hot to cold wallets is usually 10% or 20% hot and 80% to 90% cold. The transfer either virtually or physically back and forth between the wallets internally to have security confidence. In the end, all kinds of crypto-currency wallets may be place to store private and public keys, confirmed by the blockchain, but equate to funds or fiat currency.

In some embodiments, the private keys associated with transactions are maintained in a private register. The private register may include a data store or data structure permitting the first computing device to retrieve private keys rapidly. The private register (b) may include a database as described above. The private register may include public keys as well; the private register may link the public keys to their corresponding private keys. The private register may include certificates, or information required to create certificates, from one or more certificate authorities that issued private and public keys in the private register; the private register may link certificates or information for creating certificates to the corresponding private or public keys. Persons skilled in the art will be aware of many ways to link one datum to a related datum; for instance, a private key, its corresponding public key, and information identifying an issuing certificate authority may be three cells in a database row in a database included in the private register, so that retrieval of the row using a query specifying any of the three, or a set of data containing any of the three, will produce the other two. The private register may contain additional data; for instance, the private register may contain records describing transactions involving each private or public key, information identifying the entities involved in the transactions, or information identifying the address to which the transactions were conveyed.

In one embodiment of the present disclosure, a blockchain can be accompanied with or built upon through one or more side blockchains. These side blockchains can each originate or emanate from a given block or entry within a blockchain and extend outwards such that the original blockchain contains many different end points. For example, a blockchain may contain five blockchains wherein (1) is an entry for the raw materials of a given part/product, (2) is an entry for the processing of the given part/product, (3) is the processing entity of the given part/product, (4) is a patent associated with the part/product, and (5) is the cost paid to the processing entity. A new blockchain could be added to blockchain 1 identifying the supplier of the raw materials, or a new blockchain could be added to blockchain 3 indicating a certification of the machinery performing the processing on the given part/product. Accordingly, embodiments provide that rather than simply adding blockchains to the end of the fifth blockchain, new blockchains can be added from any one of these five blockchains thereby providing information relevant to that specific blockchain.

In another example, a given part/product may be represented by a main blockchain having multiple blocks, wherein each block in the blockchain is associated with a piece of the given part/product. Each piece may have been supplied from a different supplier and each piece may have its own associated product information, such as its different raw materials, different processes of manufacture, different intellectual property embodied therein, and different costs. In this regard, each block in the main blockchain can be associated with a piece of the given part/product and side blockchains can extend outward from the main blockchain representing that particular pieces product information.

Figure 2:
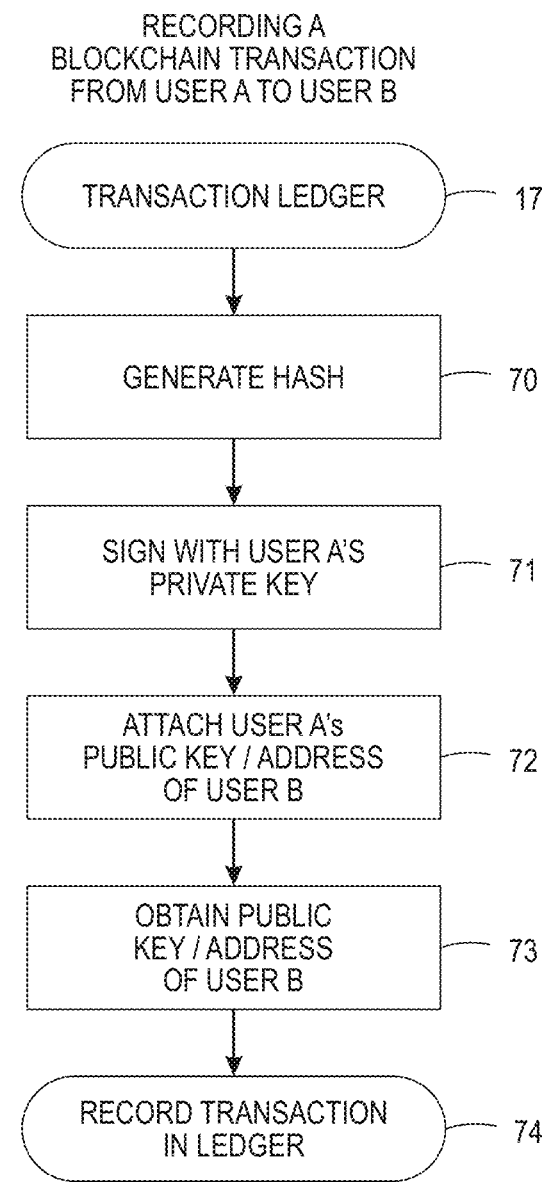
FIG. 2 is a flowchart disclosing the method steps of an embodiment for recording a transaction in a digital ledger.

In the embodiment illustrated in FIG. 2, a blockchain transaction from a first user A to a second user B is recorded in the ledger 17 by first generating a hash 70. The first user A then signs the hash with the first user's private key 71. The first user's public key and the address of the second user B is attached 72. The public key and address of the second user B is obtained 73 and the transaction is recorded in the ledger 74.

Virtual Distributed Ledger System with Traceability Overview.

Turning now to FIGS. 1-34, and in particular FIGS. 1-5B, the present disclosure comprises a system 15 for transparently and securely capturing the satisfactory completion of individual process steps of an additively manufactured part 135 (sometimes known as 3D printing), as the part moves through its processing steps from at least requirements definition to delivery of the final part to the end customer or user 29. Major process steps of record for a newly printed additively manufactured part can be thought of as a virtual inventory or ledger transaction, where block data is pulled from virtual inventory, transformed within the given process step to a new state, and returned to inventory after successful completion of the given process step at the new state which is recorded in the ledger 17. While the present disclosure focuses on an example of an additive manufactured part, substantially the same or similar process steps can also apply to a traditionally (or subtractive) manufactured part.

Each virtual inventory transaction is recorded in a public, private or semi-private blockchain ledger as a transparent, secure and traceable means to prove successful process completion, state change, and authenticity at each inventory point. Major process steps and states of record for a repeat printed additively manufactured part are described below. In this case the original traceable source data fed to the additive manufactured part can be successively reused to generate repeat parts, with the transactions recorded in the blockchain ledger 17. Provenance, authenticity and traceability to source requirements are thus maintained in serial production.

The present disclosure applies blockchain technology to support an all-digital workflow, such that an end user 29 may print a licensed part on his or her certified printer 31, following certified processes to produce final serviceable goods or replacement parts 135 that are fully traceable and can be validated to the original customer 19 and manufacturer requirements 37. Unique identifying transaction identifiers 129 (such as using QR codes representing process hashes) can be encoded within or upon the printed part 135, or otherwise marked during the process steps as needed. This can be achieved in the manufacturing process or through laser marking after successful final inspection, for example.

A preferred embodiment of the disclosure allows for traceability of a part to source requirements in additive manufacturing. This is accomplished by breaking the traceability chain into modules whose location within the supply chain can be reused and globally transported as needed to suit the end user needs within an all-digital workflow.

The disclosed virtual distributed inventory management or ledger system 15 utilizes a plurality of major process steps leading to different states of the subject part in question, represented in the attached figures as blocks. All major process steps represent work to be performed, with inputs into the process and states that are transformed by the process to form work outputs of the process from one step to the next, as shown and discussed in detail below. Completion of a process step and transfer to the next step are defined as virtual transformations.

The process/state management system of the disclosed virtual ledger system 15 maintains a traceability record through a series of transactions 90 permanently sequenced and recorded in a digital transaction ledger 17, such as a blockchain or other public ledger system on a transparent distributed server network 16. Security and authenticity of transactions are enabled and enforced through public-private passkeys used to encrypt and record transactions in a manner that cannot be forged.

Transactions can include one or more inputs, and one or more outputs, in addition to a signature of the process owner, each of which can be independently certified and traced as authentic and approved. Completion of a process step and transfer of ownership to the next process step and state change are defined and recorded by the digital transaction ledger transaction record. For instance, transactions may be recorded and time stamped within a blockchain located on a transparent distributed blockchain server network 16, forming a permanent, immutable and traceable transaction record for a 3D-printed part 135.

The final produced part 135 as delivered 60 to the end use 29 preferably encodes a final unique transaction ID 129 upon and/or within the part 135. This transaction ID 129 is in a form such that it can be readily inspected to inform the end user 29 of the authenticity of the part 135 in addition to the compliance of such part's manufacturing history. Dependent on the manufacturing method, a hidden ID can also be imparted to further guarantee authenticity and detect counterfeits. Knowledge of this transaction ID and a query of the transparent blockchain ledger 17 enable full provenance and backward traceability of the part transactions, thereby guaranteeing provenance, authenticity, compliance to requirements, and suitability for end use.

Process States.

With reference to FIGS. 4-17, the major process states 50-60 that are tracked by a disclosed embodiment of the virtual distributed inventory management system 15 for an additive manufacture part include at least the following distinct states, each of which may have its own corresponding inputs and outputs (as shown in FIGS. 8, 9, 13, 14, 15, 18, 19, 22, 23, 26 and 27), and each of which may have its own associated transaction recorded to the digital ledger: customer requirements 50, design implementation requirements 51, manufacturing pre-processing 52, powder procurement and stocking 53, machine calibration parameter generation 54, powder inspection process 55, machine pre-processor transformation 56, 3D printing 57, part post processing 58, part post inspection 59, and part end user delivery 60.

Customer Requirements State.

Figure 6:
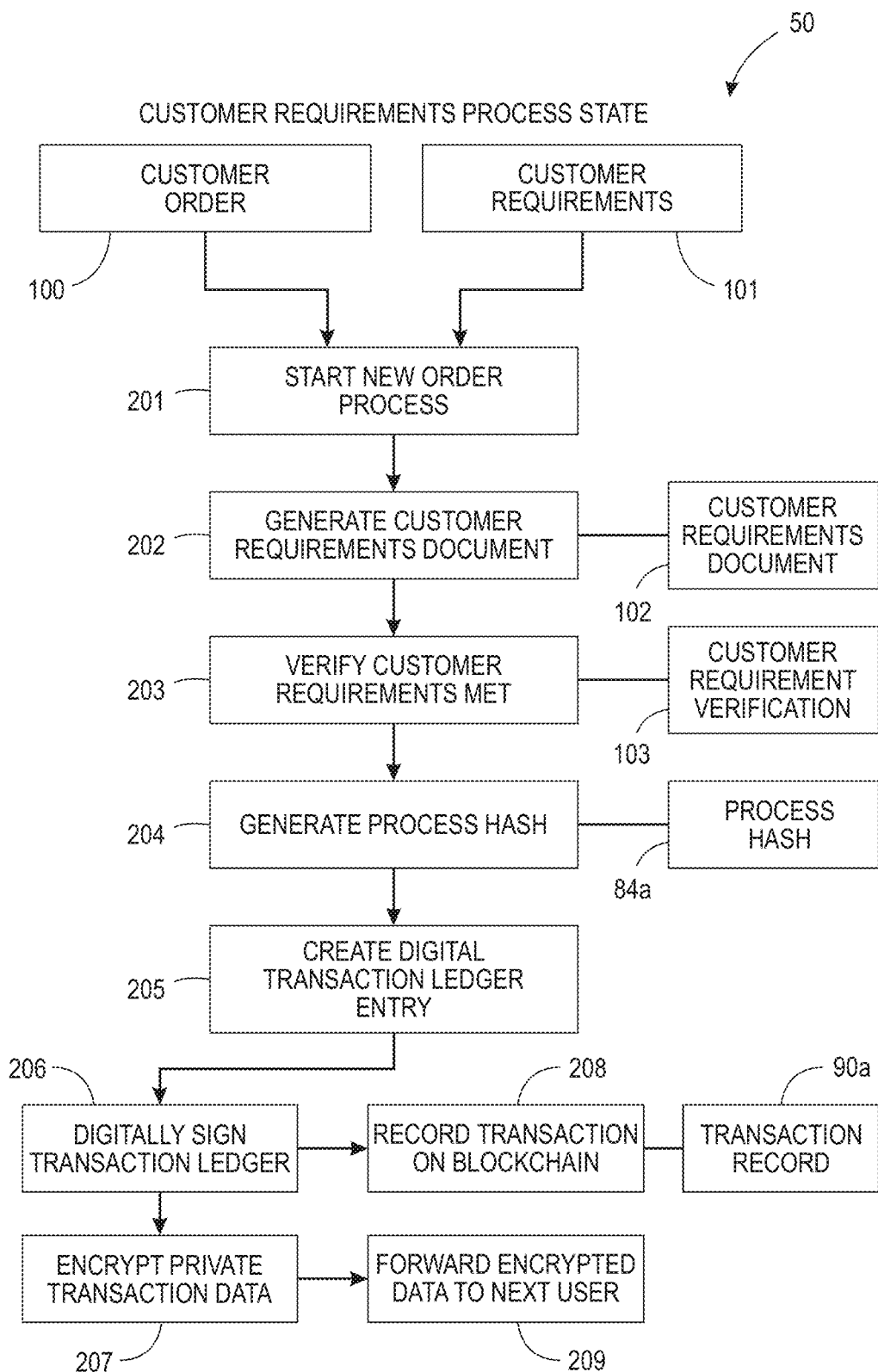
FIG. 6 is a flowchart disclosing the method steps of an embodiment of the customer requirements process state.

Referring to FIGS. 6 and 8, the customer requirements process state 50 begins with receipt of a customer order 100 and a set of customer requirements 101. The customer requirements 101 may be a comprehensive list of specifications and quality controls that are required of a part manufacturer. A first user of the virtual distributed inventory management system 15 takes the customer order 100 and customer requirements 101 and starts a new order process 201. The user generates an internal customer requirements document 202, and digitally signs the transaction ledger 206 and records 208 a first transaction 90a in the digital ledger 17 attesting that the customer requirements document 102 has been created. Upon recordation 208 of this first transaction, the process state is virtually transformed to the subsequent state, which is the design implementation requirements process state 51.

With further reference to FIG. 6, the recording of a transaction may include, for example, verifying that the customer requirements have been met 203 and generating a process hash 204 using the customer requirements, creating a digital transaction ledger entry 205, and signing such hash with a private key 82 of an individual signing the customer requirements state transaction, and recording this transaction information onto the digital ledger at a specified address. The specific transaction information recorded onto the digital ledger 17 may include the above-mentioned process hash 84a alone, or may also or alternatively include certain information derived from the customer requirements, such as a part serial number 113 and a part model number 114, as will be further described below with reference to subsequent process states. Private transaction data may be encrypted 207 and forwarded to the next user 209.

Alternatively, the transaction may be recorded via a cryptocurrency transaction, with a first user associated with a first process state transferring a nominal amount of cryptocurrency to a second user associated with a second process state, along with a unique transaction identifier. For instance, a first user associated with the customer requirements state and in charge of generating the customer requirements document may confirm that this process is completed by transferring a nominal amount of Bitcoins to a second user associated with the design implementation requirements state, while affixing the above-referenced customer requirements hash to the Bitcoin transaction's OP RETURN_opcode.

Design Implementation Requirements State.

Figure 7:
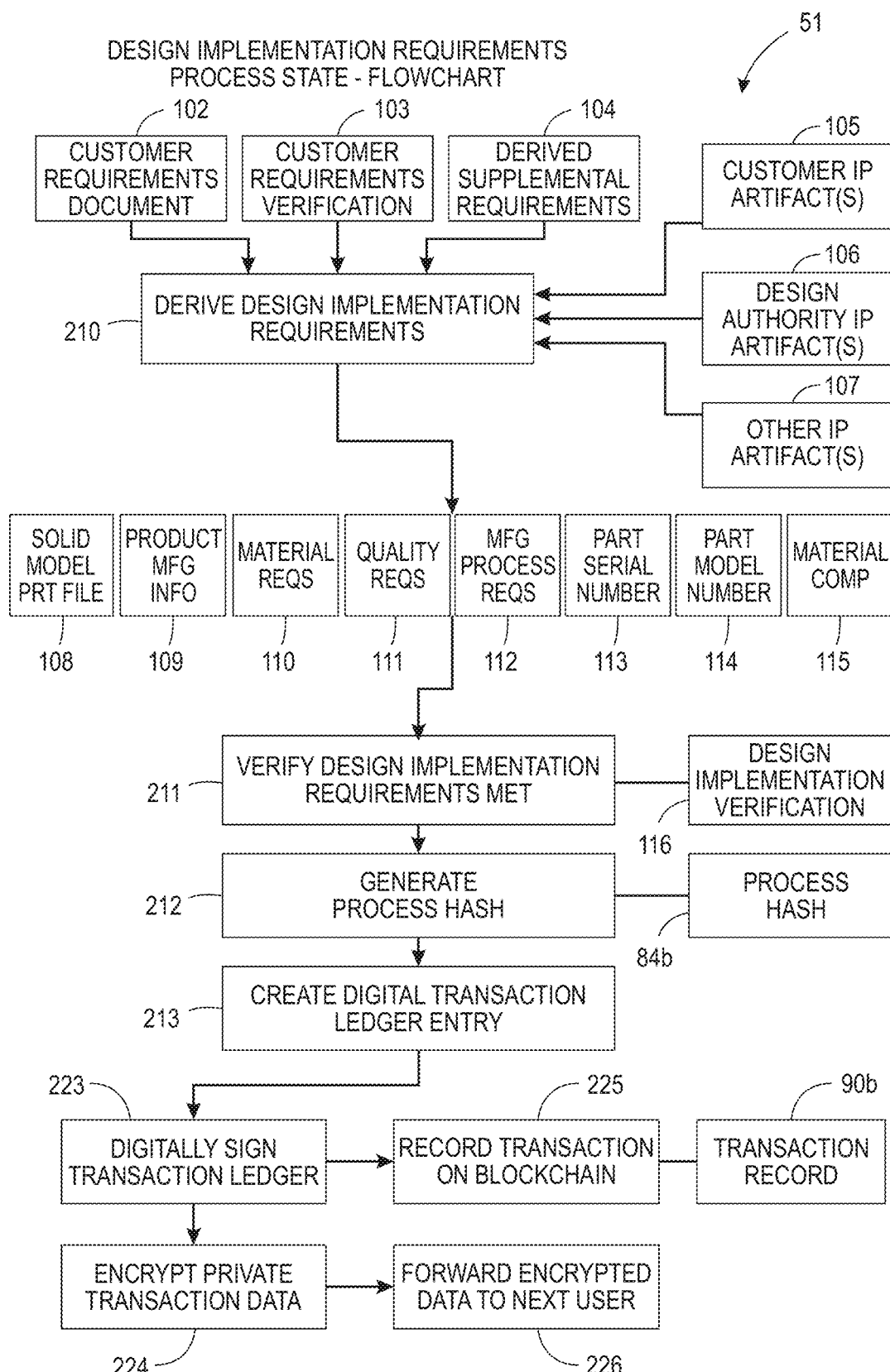
FIG. 7 is a flowchart disclosing the method steps of an embodiment of the design implementation requirements process state.

Turning to FIGS. 7 and 9, once the customer requirements process state 50 has been certified via the above referenced transaction data being recorded 208 to the digital ledger 17, the virtual transformation enters the design implementation requirements state 51. Accepted as inputs at this state are the previous state's output 102 of the customer requirements document step 202, in addition of any supplemental derived requirements 104 that may be specific to the manufacturer. For instance, the manufacturer may have its own sets of product specifications and quality controls above and beyond those required by a customer and outlined in the customer requirements document 102. Further inputs may include the customer requirements verification 103 from the verification process step 203 and any intellectual property rights or artifacts, such as customer IP artifacts 105, design authority intellectual property artifacts 106 and third party IP artifacts 107.

From the customer requirements 102 and any supplemental requirements 104, together with any customer requirements verification 103 and IP rights 105, 106 and 107, at least the following pieces of information 37 are preferably produced or derived 210 at the design implementation requirements state: a geometry definition and solid model of the part 108, for example in the form of a file format of a CAD program which creates design parts and assembly processes, such as a PRT file of PTC Pro/Engineer; product manufacturing information 109, such as of the size, weight, strength, or geometry of a part; material requirements 110, such as material composition 115, including without limitation aluminum (AlSi10Mg), titanium (Ti 6Al4V), cobalt chrome, inconel 625 & 718, maraging steel (MS1), stainless steel (15-5PH, 17-4PH, 316L), hastalloy-X, copper C18150 and aluminum Al7000, and mixture ratio thereof for additive manufacturing material mixtures; quality requirements 111, such as resolution and tolerances; manufacturing process requirements 112, such as additive printer machine make and/or model; part model number 114; and part serial number 113.

Similar to the customer requirements process state 50, certification of the design implementation requirements process state preferably concludes with the recording of a transaction 90b in the digital ledger such as a blockchain 17. For example, the recording of a transaction may include, verifying that the design implementation requirements have been met 211 and generating 212 a process hash 84b using the design implementation requirements and the customer requirements as inputs, creating a digital transaction ledger entry 213, signing the hash with a private key 82 of an individual signing the design implementation requirements state transaction, and recording this transaction information onto the digital ledger 17 at a specified address. Private transaction data may be encrypted and forwarded to the next user 217.

In order to facilitate the tracking of a specific part through its entire product lifecycle, it is preferable that the design implementation requirements state transaction 90b also reflects the previous customer requirements state transaction 90a. This can be accomplished a number of different ways, for instance, if a unique part serial number and part model number was generated and recorded in the customer requirements state transaction 50, the same part serial number 113 and part model number 114 can be used when recording the design implementation requirements state transaction 90b. Alternatively, the design implementation requirements state transaction 90b can refer to the previous transaction 90a by including reference to the address at which the previous transaction is recorded on the digital ledger 17. In a case where a cryptocurrency transaction was used to mark the recording of the customer requirements state transaction 50, then the certifier of the design implementation requirements process state will simply transfer the same nominal amount of cryptocurrency received by the customer requirements process state certifier, affix the newly generated design implementation requirements process hash 84b to the transaction, and send the cryptocurrency to the next user or users associated with the manufacturing pre-processing requirements state.

Manufacturing Pre-Processing Requirements State.

Figure 10:
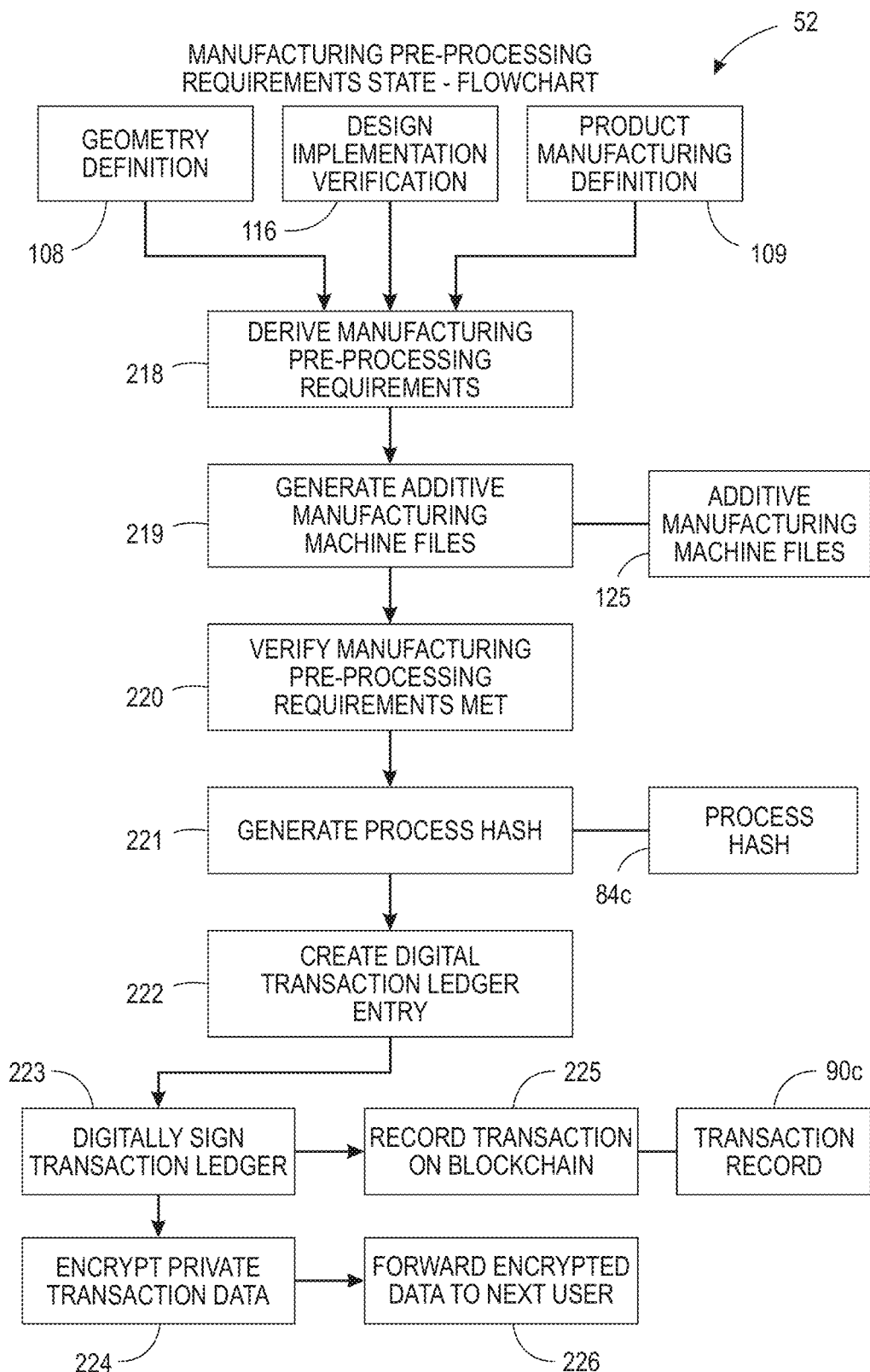
FIG. 10 is a flowchart disclosing the method steps of an embodiment of the manufacturing pre-processing requirements process state.

Referring to FIGS. 10 and 13, the manufacturing pre-processing requirements state 52 begins with receipt of at least certified computer aided design geometry files 108, such as a solid model PRT file having a 3D geometry definition, in addition to product manufacturing information 109, such as the size, weight, strength, or geometry of a part. This information will be used to generate 219 as an output a file or set of files 125 that can be read by a 3D printer 31, such as stereolithography file (STL), additive manufacturing file (AMF), or other similar file format. Further inputs may include the customer requirements verification 116 from the verification process step 211.

Certification of the manufacturing pre-processing requirements process state 52 preferably concludes with the recording of a transaction 90c in the digital ledger 17. For example, the recording of a transaction may include deriving the manufacturing pre-processing requirements 218, generating 219 additive manufacturing files 125, verifying that the manufacturing pre-processing requirements have been met 220 and generating 221 a process hash 84c using any desired combination of the manufacturing pre-processing requirements, the design implementation requirements 37 and the customer requirements 101 as inputs, creating a digital transaction ledger entry 222, signing the hash 223 with a private key 82 of an individual signing the manufacturing pre-processing requirements process state transaction, and recording this transaction information 90c in the digital ledger 17 at a specified address 225. Private transaction data may be encrypted 224 and forwarded to the next user 226.

Similar to the process described with respect to the customer requirements, the specific transaction information recorded onto the digital ledger 17 may include the above-mentioned process hash 84c alone, or may also or alternatively include certain information derived from any of the customer requirements, design implementation requirements, or manufacturing pre-processing requirements, such as a part serial number 113 and a part model number 114. Alternatively, a state transformation can take place via a cryptocurrency transaction as described above.

Powder Procurement and Stocking Process State.

Figure 11:
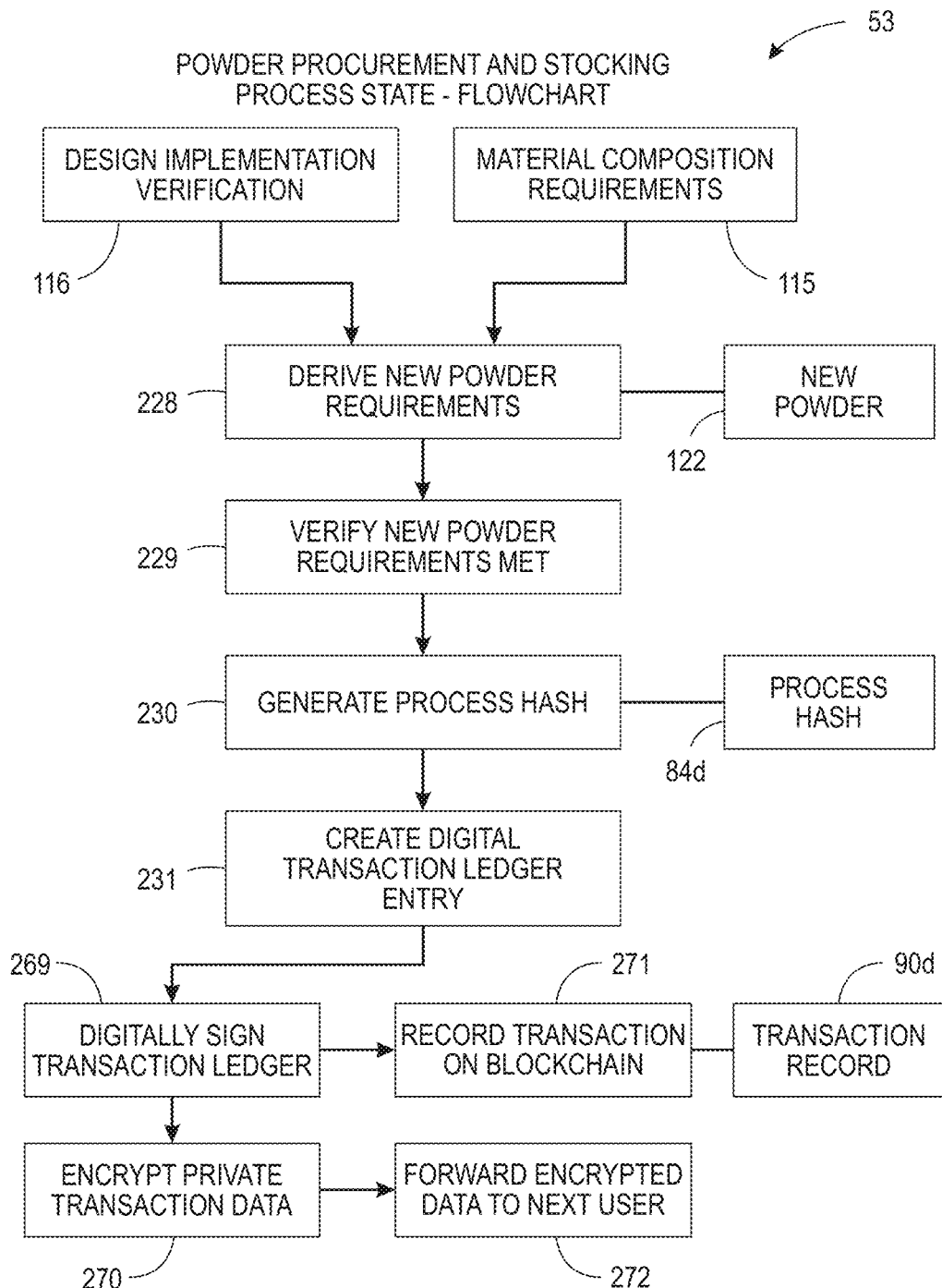
FIG. 11 is a flowchart disclosing the method steps of an embodiment of the powder procurement and stocking process state.

Turning to FIGS. 11 and 14, after the manufacturing pre-processing requirements have been certified as completed, the system transforms to the powder procurement and stocking process state 53. The material composition parameters 115 generated from the previous process state 51 are received, and such parameters are preferably used to generate 228 new powder requirements 122 to be sent to the 3D printer 31.

Certification of the powder procurement and stocking process state preferably concludes with the recording of a transaction 90d in the digital ledger 17. For example, the recording of a transaction may include verifying that the new powder requirements have been met 229, generating 230 a process hash 84d using any desired combination of the powder procurement and stocking requirements, the manufacturing pre-processing requirements, the design implementation requirements and the customer requirements as inputs, creating a digital transaction ledger entry 231, signing such hash with a private key 82 of an individual signing the powder procurement and stocking process state transaction, and recording this transaction information in the digital ledger 17 at a specified address. Private transaction data may be encrypted and forwarded to the next user. As will be readily evident with respect to any and all of the process states, the transaction log 17 may include the process hash 84 alone, or may include reference to any of the specific information derived thus far throughout the process.

Machine Calibration Parameter Generation State.

Figure 12:
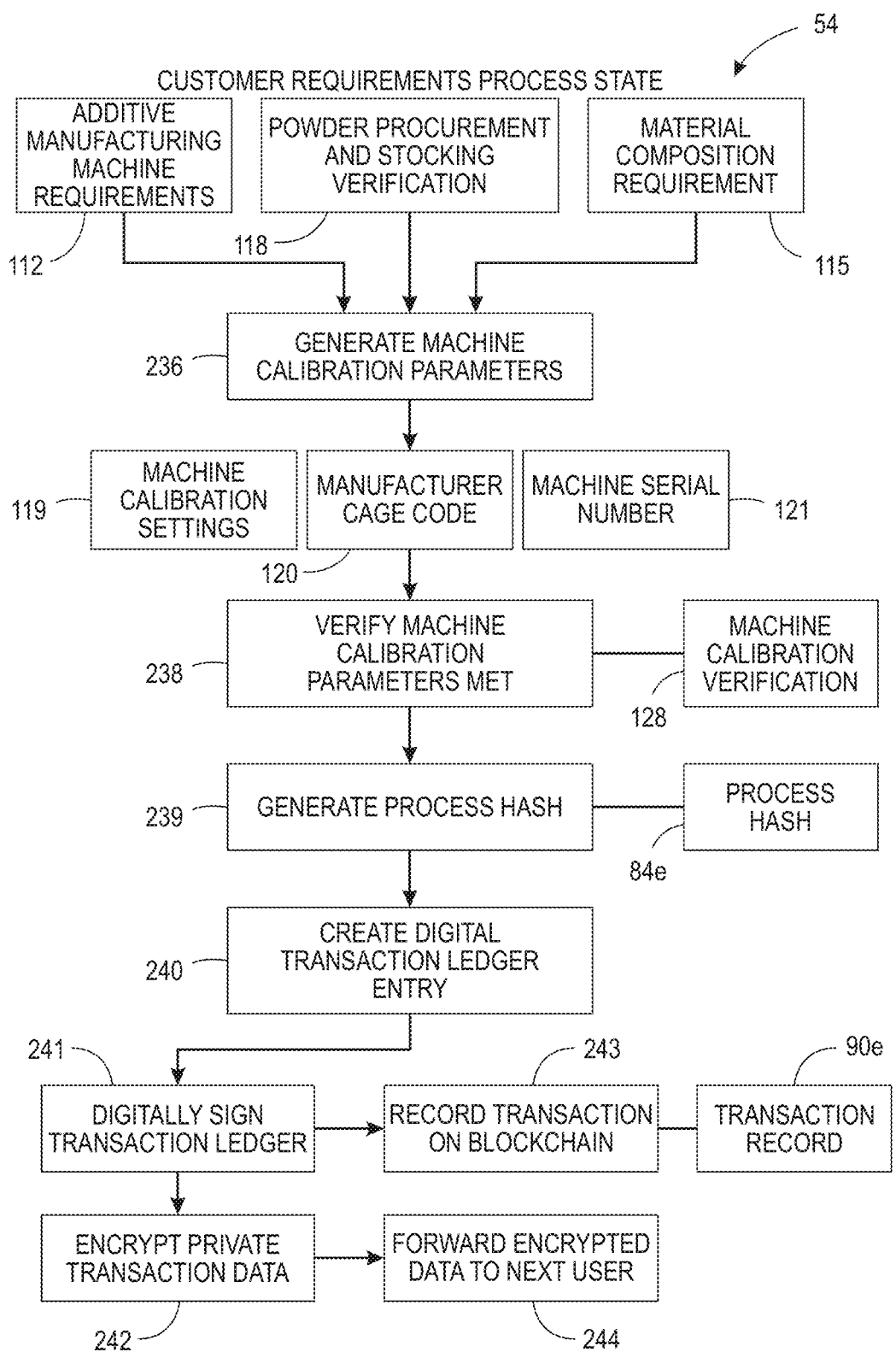
FIG. 12 is a flowchart disclosing the method steps of an embodiment of the machine calibration parameter generation process state.

Referring now to FIGS. 12 and 15, coincident with or after certification of the power procurement and stocking process state 53, the disclosed method virtually transforms to the additive manufacturing machine calibration parameter generation state 54. By receiving the material requirements 115 and the manufacturing pre-processing requirements 112, a user is able to generate, for example, specific machine calibration settings 119, such as specific composition of materials, melting point, powder size, powder purity, bulk density, or Reynolds' dilatancy; a required machine serial number used for manufacturing 121; and a manufacturer Commercial and Government Entity (CAGE) code 120.

Certification of the machine calibration parameter generation state preferably concludes with the recording 243 of a transaction 90e in the digital ledger 17. For example, the recording of a transaction may include verifying that the machine calibration parameters have been met 238, generating 239 a process hash 84e using any desired combination of the derived machine calibration parameter generation requirements, the powder procurement and stocking requirements, the manufacturing pre-processing requirements, the design implementation requirements and the customer requirements as inputs, creating a digital transaction ledger entry 240, signing such hash 241 with a private key 82 of an individual signing the subject state transaction, and recording this transaction information in the digital ledger 17 at a specified address. Private transaction data may be encrypted 242 and forwarded to the next user 244.

Powder Inspection Process State.

Figure 16:
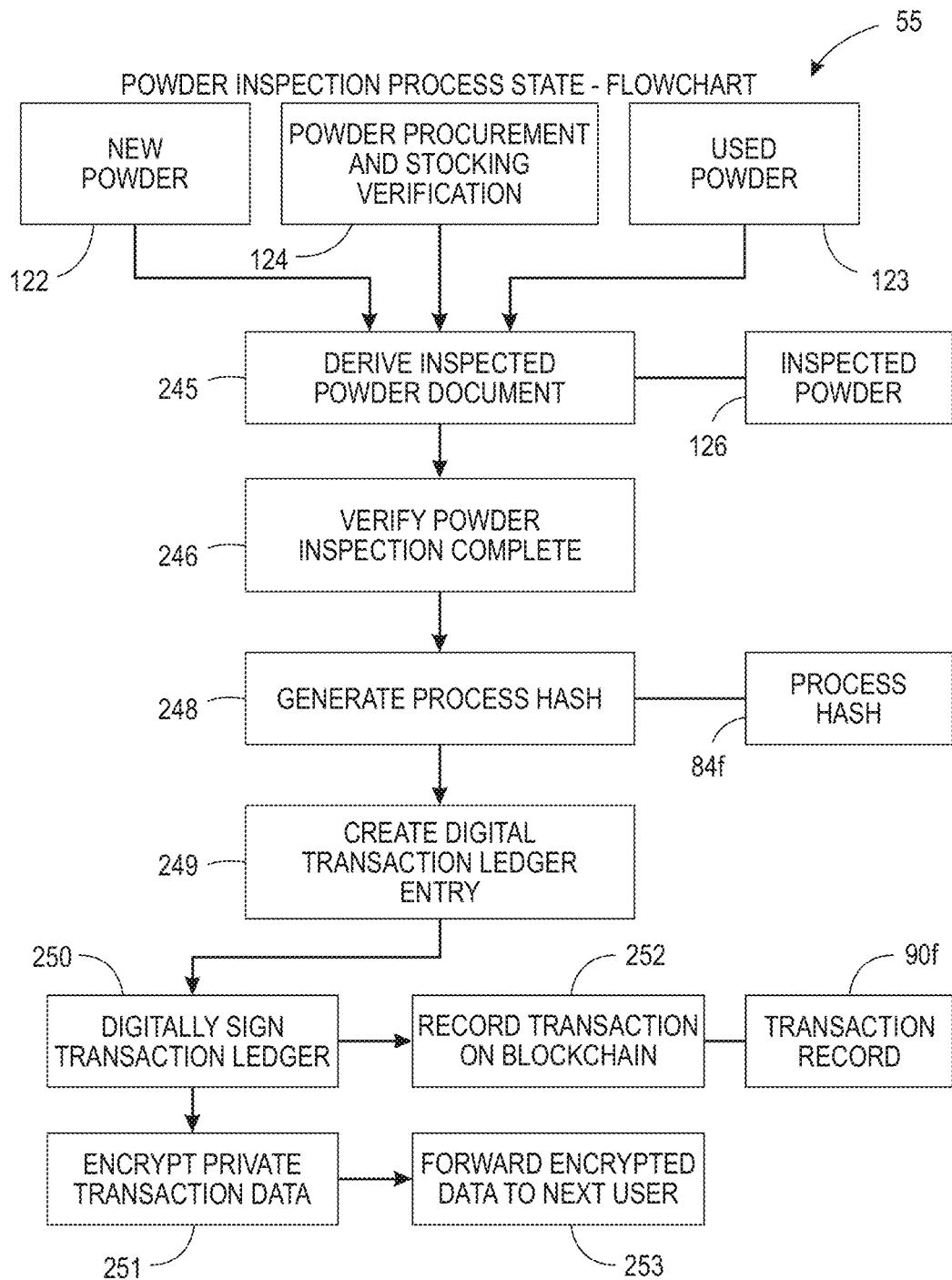
FIG. 16 is a flowchart disclosing the method steps of an embodiment of the powder inspection process state.

Now referring to FIGS. 16 and 18, after the powder procurement and stocking process has been certified, the system transforms to the powder inspection process state 55. New powder requirements 122 from processing state 53 are combined with the known used powder left over from previous additive manufacturing machine calibrations 123 in order to certify that machine powder has been inspected 245. In this respect, a manufacturer will be able to track the precise amount of powder that is used throughout the generation of multiple parts, which may be useful for tracking the quantity of parts printed. As with the previous states, certification of the powder inspection process state 245 is preferably accomplished via the recording 252 of a transaction 90f in the digital ledger 17 in a manner similar to that described above.

For example, the recording of a transaction may include verifying that the powder inspection has been completed 246, generating 248 a process hash 84f using any desired combination of the derived machine calibration parameter generation requirements, the powder procurement and stocking requirements, the manufacturing pre-processing requirements, the design implementation requirements and the customer requirements as inputs, creating a digital transaction ledger entry 249, signing such hash 250 with a private key 82 of an individual signing the powder inspection state transaction, and recording this transaction information in the digital ledger 17 at a specified address. Private transaction data may be encrypted 251 and forwarded to the next user 253.

Product Identifier Creation.

Figure 29:
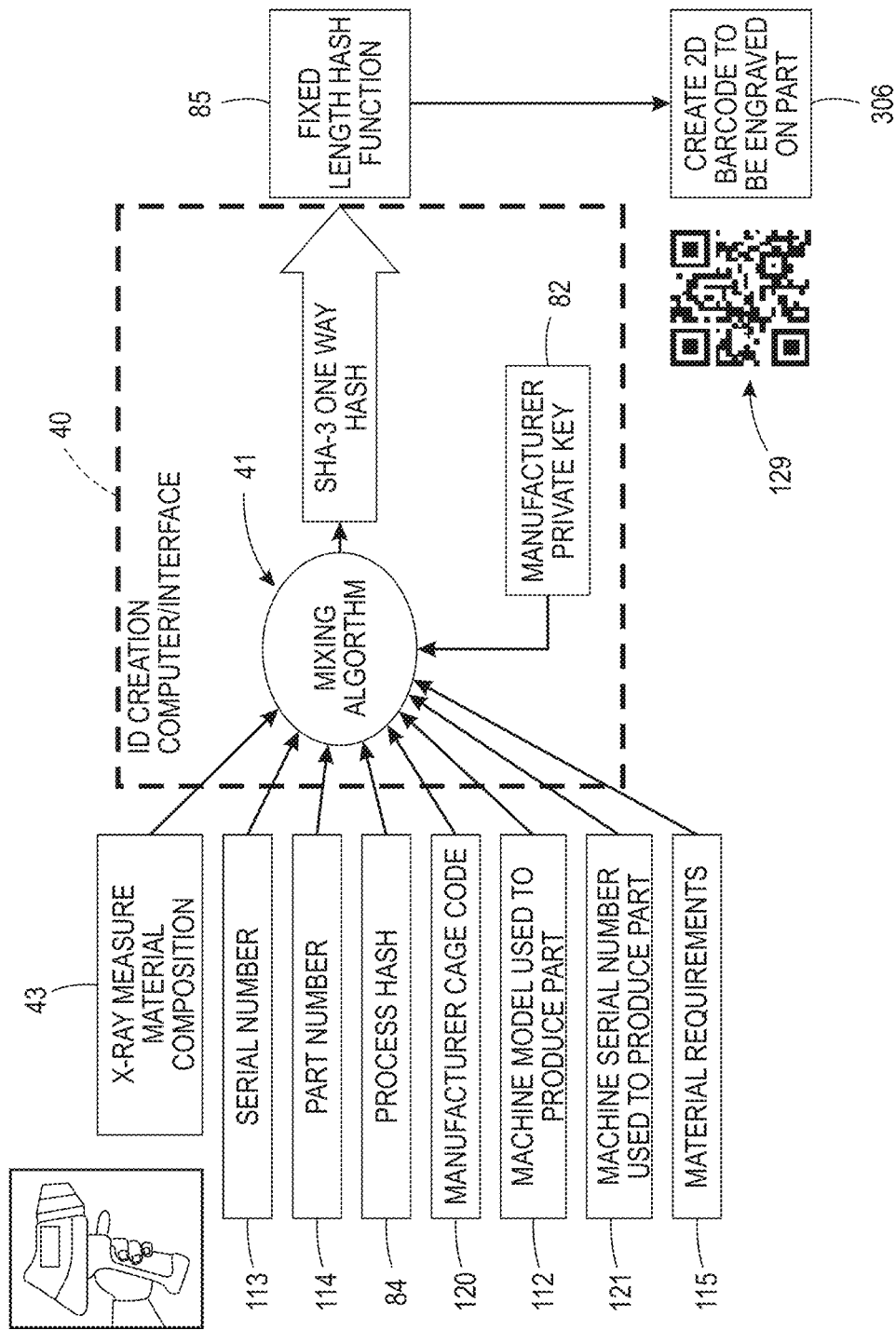
FIG. 29 is a schematic diagram showing an embodiment of a unique part identifier generation for the disclosed virtual distributed ledger system.
Figure 30:
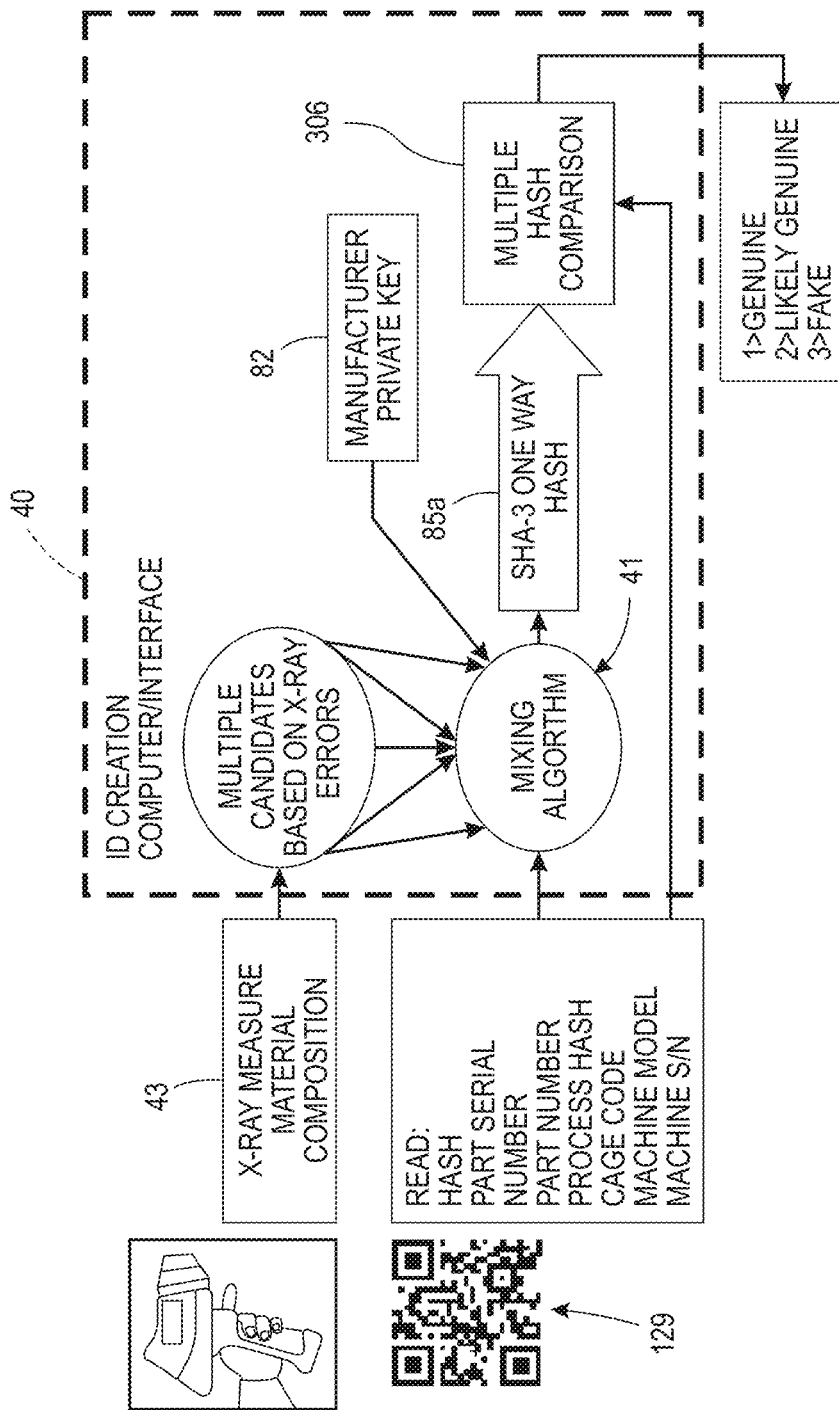
FIG. 30 is a schematic diagram showing an embodiment of a part authentication method for the disclosed virtual distributed ledger system.

As illustrated with respect to FIG. 29, at this stage of the process, all manufacturing requirements that are necessary for an additive manufacturer to print the part have been derived and certified. However, prior to that process state being transformed to the printing stage, it is desired that the derived part specifications be used to create 306 a unique part ID number, which may be used for authentication purposes, as described below in further detail. For instance, a unique part ID number may be created via a ID creation computer interface 40 by generating a process hash 85 using as inputs the part serial number 113, the part model number 114, the derived manufacturing process requirements 112, the machine serial number to be used for additive manufacture 121, a process hash 84a-f from any of the previous process states, the part material composition requirements 115, and the manufacturer CAGE code 120. From the resulting unique ID, a 2D or 3D bar code or glyph 129 can be generated for future etching onto the final additive manufactured part, or printed directly into the part. Additionally, a certificate of authenticity 305 can be generated at this stage, containing the unique part ID number and reference to any of the above mentioned details specific to this part. Further, certification of a unique product identifier is preferably accomplished via the recording of a transaction in the digital ledger 17 in a manner similar to that described above.

Machine Pre-Processing Transformation State.

Figure 17:
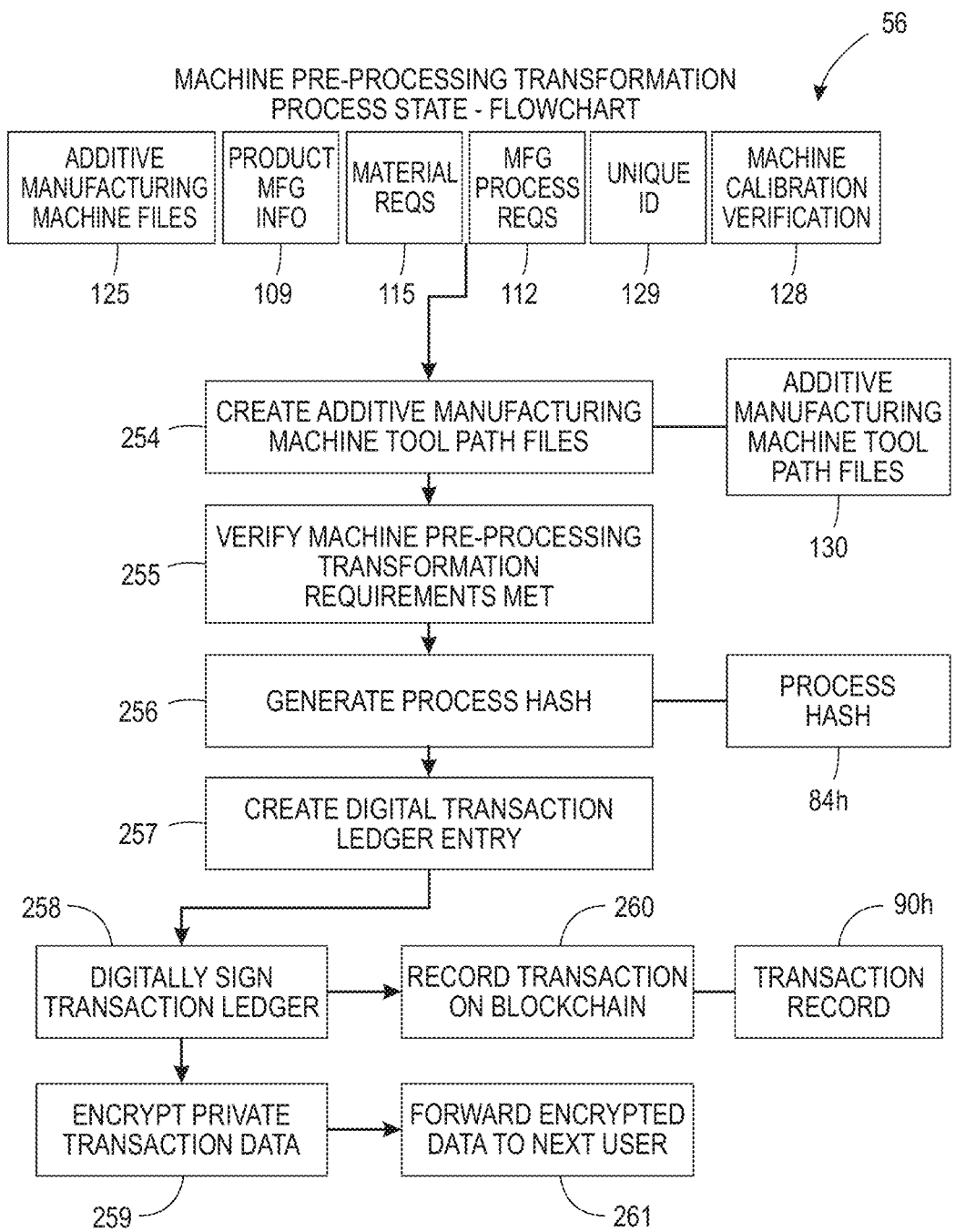
FIG. 17 is a flowchart disclosing the method steps of an embodiment of the machine pre-processing transformation process state.

Turning to FIGS. 17 and 19, once all of the previous states have been certified as complete, the process is ready to proceed to the additive manufacturer, beginning with the machine pre-processing transformation state 56. Accepted as inputs at this stage are the STL file, AMF file, or other equivalent file 125 previously generated in the manufacturing pre-processing requirements state 52; product manufacturing information 109; material requirement/composition information 115; manufacturing process requirements 112, such as specific additive manufacturing machine model; and the unique 2D or 3D bar code or part glyph 129. All are preferably used to create 254 an additive manufacturing machine tool path file 130, which will describe such things as the speed, power, scan rate, scan pattern, and feed rate of the 3D printer 31. As with the previous states, certification of the machine pre-processing transformation process state 56 is preferably accomplished via the recording 260 of a transaction 90h in the digital ledger 17 in a manner similar to that described above.

For example, the recording of a transaction may include verifying that the machine pre-processing transformation requirement has been met 255, generating 256 a process hash 84h, creating a digital transaction ledger entry 257, signing such hash 258 with a private key 82 of an individual signing the machine pre-processing transformation state transaction, and recording this transaction information onto the digital ledger 17 at a specified address. Private transaction data may be encrypted 259 and forwarded to the next user 261.

3D Print Part State.

Figure 20:
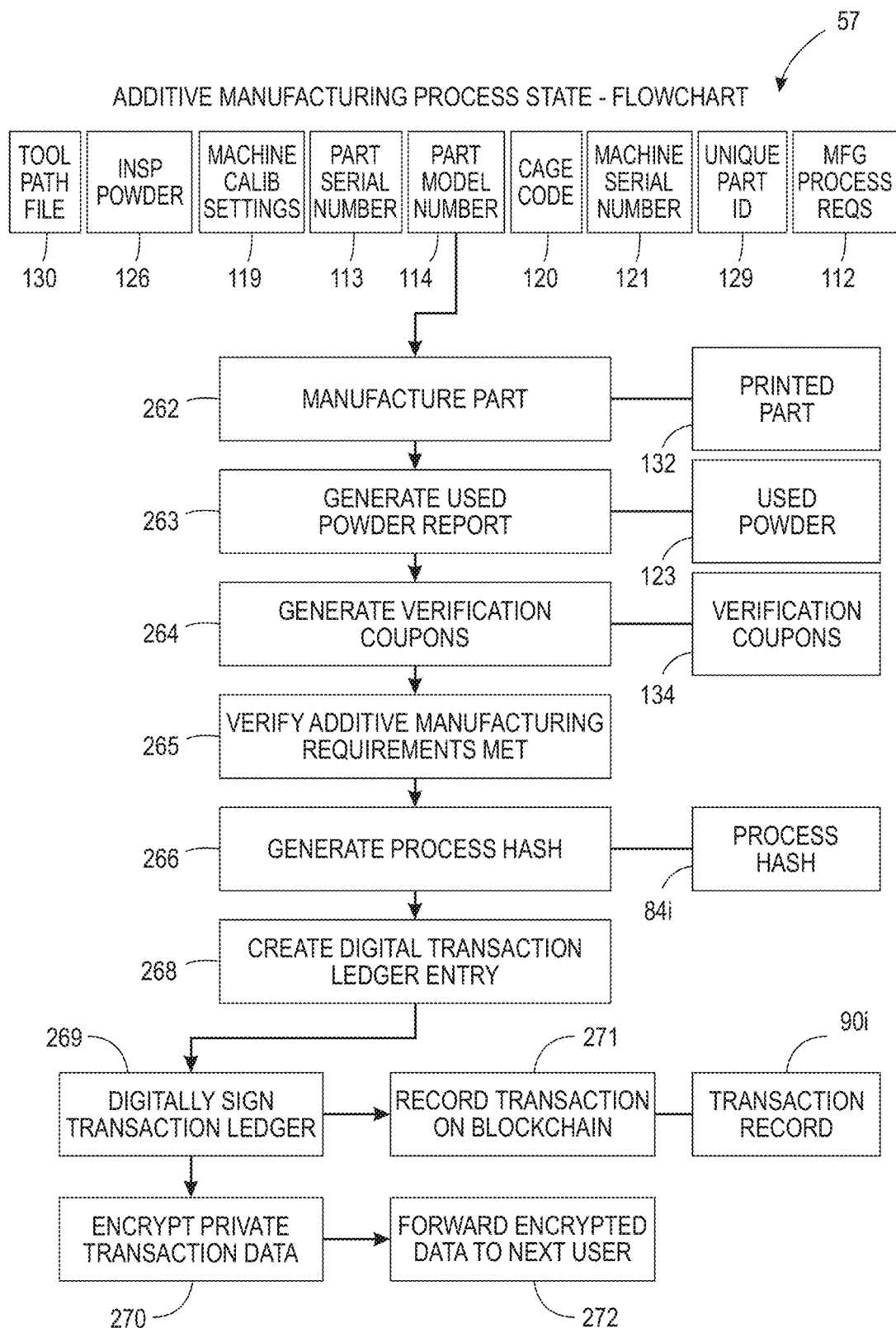
FIG. 20 is a flowchart disclosing the method steps of an embodiment of the additive manufacturing process state.

Now referring to FIGS. 20 and 22, all part design requirements having now been certified, in the additive manufacturing process state 57 the representative part is now ready to be printed 262 on a 3D printer 31. An additive manufacturer will preferably receive the derived machine tool path file 130, the inspected powder certification 126, the additive manufacture machine calibration settings 119, the part model number 114, the part serial number 113, the manufacturer CAGE code 120, the machine serial number 121 used for manufacturing, the manufacturing process requirements 112, and the unique 2D or 3D bar code or part glyph 129. Once a piece part 132 is printed, the 3D print part state additionally calls for the generation 263 of a used powder report 123 and generation 264 of piece part verification coupons 134. As with the previous states, certification of the 3D print part process state 57 is preferably accomplished via the recording 271 of a transaction 90i in the digital ledger 17 in a manner similar to that described above.

For example, the recording of a transaction may include verifying that the additive manufacturing requirements have been met 265, generating 266 a process hash 84i, creating a digital transaction ledger entry 268, signing such hash 269 with a private key 82 of an individual signing the subject state transaction, and recording this transaction information in the digital ledger 17 at a specified address. Private transaction data may be encrypted 270 and forwarded to the next user 272.

Part Post Processing State.

Figure 21:
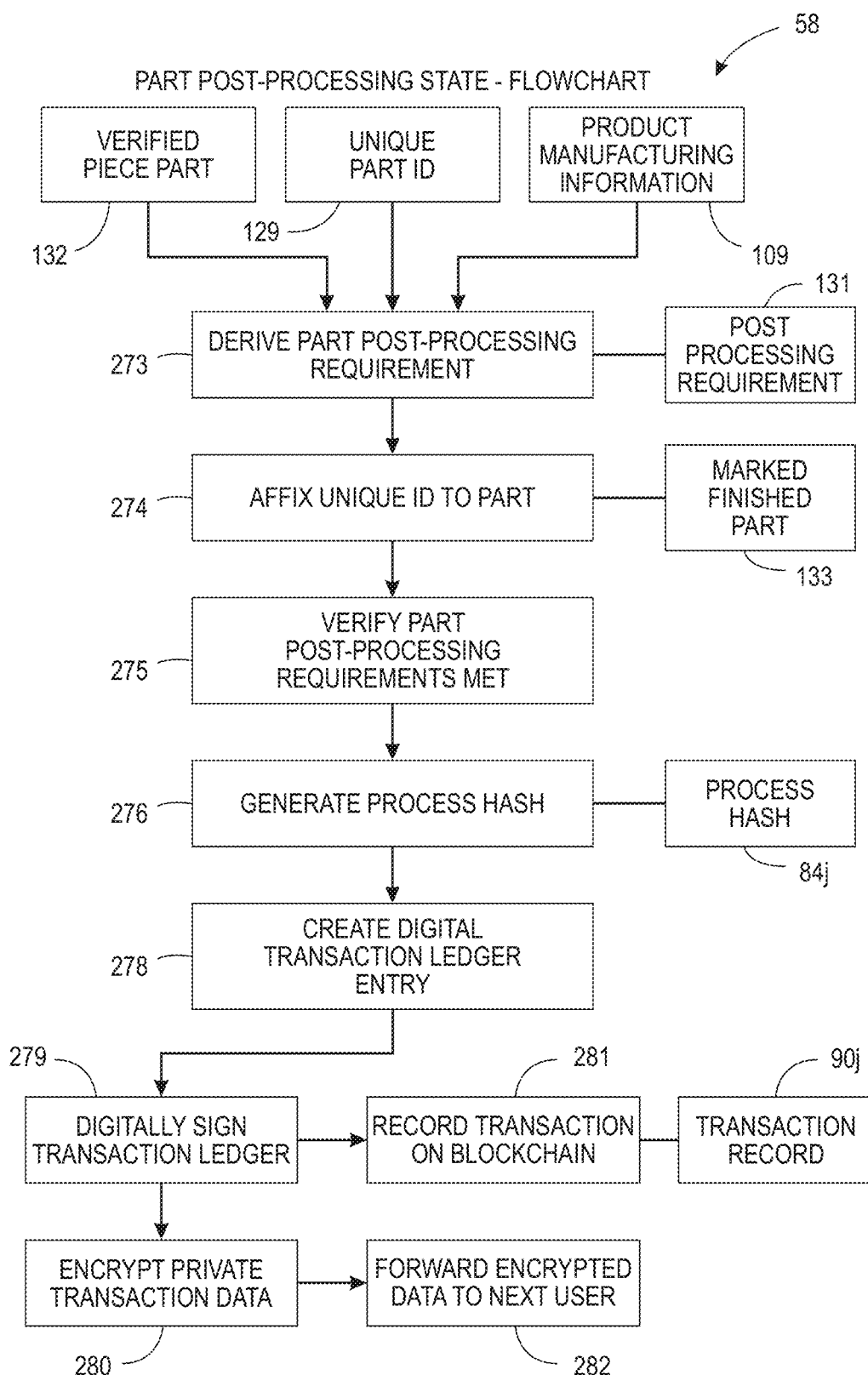
FIG. 21 is a flowchart disclosing the method steps of an embodiment of the part post-processing process state.

Looking now to FIGS. 21 and 23, the part post processing state 58 begins with receipt of the additive manufactured piece part 132 in addition to the product manufacturing information 109 previously derived, and derives part post processing requirements 131 to certify a post processed finished part 133. It is at this stage that the unique 2D or 3D bar code or glyph 129 may be etched or otherwise affixed 274 onto the part for future authentication purposes. Certification of the part post processing process state is preferably accomplished via the recording 281 of a transaction 90*j* in the digital ledger 17 in a manner similar to that described above.

For example, the recording of a transaction may include verifying that the post-processing transformation requirement has been met 275, generating 276 a process hash 84*j*, creating a digital transaction ledger entry 278, signing such hash 279 with a private key 82 of an individual signing the post-processor transformation state transaction, and recording this transaction information in the digital ledger 17 at a specified address. Private transaction data may be encrypted 280 and forwarded to the next user 282.

Part Inspection State.

Figure 24:
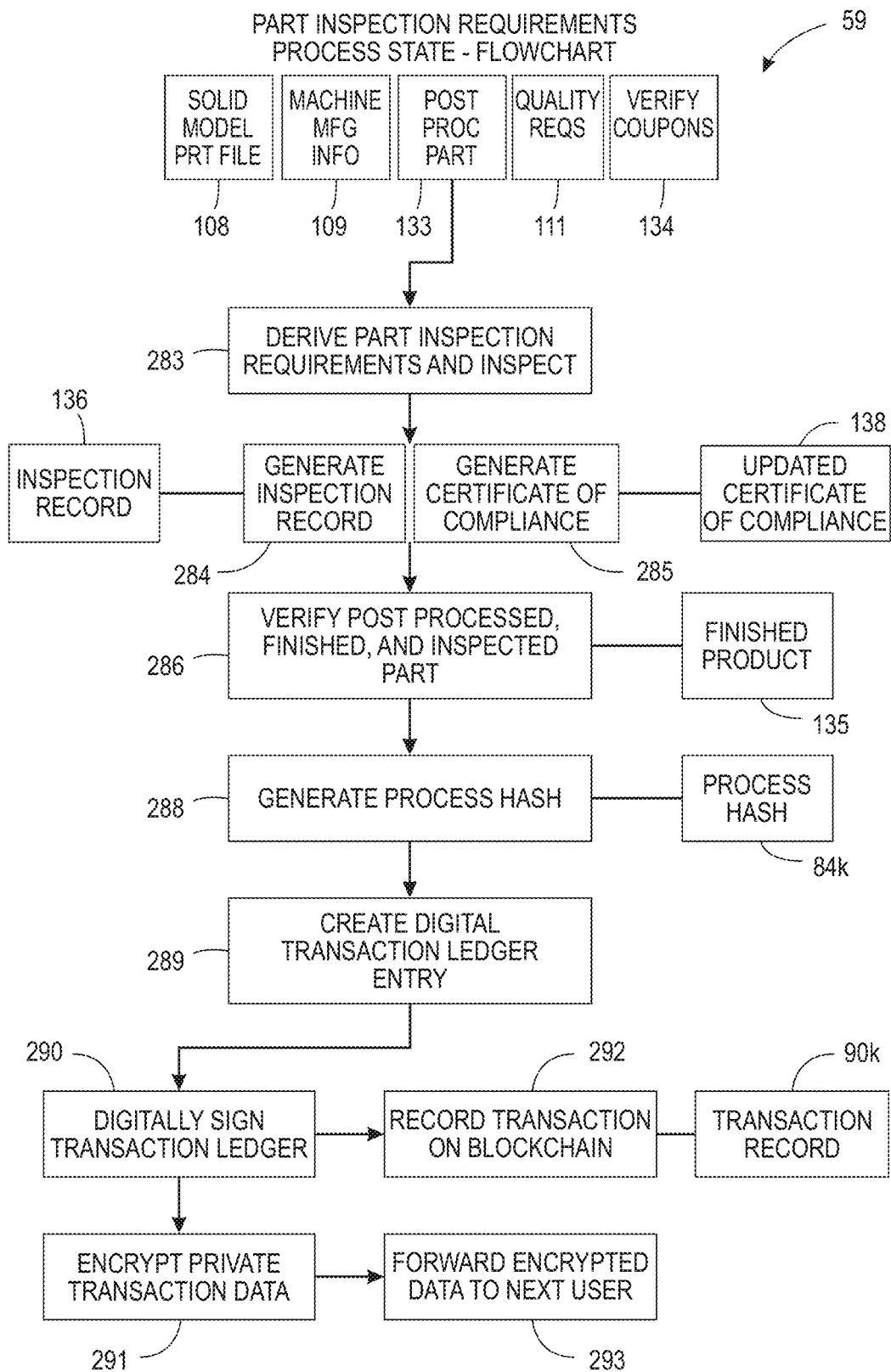
FIG. 24 is a flowchart disclosing the method steps of an embodiment of the preferred part inspection process state.

Turning to FIGS. 24 and 26, after a piece part 133 has been printed and processed, it must be inspected. Thus, the system transforms to the part inspection state 59. The post processed piece part 133 is received along with the solid model geometry files 108, the derived product manufacturing information 109, the part quality requirements 111, and the verification coupons 134; all of the above are preferably used to generate 284 an inspection record 136 and generate 285 a certificate of compliance 138. Accordingly, the process has produced a post processed, finished, and inspected additive manufactured part 135. As with the previous states, certification of the part inspection process state is preferably accomplished via the recording 292 of a transaction 90*k* in the digital ledger 17 in a manner similar to that described above.

For example, the recording of a transaction may include verifying the post processed, finished and verified part 286, generating 288 a process hash 84*k*, creating a digital transaction ledger entry 289, signing such hash 290 with a private key 82 of an individual signing the part inspection state transaction, and recording this transaction information in the digital ledger 17 at a specified address. Private transaction data may be encrypted 291 and forwarded to the next user 293.

Part End User Delivery State.

Figure 25:
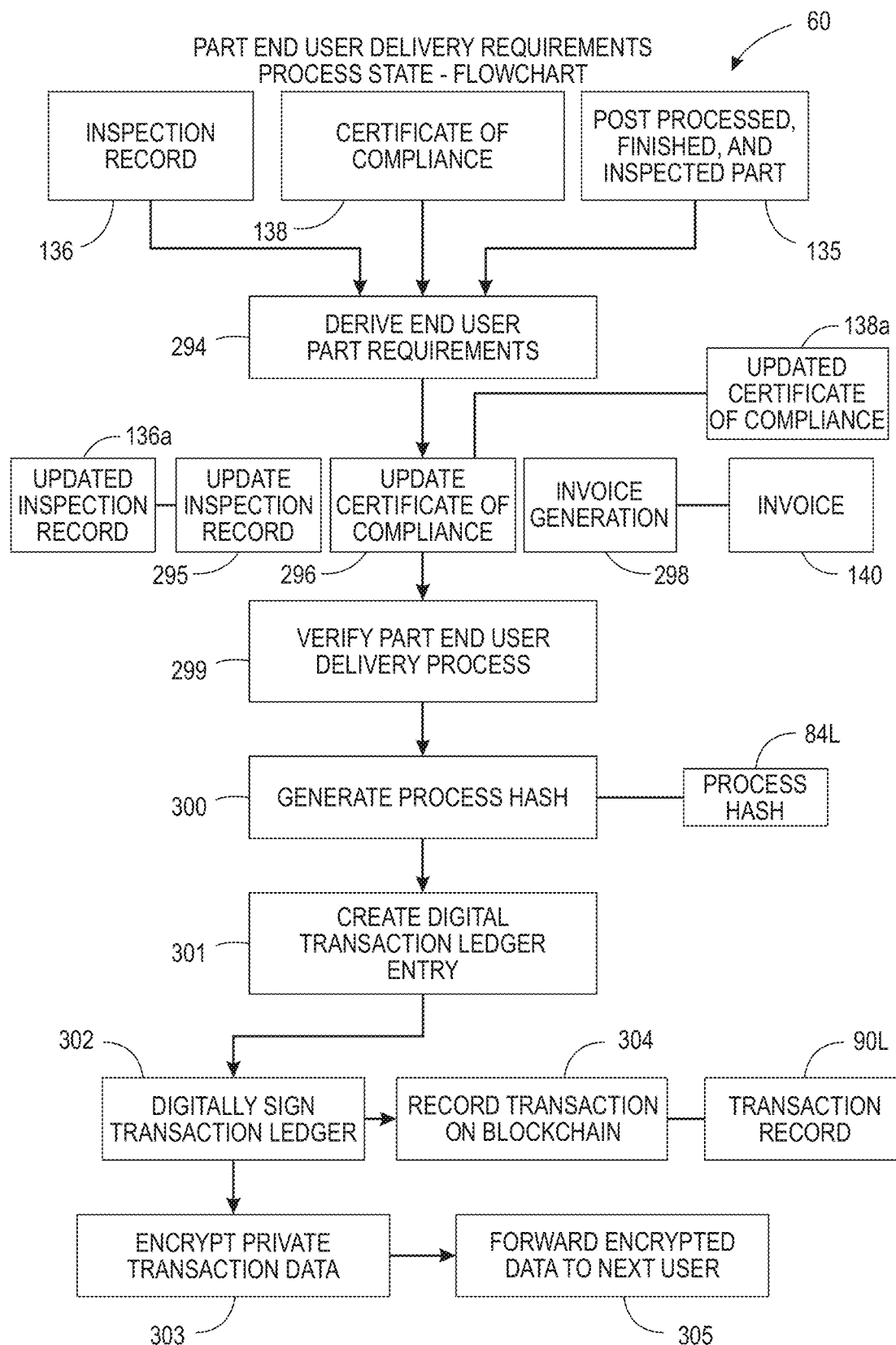
FIG. 25 is a flowchart disclosing the method steps of an embodiment of the preferred part end user delivery requirements process state.
Figure 28:
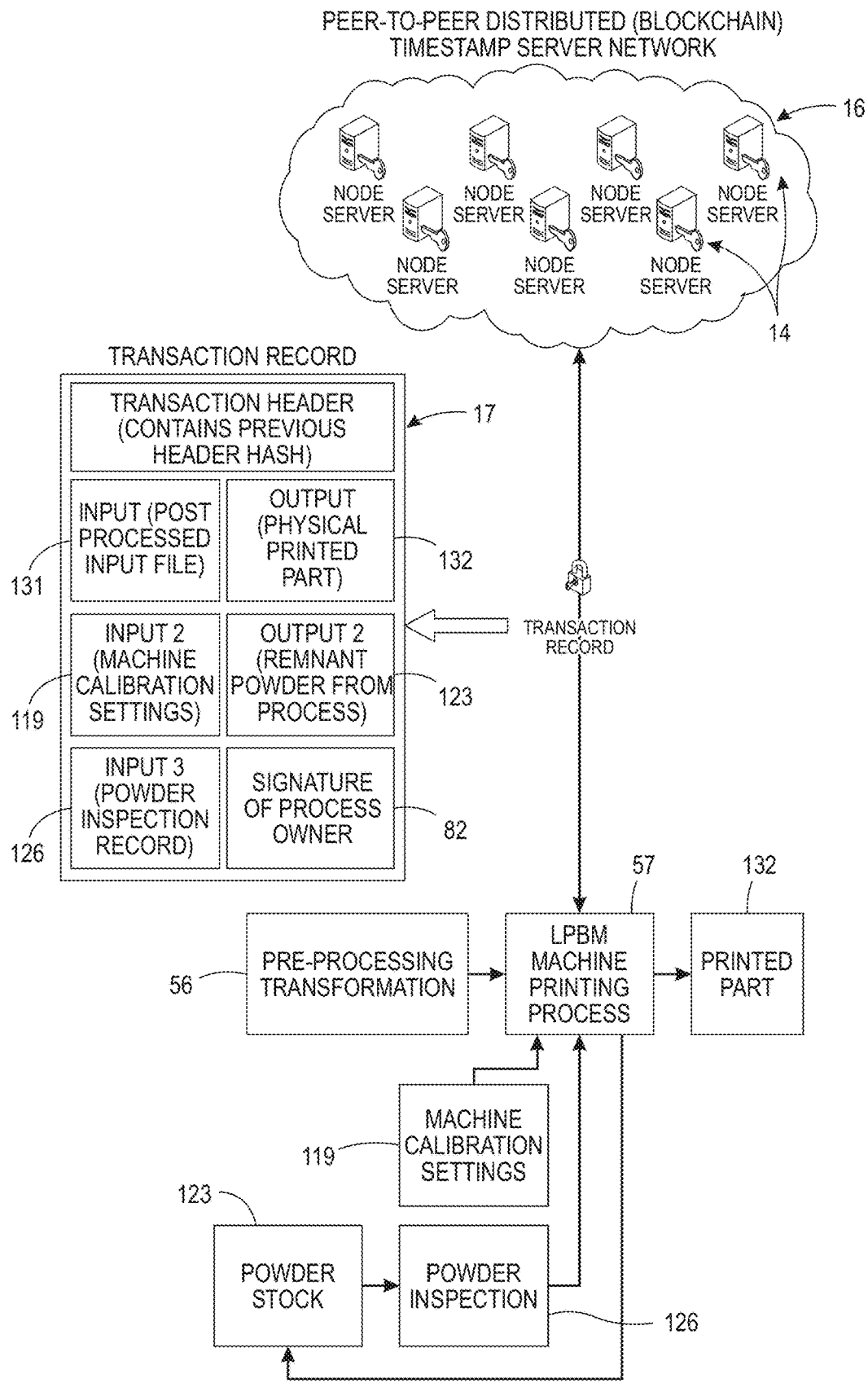
FIG. 28 is a schematic diagram showing an embodiment of a transaction record for the disclosed virtual distributed ledger system.

As shown with respect to FIGS. 25 and 27, the post processed, finished, and inspected part 135 is now ready to be delivered to an end user 29, along with the inspection record 136, the certification of compliance 138, and the certification of authenticity 305. The inspection record and/or the certification of compliance may be updated at this stage to reflect additional inspection and/or installation of the post processed, finished, and inspected part. Additionally, an invoice 140 may be automatically generated 298 at this stage. As with the previous states, certification of the part end user delivery process state 60 is preferably accomplished via the recording 304 of a transaction 90L in the digital ledger 17 in a manner similar to that described above.

For example, the recording of a transaction may include verifying the part end user delivery process 299, generating 300 a process hash 84L, creating a digital transaction ledger entry 301, signing such hash 302 with a private key 82 of an individual signing the end user delivery transformation state transaction, and recording this transaction information in the digital ledger 17 at a specified address. Private transaction data may be encrypted 303 and forwarded to the next user 305, such as an authorized repair and overhaul entity.

Part Authentication Method.

As illustrated in FIGS. 5A, 5B, 29 and 30, the disclosed system makes it easy to authenticate genuine additive manufactured parts and hard to create counterfeit copies. For instance, a unique part identifier 129 can be generated by applying a one way cryptographic hash function to mixing algorithm 41 that accepts a number of unique part inputs, such as a manufacturer's private key 82, part material composition 115, part serial number 113, part model number 114, process hash 84, manufacturer commercial and government entity (CAGE) code 120, machine model number used to produce the part 112, and machine serial number used to produce the part 121. This unique identifier can then be implanted directly onto the 3D printed part, either natively or represented via a barcode, QR code, or some other similar marking means.

Subsequently, when an end user wishes to verify a part as authentic, multiple security measure are in place, making counterfeit copies exceedingly difficult to achieve. For example, the use of a manufacturer private key 82 prevents the creation of a counterfeit hash function output 82. The use of a confidential mixing algorithm 41 prevents use of a (potentially) publically available hash function to create the hash used. The inclusion of a process hash 64 as an input captures process steps and can be proprietary to the processor or manufacturer. Further, the addition of material composition 115 as an input can be checked against something non-obvious such as an X-ray measurement of material composition 43.

The resulting analysis and comparison 306 of hash functions 85 and 85*a* may yield three potential outcomes: a part may either be certified as genuine, may be deemed likely genuine, or may be deemed counterfeit. For instance, if an authenticator is provided all of the inputs that are required with the exception of material composition, the authenticator may take an x-ray measurement of the material composition 43 of the part to obtain the final needed input. By comparing the resulting hash created using the given inputs and the measured material composition 43, a resulting hash 85*a* that exactly matches the hash of the part 85 indicates that the part is genuine. Likewise, if a matching hash can be generated by using a set of material composition inputs that is very similar to (but not exactly matching) the measured material composition, then the part can be deemed to likely be genuine. However, if the hash 85*a* created with the information provided and measured does not match the identifier on the part, then (assuming that the provided inputs are accurate) the part can be deemed to be fake or counterfeit.

Part Servicing, Maintenance, Repair and Overhaul

While embodiments of the present disclosure reference or describe a part that is being manufactured or produced, it should be appreciated that system 15 may continue to be used to assure the provenance and trace the servicing, maintenance, upkeep, repair and/or overhaul of a part and to assure that the materials and manuals used in such servicing of the part are authentic and authorized. Product information of a given part or product can include both original manufacturing information along with information regarding the ongoing maintenance and upkeep of the part or product and/or replacement parts and products, such as maintenance manuals or other after market requirements 65.

For example, a servicing and maintenance requirements process state may begin with receipt of a part maintenance manual. The part maintenance manual may be a comprehensive instruction manual for the servicing, repair and quality controls that are required of an authorized repair facility. The repair facility takes possession of the manual and digitally signs the transaction ledger 17 and records a transaction in the digital ledger 17 attesting that the authentic maintenance manual has been received and is being used. Upon recordation of this transaction, the process state is virtually transformed to the subsequent service and repair state.

The recording of a transaction may include, for example, verifying that the maintenance manual requirements have been received and generating a process hash using the maintenance requirements, creating a digital transaction ledger entry, and signing such hash with a private key of an individual signing the maintenance requirements state transaction, and recording this transaction information onto the digital ledger at a specified address. The specific transaction information recorded onto the digital ledger may include the above-mentioned process hash alone, or may also or alternatively include certain information derived from the maintenance requirements, such as a maintenance manual number. Private transaction data may be encrypted and forwarded to the next user.

The part is now ready to be serviced. The repair facility will preferably receive the maintenance manual and a work order. As with the previous states, certification of the service on the part is preferably accomplished via the recording of a transaction in the digital ledger 17 in a manner similar to that described above. A service record and/or a certification of repair compliance may be created or updated at this stage to reflect the services performed and any additional inspection or replacement parts. Additionally, an invoice may be automatically generated at this stage. As with the previous states, certification of the repaired part is preferably accomplished via the recording of a transaction in the digital ledger 17 in a manner similar to that described above.

Application to a Global Supply Chain.

In an alternative embodiment of the disclosure, a user of the secure and traceable manufactured part system may provide authorization to a manufactured part processor to provide value added services as part of a value added supply chain. This authorization may be granted by a design authority 21 for a final manufactured part as part of the system's provenance of control.

Individual system source authorities are able to grant a higher level of customer access to the provenance and traceability of each manufactured part out of a plurality of manufactured parts comprising a customer's higher level assembly, such that a customer can aggregate the provenance and traceability for each individual item. This aggregation can be recursive up to the highest level of production items and customers. Such capability avoids manufacturer cost and time associated with existing paper trail methods and an existing need for a variety of different computer software systems to find part numbers and give detailed answers to customer supply chain questions.

For example, a provider of flight control systems for an airframe may have one or more manufactured parts in a flight control actuator and may further have one or more manufactured parts in an on-board pump assembly supplied by a third party. By tracking an individual part along every step of a supply chain process, with certifications being attested to and recorded on a blockchain or similar ledger in the manner described above, the provider of flight control systems can then aggregate all relevant part certifications as a single additional entry onto the ledger, using any desired level of granularity. For instance, a user of the disclosed method for secure and traceable manufactured parts may aggregate all subassemblies and components of a flight control system to the flight control level.

Figure 31:
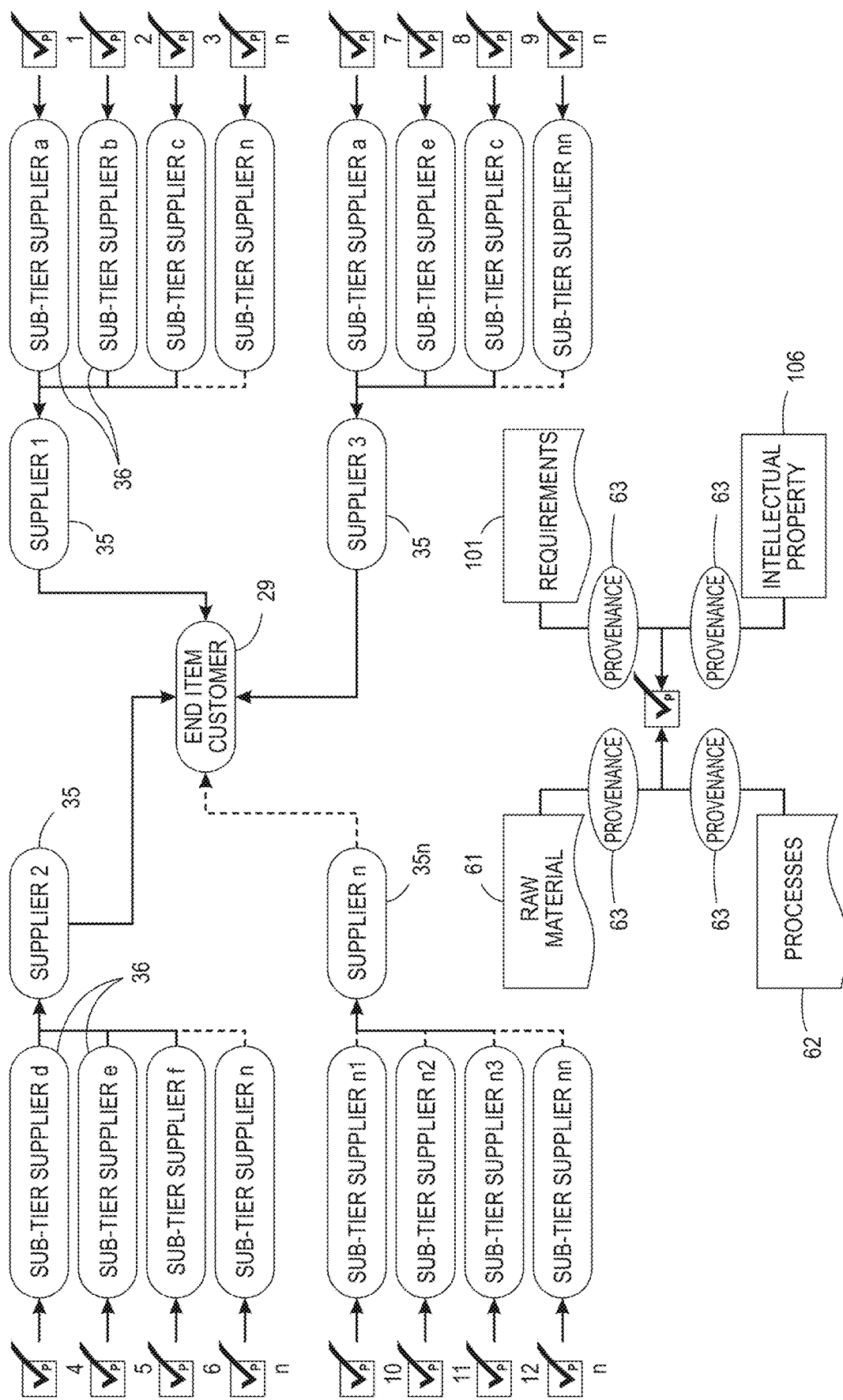
FIG. 31 is an exemplary diagram illustrating an embodiment of supplier authentication suitable for practicing exemplary embodiments of this disclosure.

Reference is now made to FIG. 31, which illustrates an exemplary supply chain having an end item customer 29, suppliers 35 and the sub-tier suppliers 36. As shown in FIG. 31, product information of a given part/product can be verified at the sub-tier supplier level 36 as indicated by the checkmarks such that a given part/product supplied to a supplier 35 and combined with other parts/products from other sub-tier suppliers and then finally supplied to the end item customer 29 can be verified by each party. Embodiments of product information of a given part/product can include part/product requirements 101, actual processes 62 or raw materials 61, custody, remuneration, intellectual property artifacts 106 (e.g., patents, trademarks, copyrights, trade secrets, know-how, etc.), a hash indicating the type of information in the specific block and/or metadata associated with the part/product. The product information of a given part/product can be maintained or entered into a blockchain or ledger (also referred to as a distributed transaction register) by each supplier 35, sub-tier supplier 36, or end item customer 29 within a supply chain such that the information can be later verified or checked. While embodiments of the present disclosure reference or describe a part/product that is being manufactured or produced, it should be appreciated that embodiments are applicable to parts/products that have already been produced or manufactured and those parts/products that require repairs, maintenance, upkeep, servicing, or overhauls. Embodiments provide that product information of a given part/product can include both original manufacturing information along with ongoing maintenance and upkeep of the part/product or replacement parts/products.

The processes 62 used to produce a part, the raw material 61 used to form a part, the requirements (e.g., customer requirements for how the part/product should perform under a particular duty cycle) of the part 101, and the intellectual property need to commercialize the part 106 can be recorded within a blockchain or similar public or private ledger as detailed above. In this regard, each element of product information is available for verification by a supplier 35, 36 within the supply chain and/or the end item customer 29. Embodiments provide that information recorded in the blockchain or ledger can serve multiple purposes. For instance, the blockchain or ledger information can be used to verify whether the part/product was made and produced to certain specifications. This will enable a supplier 35 or end item customer 29 to check that the part/product will be able to meet the supplier's or end item customer's specific needs. For instance, a given part/product may need to be made using a certain process 62 or from a certain raw material 61 such that the given part/product can perform to required duty cycles with appropriate margins. The supplier 35 or end item customer 29 will be able to verify that these raw materials or process were used in the production through the inputs in the blockchain or ledger. Embodiments also provide that a supplier 35 will be able to aggregate the provenance of their sub-tier suppliers 36 and grant access to the provenance and related documentation to their end item customer 29. The end item customer in some embodiments will be able to aggregate the provenance 63 of all their suppliers 35 and their sub-tier suppliers 36. Accordingly, each entity within a supply chain will be able to aggregate the information recorded in the blockchain or ledger that occurred downstream, and also will be able to grant access to that same information to entities upstream.

Embodiments of part/product requirements includes customer requirements 101, and requirements of a design authority 21 or the entity that designed the part/product for a particular item that has yet to be manufactured or produced. The design authority requirements 37 can include process requirements, material requirements, document requirements, part/product performance requirements, intellectual property requirements 106, and sourcing requirements (e.g., from whom materials or services must be obtained from). Embodiments of the actual processes or materials includes processes or materials that were used in the formation or production of the given part/product. Exemplary actual processes or materials includes the manufacturing process, the materials used in manufacturing, the actual documents used to produce the part/product, the part/products actual performance, and the intellectual property used or embodied within the given part/product, the entities that processed or serviced the given part/product, and post processing of the given part/product.

Embodiments of custody includes the list of entities that maintained or had access to both the physical aspects of a given part/product as well as electronic access to digital files (e.g., manuals, 3D print files, purchase orders, etc.) or documents relevant to the given part/product. For example, embodiments of custody include shippers, receivers, manufacturers, and suppliers of all or portions of a given part/product.

Figure 32:
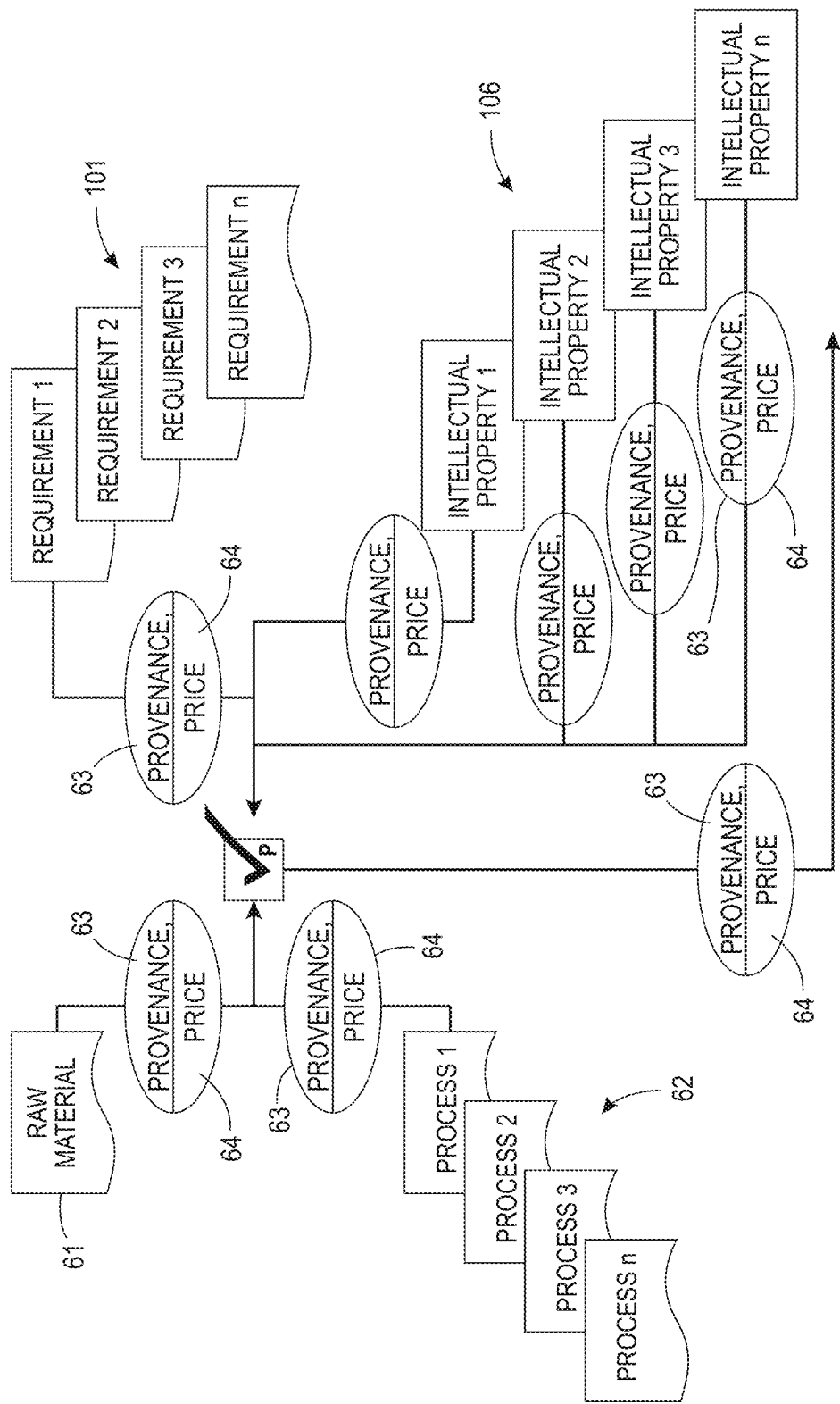
FIG. 32 is an exemplary diagram illustrating an embodiment of price transparency within a supply chain suitable for practicing exemplary embodiments of this disclosure.

Remuneration or price 64 can also be tracked and verified between each supplier 35, sub-tier supplier 36, and end item customer 29 through entries in a blockchain or ledger. Remuneration or price 64 associated with a given process, requirement, or intellectual property can also be tracked. Referring to FIG. 32, shown is an exemplary diagram wherein both price and provenance for product information associated with a given part/product can be tracked. Remuneration or the price 64 for a process, material, intellectual property, or customer requirement used to produce a given part/product can be entered into a blockchain or ledger, which can then later be verified by a supplier 35 with a supply chain or an end item customer 29. The remuneration or price information can be used to aggregate price and negotiated profits between entities in a transparent open fashion thereby allowing entities within a supply chain to pre-negotiate price for a given part/product thus increasing the speed and ease at which these transactions can take place. In addition, since remuneration for particular intellectual property will be tracked 107, owners, licensors or licensees 33 of that intellectual property can be properly compensated for those uses.

Figure 33:
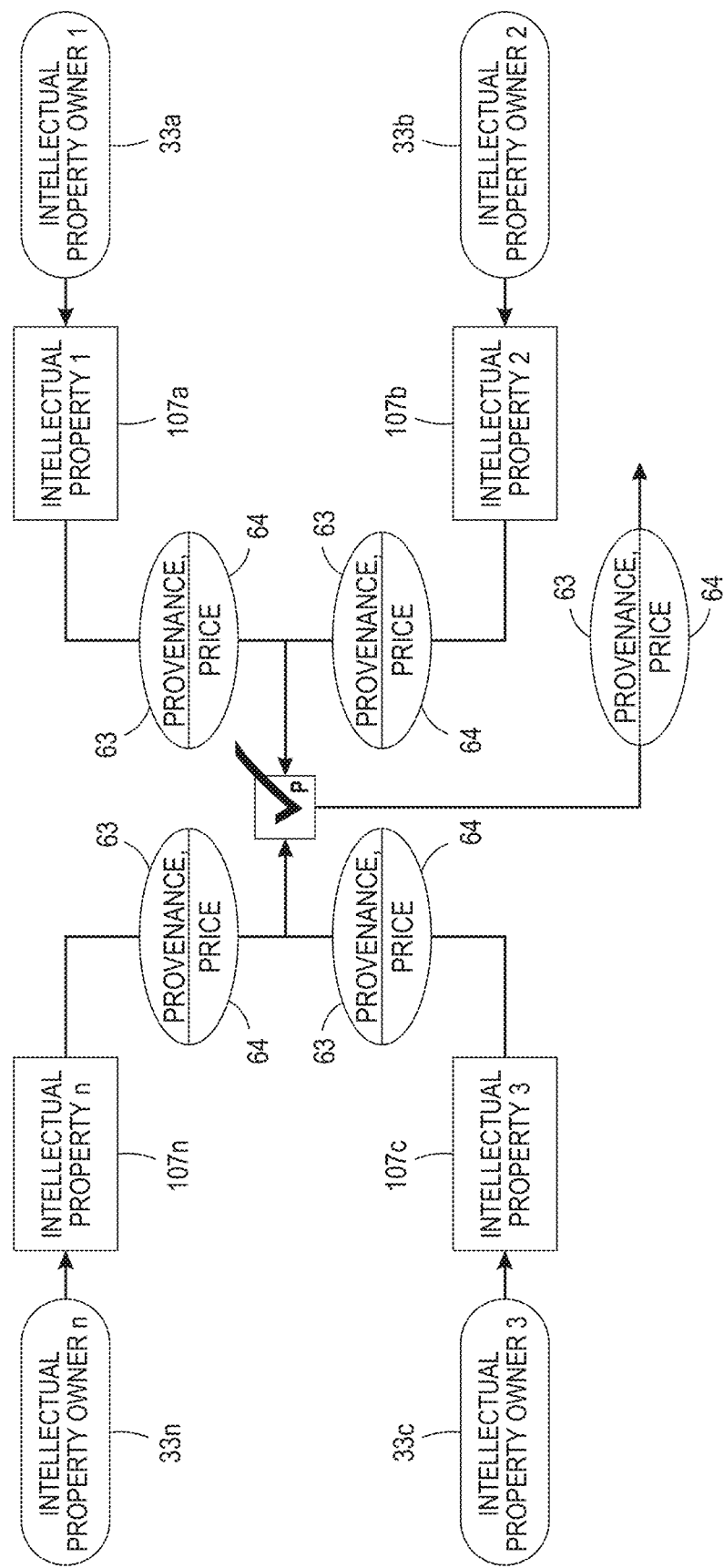
FIG. 33 is an exemplary diagram illustrating an embodiment of intellectual property tracking suitable for practicing exemplary embodiments of this disclosure.

Referring to FIG. 33, shown is exemplary diagram wherein the owner 33a-33n of intellectual property, the intellectual property itself 107, and price 64 associated with the intellectual property are tracked and verified within a blockchain or ledger. The intellectual property and its ownership provide a supplier, sub-tier supplier and/or end item customer with the ability to not only verify (through a blockchain or ledger) the provenance 63 of the intellectual property associated with a part/product, but also the ability to aggregate intellectual property elements from different owners found in a single part/product. Embodiments also allow owners of intellectual property to be properly compensated for their contributed intellectual property since each part/product will provide the intellectual property associated with it within its blockchain or ledger entry.

It should be appreciated that embodiments of the present disclosure are applicable to any number of supplier and sub-tier supplier levels. For example, a given part/product may have 1, 2, 3, or more suppliers and/or sub-tier suppliers. Embodiments of the present disclosure provide that a supplier, sub-tier supplier, and/or end item customer will be able to track and verify the provenance 63 of each part or element whether provided to the end user by a direct supplier or through the direct supplier from a sub-tier supplier. This includes not only the provenance of a specific part or element, but also documentation or information associated with the part or element. For example, the processes used to produce a part, the raw material that is used to form a part, the requirements that the part will need to meet, and any intellectual property (e.g., patents, trade secrets, inventions, know-how, etc.) embodied in the part or element can be tracked and verified by the supplier and/or the end item customer depending on their access to the information.

Referring to FIG. 1, shown is a schematic diagram of an embodiment of the disclosed virtual distributed inventory management system with traceability for a manufactured part. In FIG. 1, a workflow for a given part/product is traced from the first manufacturer transformation 23a, which may produce a work in progress (WIP) 24a, to the second manufacturer transformation 23b, which may produce WIP 24b, to the final n number manufacturer transformation 23n. In the embodiment described above, transformation 23n comprises 3D printing of the part 132 by 3D printer 31. In the embodiment described above, the transformations resulting in printed part 132 is followed by encoding and the final inspection 59 of the product and then by the final delivery 60 of the product 135. It should be noted that after each transformation, an entry into the blockchain or ledger is created thereby recording information (e.g., requirements, custody, processes, intellectual property, etc.) from each of the transformations. This information is then available for verification for any one of the suppliers (provided they are allowed access) and to the end item customer 29. Thus, embodiments cause the required processing along the manufacturing transformation to be followed with authorized and certified participants as part of a predefined process flow.

In practice, one embodiment of the present disclosure provides that a supplier 35, sub-tier supplier 36 or end item customer 29 may desire to verify the product information for a given part/product. For instance, the supplier 35, sub-tier supplier 36 or end item customer 29 may want to verify that the given part/product was made using the correct process 62, with the correct raw materials 61 or with the correct intellectual property 106. The supplier 35, sub-tier supplier 36 or end item customer 29 would be able to after receiving the part/product or prior to receiving the part/product can determine from the entries in the associated distributed transaction register (e.g., blockchain or ledger) the product information of the given part/product. The supplier 35, sub-tier supplier 36 or end item customer 29 would then be able to aggregate the product information to meet their individual needs to determine, for example, whether they have correctly priced the part/product, whether they have properly used the intellectual property, or whether they have properly remunerated the correct entities.

Additional features include an ability for a user of the disclosed system to grant aggregation rights, for specific manufactured parts aggregated in the above flight control system example, to an airframe manufacturer. The airframe manufacturer may then grant aggregated traceability rights to all manufactured parts in the airframe to an airframe operator.

The infrastructure of the disclosed method may further be used to aggregate costs and negotiated profits in a transparent way to allow for pre-negotiated prices for manufactured parts to speed transactions. Transactions can be logged and cleared in the distributed ledger, as is described above in further detail. Intellectual property elements from different owners may also be aggregated into a single ledger entry, such that respective intellectual property assets may be tracked together, and individual owners compensated according to agreed-upon terms.

Integration with Business Management Software.

Product manufacturers will often utilize business management software such as enterprise resource planning (ERP software) to collect, store, manage and interpret data associated with tracking supply chains such as product planning, manufacturing, delivery, marketing, sales, inventory management, shipping, payment, and the like. ERP software may provide functionality such as the generation of heat maps. For example, a manufacturer's ERP software may be configured to track a plurality of suppliers of raw materials, and may generate a heat map illustrating which suppliers are exceeding deadlines (such suppliers may appear on a screen colored in green), which suppliers are generally meeting deadlines (and thus may be colored in yellow), and which suppliers are not meeting deadlines (and thus may be colored in red).

While such capabilities serve to allow a manufacturer to observe supply chain trends from a high level, it is nonetheless difficult for a manufacturer to make real-time business decisions regarding suppliers without having access to a finer level of data. For example, ERP systems are often not interfaced with other operations processes. As a result, multiple layers of non-value added processes are included in many supply chains, such as shipping and inventory maintenance. The disclosed method of secure and traceable manufactured parts reduces such inefficiencies by disassociating the supply chain through the use of the distributed ledger as described herein.

The method of secure and traceable manufactured parts further provides for an application program interface (API) that can access data from existing ERP software in addition to the distributed ledger described above, and provide integrated real-time snapshots of supplier performance. Accordingly, users now have access to supplier data with a level of granularity down to an individual manufactured part.

In yet another embodiment, provided is a system to track intellectual property (IP) within a product lifecycle management (PLM) system or other applicable computer system such that a user or company can manage the IP that is associated with or embodied within the parts, assemblies, products, materials, processes, features, and/or services it manufactures, produces, provides or which it has purchased. Embodiments provide that a given part or product can have one or more discrete objects or product information associated with it. These objects or product information include the IP embodied within the product. Embodiments provide that the IP objects 105-107 associated with a given part or product can be saved or categorized within a system, ledger, blockchain, distributed transaction register, or database such that the IP associated with the given part or product can be maintained for later use.

Embodiments further allow users, companies, or customers of the system to manage and reuse IP including but not limited to layout-designs, trademarks, licenses, trade secrets, industrial property, patents, copyrights, proprietary information, sensitive information, and know-how. Embodiments also provide that a PLM or similar system can be searched for IP content such that appropriate security and markings can be applied to the parts/products if needed. Embodiments of the present disclosure provide an improved ability to capture, classify, track, preserve, and protect IP that is derived for or embodied within a given part or product including research and development, third party licenses, and failure analysis. Other embodiments of IP also include mechanical, electrical, firmware, software, processes, and materials associated with a given part/product. Some of the other elements that can be associated with a given part/product also include a heritage or history of the source of IP embodied within a part/product, where the IP is used, and what the IP is used with. Embodiments also provide that the IP objects of a given part/product can be encoded or hashed with an encryption. In yet another embodiment, IP objects of a given part/product can be made available in a private or public marketplace (e.g., digital marketplace) for use in other products. Embodiments of encryption methods include a public or private key, or it can include a distributed ledger such as a blockchain.

Figure 34:
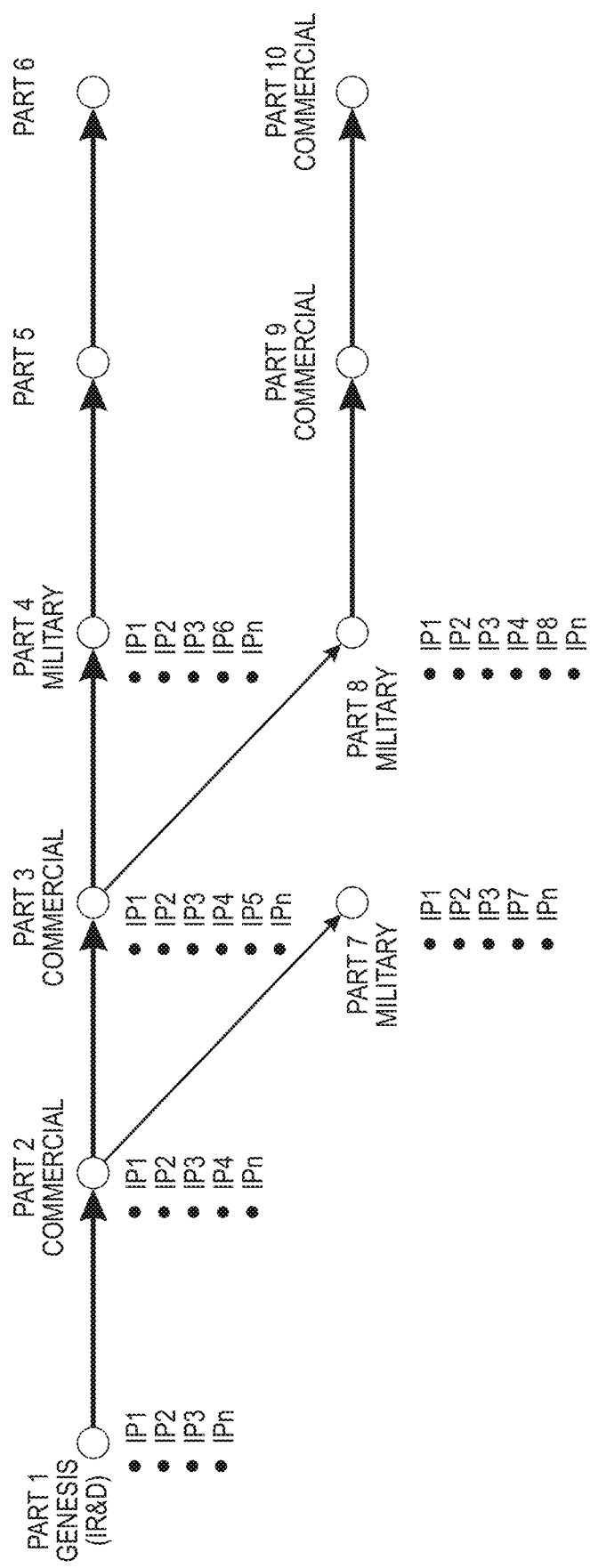
FIG. 34 is an exemplary diagram illustrating intellectual property embodied in the production of a product suitable for practicing exemplary embodiments of this disclosure.

FIG. 34 is an exemplary diagram illustrating IP objects IP 1-IP n that are associated with a given part or product through its production cycle. As shown in FIG. 34, a product that passes through multiple parts or stages as part of a production or manufacturing process, such as Part 1, Part 2, Part 3, and Part 4, can have multiple IP objects associated with it at each stage. In practice, this often occurs when an end item includes numerous parts from numerous sources or must go through a number of manufacturing processes before it is finalized or ready for an end user. In this and other similar scenarios, it is often difficult to track all of the IP embodied in the end item. Embodiments of the present disclosure allow a supplier or manufacturer to record in a database or ledger the IP embodied in a part or product throughout its production lifecycle or during its useful life such that the IP embodied in the part/product can be tracked and verified. In other words, the history or heritage of IP associated or embodied within a given part/product can be tracked and available for a supplier within the given part's supply chain or by an end user.

Embodiments provide that the IP embodied within a given part/product can be recorded within a blockchain or ledger, however, embodiments provide that the IP can be managed or maintained within an electronic database that can be accessed by any number of users. Embodiments of the electronic database include closed or private databases used by a single user or single company. In other embodiments, the electronic database can be accessible by a plurality of users and/or companies. In yet another embodiment, the electronic database can be a public marketplace wherein owners, creators, and inventors of the IP along with the users of the IP embodied in parts/products can access information regarding where certain IP is used, how often the IP is used, and to whom should remuneration be made for the right to use such IP.

In one embodiment, an end item can contain one or more IP objects along with other engineering, quality or customer specifications or requirements. The IP objects embodied in the end item are thus operable to be included in the other end item specifications that follow the end item during its use and lifecycle. The end item can have a restriction and designation for the specific IP objects based on all of the IP objects that it contains. The IP objects can be aggregated, tracked, reused, and sold.

Application to Space-Based Commerce and Logistics

Space exploration and colonization may require a digital logistics tail to facilitate data transfer through outer space. In the future, items of manufacture will be bought and sold as digital build files that customers may utilize and convert into physical items of manufacture. As it is inefficient to transport a robust logistics package on a spacecraft from Earth to a distant planet or space station, space flight and space colonies may utilize tools machinery to convert digital items or payloads into physical items of manufacture by utilizing 3D or 4D printers (4D including 3D printed parts and self-assembly).

Figure 36:
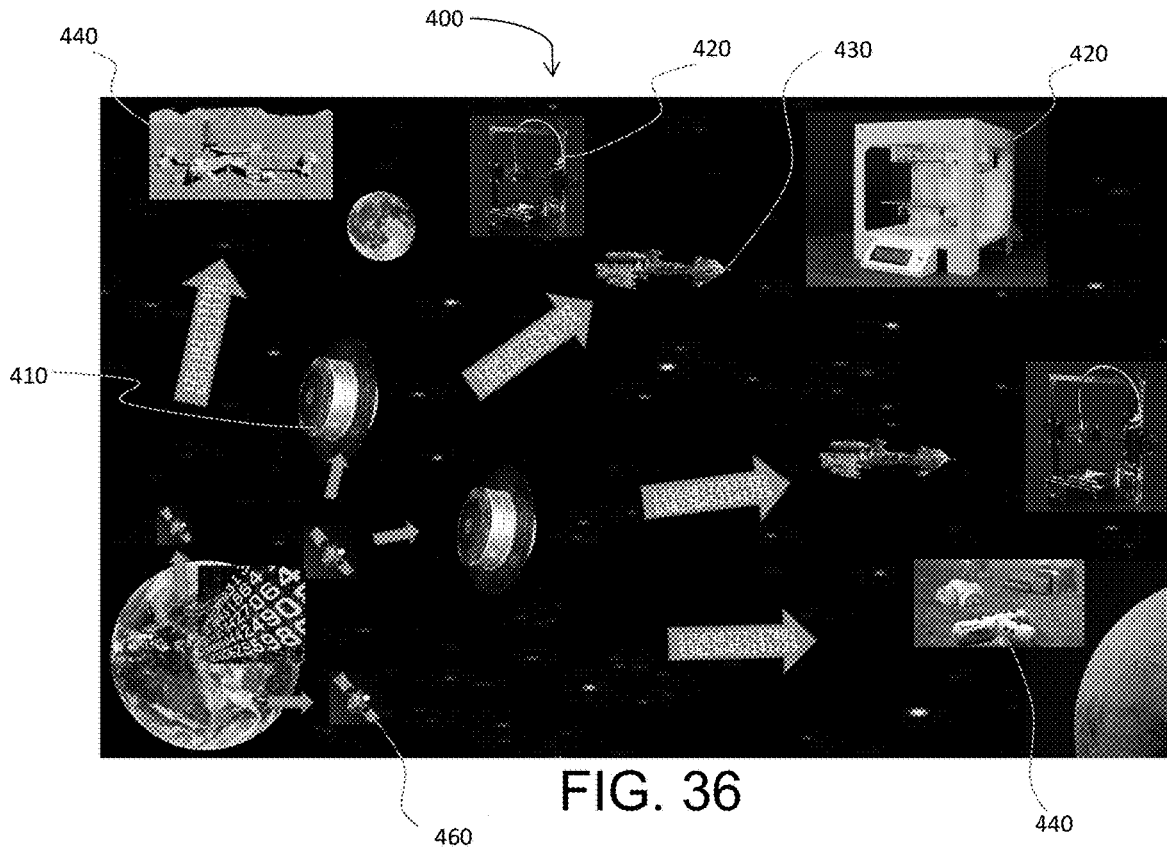
FIG. 36 is an illustration of the embodiment shown in FIG. 35 for a virtual distributed inventory management system with traceability and authentication for manufactured parts in outer space.

Referring to FIGS. 35 and 36, five examples of logistics scenarios 400 are illustrated and include:

1. Space colony or space station orbiting Earth or at some other quasi-stable location in space including Earth-Moon Lagrangian points 410;

2. Space factory orbiting Earth 420;

3. Spacecraft in transit between Earth and an orbital or stationary space colony 430;

4. Space colony or space factory on the Moon or other planetary body 440; and

5. Direct printing of structures, including large, very-large, and mega-structures, in outer space (e.g., asteroid mining); smaller components may be printed and then assembled (e.g., like Legos®) with robots either by self-assembly or automated-assembly 450.

In order for space-based entities (e.g., space colony, space factory, space shuttle, spacecraft, space station, and any other entity suitable for the intended purpose and understood by one of ordinary skill in the art) to communicate with Earth (e.g., the system 15), communication systems may be utilized to facilitate transmission of digital data to and from the space-based entities. For example, the system 15 may communicate with space-based entities by utilizing the deep space network (DSN), which may consist of antenna complexes (e.g., terrestrial transceivers) at three locations around the world, forming the ground segment of the communication system for the space-based entities. These facilities, approximately 120 longitude degrees apart on Earth, provide continuous coverage and tracking for the space-based entities. Each complex includes one 70-meter antenna and a number of 34-meter antennas. These antennas may be used individually or in combination (antenna arraying) to meet each space-based entity's communication requirements. Deep space communication systems may include radios, antennas, transmitters, signal detectors, modulation techniques, channel coding theory, data compression, simulation, optical instruments, optics systems design, optical detectors, lasers, fine-pointing systems, and any other communication suitable for the intended purpose and understood by one of ordinary skill in the art.

The system 15 may communicate directly with the space-based entities or utilize relays 460 (e.g., communication satellites, extraterrestrial transceivers, and other space-based entities with antenna arrays that may relay a signal) to communicate with the space-based entities. The communication satellites may have at least one type of orbit including: 1) geostationary satellites having geostationary orbit (GEO), 2) medium Earth orbit (MEO), and 3) low Earth orbit (LEO). These examples of types of orbit of communication satellites are not restricted to Earth. The present disclosure envisions communication satellites that may orbit other planetary bodies in outer space, including planets, asteroids, and any other mass suitable for the intended purpose and understood by one of ordinary skill in the art.

Figure 37:
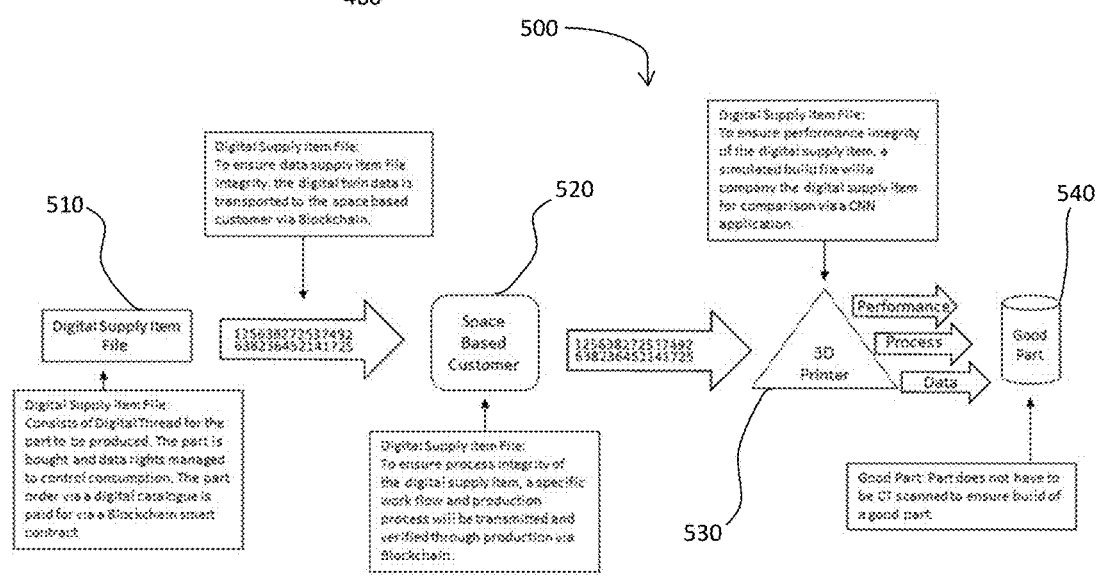
FIG. 37 is a schematic diagram of an embodiment for supplying digital data and information for manufacturing of products utilizing the virtual distributed inventory management system shown in FIG. 35 in outer space.

Referring to FIG. 37, system 500 may be used such that a space-based entity may be supplied and resupplied with digital data and information 510 for manufacturing of products 540 with 3D printer 530. Each scenario may provide a digital logistics supply catalogue or digital supply item file 510 to the space-based entity or space-based customer 520. The digital supply item file 510 may include a digital thread for a corresponding part to be manufactured or printed. The digital supply item file 510 from the digital logistics supply catalogue may be purchased by the space-based customer 520 to manufacture the corresponding part. The digital supply item file 510 from the logistics supply catalogue may be purchased by a blockchain smart contract or any other payment method suitable for the intended purpose and understood by one of ordinary skill in the art.

To ensure the integrity of the digital supply item file 510, the digital supply item file 510 may include a digital twin data that is transported to the space-based entity by utilizing blockchain or a digital ledger as described above with regards to system 15. Blockchain may be accompanied with or built upon through one or more side blockchains. These side blockchains can each originate or emanate from a given block or entry within a blockchain and extend outwards such that the original blockchain contains many different end points. For example, a blockchain may contain five blockchains wherein (1) is an entry for the raw materials of a given part/product, (2) is an entry for the processing of the given part/product, (3) is the processing entity of the given part/product, (4) is a patent associated with the part/product, and (5) is the cost paid to the processing entity. A new blockchain could be added to blockchain 1 identifying the supplier of the raw materials, or a new blockchain could be added to blockchain 3 indicating a certification of the machinery performing the processing on the given part/product. Accordingly, embodiments provide that rather than simply adding blockchains to the end of the fifth blockchain, new blockchains can be added from any one of these five blockchains thereby providing information relevant to that specific blockchain.

In another example, a given part/product may be represented by a main blockchain having multiple blocks, wherein each block in the blockchain is associated with a piece of the given part/product from the digital logistics supply catalogue. Each piece may have been supplied from a different supplier and each piece may have its own associated product information, such as its different raw materials, different processes of manufacture, different intellectual property embodied therein, and different costs. In this regard, each block in the main blockchain can be associated with a piece of the given part/product and side blockchains can extend outward from the main blockchain representing that particular pieces product information.

Similar to FIG. 2, a blockchain transaction from a first user A to a second user B is recorded in the ledger 17 by first generating a hash 70. The first user A may be located on Earth and the second user B may be the space-based entity/customer 520, as shown in FIGS. 36 and 37. The first user A then signs the hash with the first user's private key 71. The first user's public key and the address of the second user B is attached 72. The public key and address of the second user B is obtained 73 and the transaction is recorded in the ledger 74.

Once the space-based customer 520 receives the digital supply item file 510, the integrity of the digital supply item file 510 may be processed. For example, a work flow and production process associated with the digital supply item file 510 may be transmitted and verified through the production process by utilizing the described blockchain technology.

The space-based customer 520 may provide data received in the digital supply item file 510 to a 3D printer 530 for manufacturing purposes. To ensure performance integrity of the digital supply item file 510, a simulated build file may accompany the digital supply item file 510 for comparison by utilizing a convolutional neural network (CNN) application, which is discussed further with reference to FIGS. 38-43. The 3D printer 530 may print the item of manufacture from the data provided in the digital supply item file 510.

The supply system 500 for the supplying of digital data and information for manufacturing of products may include multiple instances of quality control and process integrity including: 1) utilizing blockchain to ensure data quality and production process of the digital supply item file 510, 2) utilizing blockchain to ensure production process quality of the digital supply item file 510, and 3) utilizing convolutional neural network evaluation to ensure performance integrity by verifying each layer while printing the product of manufacture. This allows for at least three stages of verification to ensure that the part of manufacture is consistent with the original product from the digital supply item file 510. In this manner, the product of manufacture may not require a computed tomography (CT) scan to confirm that the product of manufacture complies with the digital supply item file 510.

Application with Convolutional Neural Network Evaluation

The additive manufacturing 57 and post-processing 58 of parts may include convolutional neural network (CNN) evaluation, embodiments of which are shown in FIGS. 38-43. Thus, the additive manufacturing system for building a part, such as part 132 or part 514, layer-by-layer in an additive manufacturing machine, such as printer 31 or printer 530, may be according to an additive manufacturing build process that includes a closed-loop control structure for adjusting an initial set of build parameters in-process. As used herein, the term "in-process" refers to a time period during which the part is in the process of being built in the additive manufacturing machine. The term "in-process" is distinguished from the term "post-process," which is used herein to refer to a time period after the part has been built in the additive manufacturing machine.

As described below, the closed loop control structure includes a slow control loop having a trained artificial intelligence module, and may further include a fast control loop having a state machine. As used herein, "slow control loop" means a control loop having a controller gain update period on the order of whole seconds, and "fast control loop" means a control loop having a controller gain update period on the order of microseconds. The trained artificial intelligence module may be a deep learning module having a recurrent artificial neural network.

As described below, the system may include a melt-pool monitoring system arranged to acquire real-time melt pool data representative of a melt pool formed by the energy source in-process, and a build layer image sensor arranged to acquire layer images of the part layers in-process. An initial set of build parameters, a time-based sequence of adjusted build parameters corresponding to the build process, the layer images, and the melt pool data are transmitted as inputs to the trained artificial intelligence module of the slow control loop. The melt pool data may be transmitted as an input to the state machine of the fast control loop.

The trained artificial intelligence module may be trained using evaluation data from a first CNN configured to evaluate layer images acquired in-process, and at least one second CNN configured to evaluate images of finished parts acquired post-process. For example, a CNN may be configured to evaluate two-dimensional images of sectioned finished parts acquired post-process, and another CNN may be configured to evaluate three-dimensional images of parts acquired post-process by computer tomography (CT) scanning of a finished part.

Figure 38:
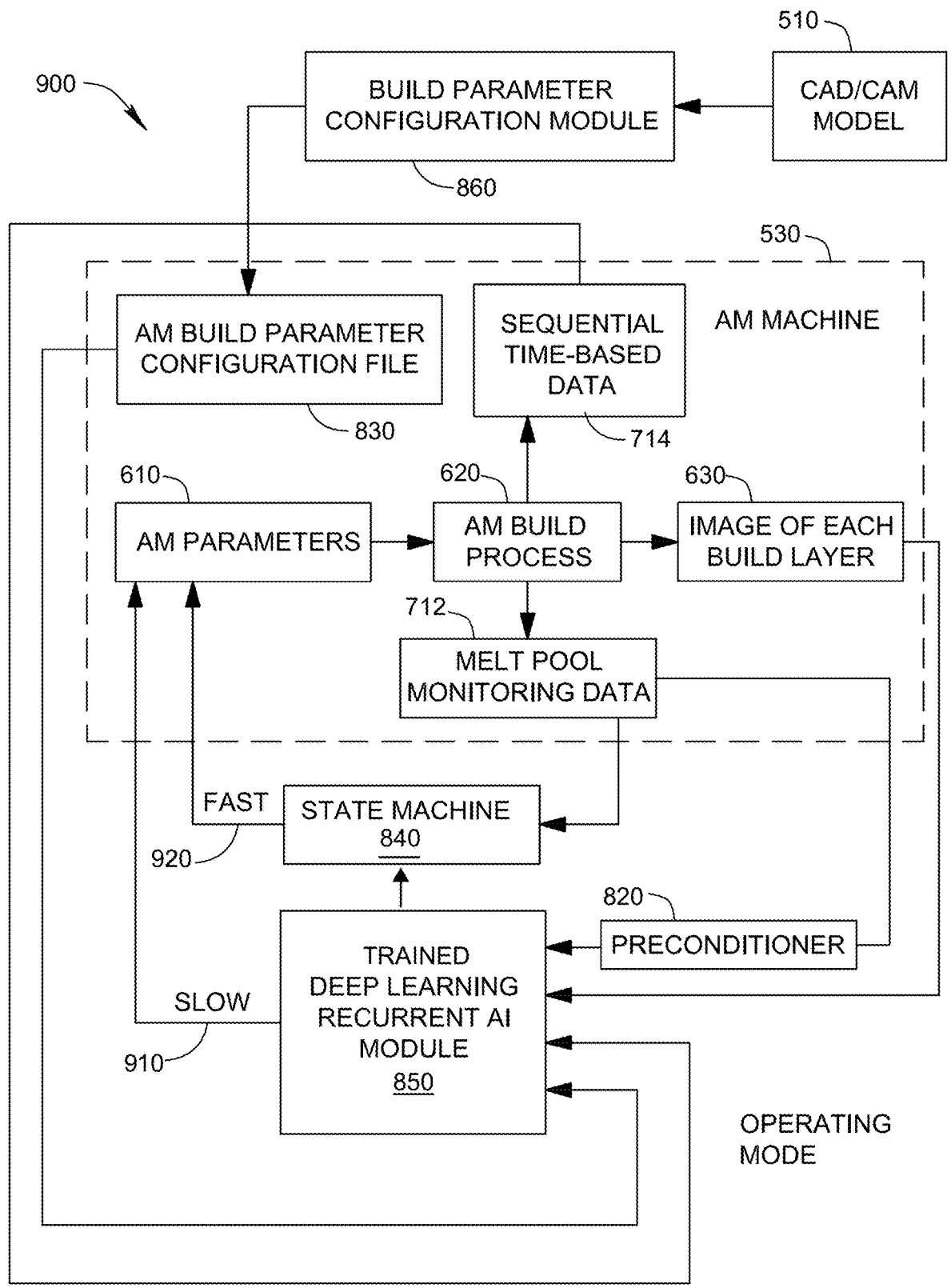
FIG. 38 is a schematic block diagram of an embodiment of a deep learning artificial intelligence additive manufacturing system for use in the distributed inventory management system with traceability and authentication for manufactured parts in outer space shown in FIG. 35.

Referring now to FIG. 38, operation of a deep learning process controller 900 for additive manufacture machine 530 is illustrated. The system comprises a closed-loop control structure 910, 920 for adjusting the initial set of build parameters 830 in-process. The deep learning process controller 900 may be a hybrid of an advanced non-linear stochastic control and a complex adaptive model-based control as may be implemented by the trained deep learning recurrent artificial intelligence (AI) module 850. The deep learning recurrent AI 850 trained from the deep learning AI system 800 is thereby utilized to close an outer loop of a slow layer-to-layer evaluation of the build layer images 630 during the building of the additive manufacturing part, such as part 132 or part 540, for an enhanced slow process feedback control 910. The trained deep learning recurrent AI 850 may also utilize an output to update a configuration of the state machine 840 to influence a separate state-variable fast control 920 based on the fast in-process melt-pool monitoring sensor data 712. As may be seen in FIG. 38, slow loop feedback 910 from trained deep learning AI module 850 and fast loop feedback 920 from state machine 840 may be used to calculate adjusted additive manufacturing build parameters in block 610 for operating additive manufacturing machine 530 in a manner which improves part quality. Both of the feedback loops of the slow process feedback control 910 and the state-variable fast control 920 act to modify the additive manufacturing machine build parameters 610 with separate gains to provide each feedback loop with a different control authority over the additive manufacturing production (e.g., welding) process 620 for optimum control of the additive manufacturing build process. Thus, in this embodiment the closed loop control structure includes a slow control loop 910 having a trained AI module in the form of trained deep learning recurrent AI module 850, and a fast control loop 920 having a state machine 840.

In slow control loop 910, the initial additive manufacturing build parameters 830 generated by build parameter configuration module 860 are inputted to trained deep learning recurrent AI module 850. Other inputs to trained AI module 850 may include sequential time-based data 714 representing additive manufacturing process variables and parameters over time (e.g. argon flow, temperature, sound/vibration transducer levels, voltage, current, etc.), build layer images 630 acquired in-process by build layer image sensor 2038, and melt pool data 712 acquired in-process by melt pool monitoring system 2035.

Regarding data 714, the additive manufacture machine 31 or 530 may include sequential time-based slow process data 714 that may be stored in a sequential time-based parameter database 715. The sequential time-based slow process data 714 (e.g., argon flow, temperature, sound/vibration transducer levels, voltage, current, etc.) generated by the additive manufacture machine 31 or 530 may be collected while each build layer is being fabricated. The melt pool data 712 may be preconditioned by a preconditioner 820 before input to deep learning recurrent AI module 850. For example, preconditioner 820 may be programmed to accumulate and average melt pool data 712 over each build layer or a set of build layers. The preconditioning may be adjustable to have a shorter or longer frame rate.

In fast control loop 920, melt pool data 712 may be inputted to state machine 840 along with output from trained deep learning AI module 850. A state machine output from trained deep learning AI module 850 may be used as part of the fast control loop 920, which may be configured as a separate state-variable inner control loop on the fast process control gain update. For example, a state machine output from a long short-term memory (LSTM), as described below, may be inputted to state machine 840 and used to facilitate fast-loop closure of the melt pool control.

Figure 41:
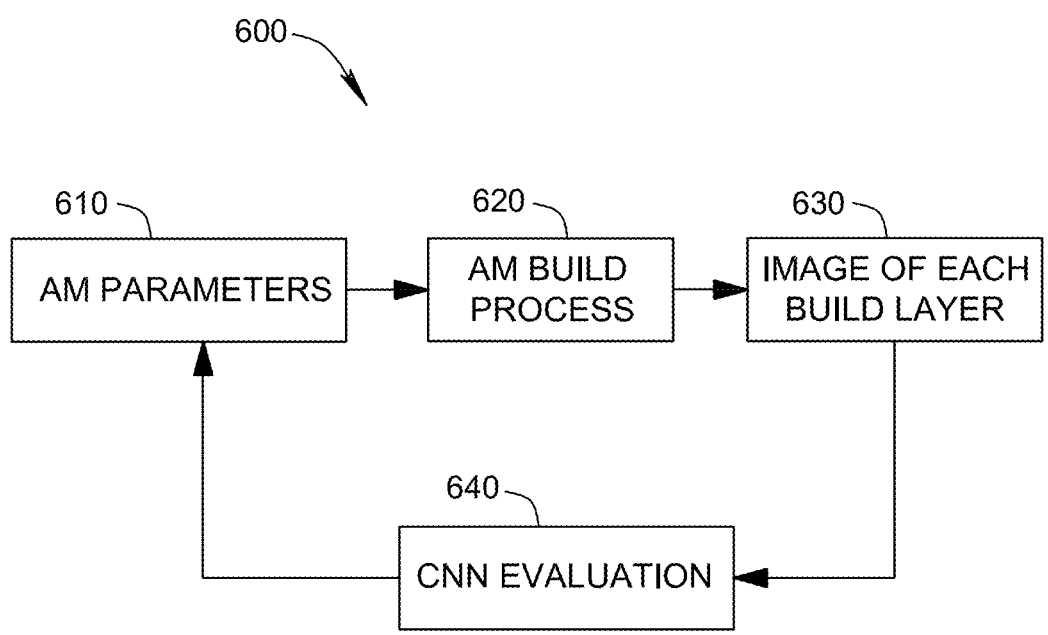
FIG. 41 is a flowchart of a basic closed loop additive manufacturing control system wherein layers are evaluated by a convolutional neural network to provide feedback.

In a basic embodiment shown in FIG. 41, the closed loop control 600 structure comprises a trained artificial intelligence (AI) module in the form of a CNN 640 trained and configured to evaluate layer images 630 of part 540 acquired in-process by build layer image sensor 2038. The evaluation result provided by CNN 640, which may indicate a degree to which each captured layer image 630 corresponds to an expected or desired appearance of the layer, is used in block 610 to calculate adjusted build parameters of additive manufacturing machine 530 in-process to influence building of subsequent layers as the build process continues in block 620. The evaluation result may be in the form of an assigned classification of each build layer image 630 into a predetermined category (e.g. very good, good, fair, bad, etc.)

Slow process feedback control 600 may utilize a convolutional neural network (CNN) evaluation 640 to close a control loop between build layer images 630 and additive manufacturing machine build parameters 610. As each layer of the additive manufacturing part, such as part 132 or part 540, is built, imaging may occur at the start, during, or end of a period of time, or continuously by video over the period of time for layer fabrication. As the additive manufacturing part fabrication progresses, the build layer images 630 may be collected over the entire course of the additive manufacturing part fabrication process. The CNN evaluation 640 may be previously trained to recognize features within the build layer images 630 that are either off-nominal or undesirable. To correct these off-nominal or undesirable conditions, the CNN evaluation 640 facilitates a slow process feedback to adjust the additive manufacturing machine build parameters 610 that control the additive manufacturing production process 620. The additive manufacturing machine build parameters 610 may influence the specific energy density deposited into a powder layer during the additive manufacturing process such as, but not limited to, beam power, scan speed, scan spacing, beam focus, and beam duty cycle.

In this context, the slow process feedback control 600 may allow controller gains of the additive manufacturing machine build parameters 610 to update within seconds, between layer builds. If video imaging is used, the trained CNN evaluation 640 may update the controller gains in the order of milliseconds or within a fraction of the period of time required to fabricate a layer. The slow process feedback control 600 may rely upon previously-modeled relationships and uncertainties between the additive manufacturing machine build parameters 610 and the build layer images 630. This may affect the controller gains by utilizing an Advanced Process Control (APC) method such as, but not limited to, multivariable non-linear Model Predictive Control (MPC) and recursive Bayesian-based control schemes.

The data from the databases and processes of FIGS. 35-44, for example and without limitation the CNN evaluation 640, the image of each build layer 630, the build layer image database 711, the 2D images of finished parts 723, the 2D CNN evaluation 722, the 3D CAT scan images of finished parts 733, the 3D CNN evaluation 732, the AM build parameter configuration file 830, the AM parameters 610, the melt pool monitoring data 712, and/or the melt pool database 713, may be included and/or utilized by the blockchain or the digital ledger as described above with regards to system 15. Thus, as with the states described above, the CNN evaluation, including without limitation images and data collected as part of the process, may be recorded as a transaction in the digital ledger 17 in a manner similar to that described above. Provenance, authenticity and traceability are thus maintained in serial production and are available for use in a later state.

Figure 39:
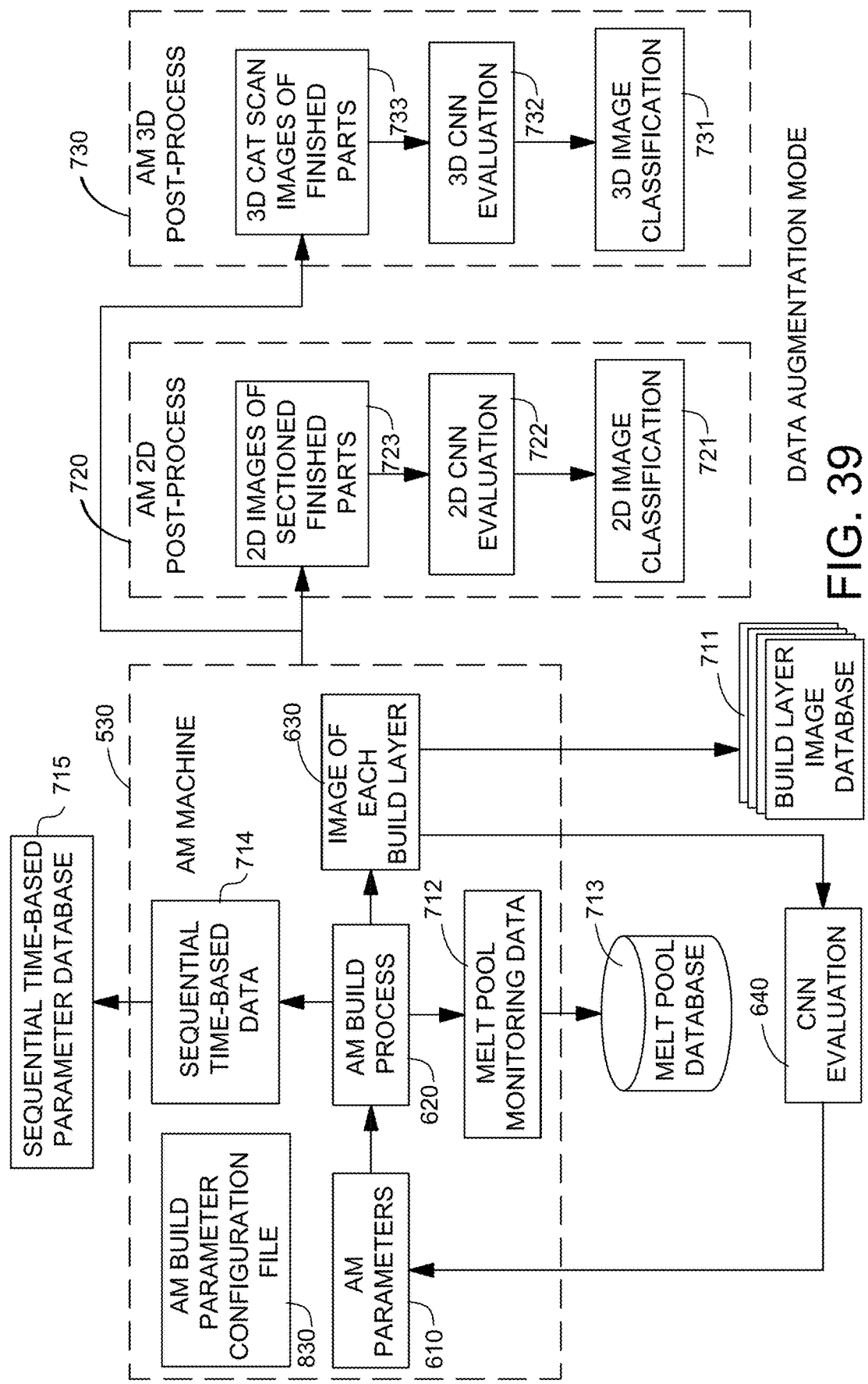
FIG. 39 is a block diagram disclosing an augmented data collection architecture and the slow process feedback control with data augmentation along with an additive manufacture 2D post-process and an additive manufacture 3D post-process, wherein post-process image data of finished parts is collected in correspondence with data collected in-process by the additive manufacturing machine.

Referring to FIG. 39, the CNN for the slow process feedback control may be an augmented system 700 that further includes post-process output data. For example, several different streams of data may be collected into databases that may be used as inputs to train and update a deep learning recurrent AI. The images of each build layer 630 produced during the slow build process feedback control 600 of an additive manufacture machine 530 may be collected into a database 711. The augmented system 700 may also include a fast in-process melt-pool monitoring sensor data 712 that may be collected into a large binary database 713.

The augmented system 700 may further include an additive manufacture 2D post-process 720. The additive manufacture 2D post-process 720 may include a classification output 721 (e.g., undermelt/just-right/overmelt) of a post-process 2D CNN evaluation 722 for part-quality classification. During development of an additive manufacturing process, an image of the classification output 721 at the appropriate depth may be directly related to an associated image of the additive manufacturing layer acquired in-process 723, which may provide a correlation between the in-process build layer image 630 and the post-process CNN classification output 721.

The augmented system 700 may further include an additive manufacture 3D post-process 730. The additive manufacture 3D post-process 730 may include a classification output of porosity and/or voids of a post-process 3D CNN evaluation 732 of computer-aided tomography (CAT) scans 733 for part-quality. The post-process 3D CNN evaluation 732, at a specific depth, may be directly correlated to an associated in-process build layer image 630, which may occur during both process development and production.

Thus, teacher data for training deep learning AI module 850 may be collected by operating additive manufacturing machine 530 to build parts in the data augmentation mode represented by FIG. 39. As may be understood, in particular basic CNN 640 tasked with evaluating in-process build-layer images 630 may be augmented by one or more further CNNs 722 and 732 configured to evaluate images of finished parts acquired post-process as indicated by blocks 720 and 730, respectively. The actual images 630 may also be collected in a build layer image database 711.

In block 720, parts 540 built by additive manufacturing machine 530 are sectioned post-process, for example by cutting the part and polishing an exposed sectional surface at a known layer depth, and then capturing a two-dimensional (2D) image 723 of the exposed surface using an imaging camera. The 2D images 723 captured post-process may then be evaluated and classified by CNN 722. For example, possible classifications 721 may include under-melt, just right, and over-melt. The post-process 2D image at a given layer depth may be directly related to the associated image 630 of the layer acquired in-process.

In block 730, parts 540 built by additive manufacturing machine 530 are scanned post-process, for example using computer-aided tomography (CAT) equipment, to capture a three-dimensional (3D) image 733 of the entire part. The 3D images 733 captured post-process may then be evaluated and classified by CNN 732. For example, the classification 731 may indicate a degree of porosity of the finished part and/or an extent to which voids are present in the finished part.

As mentioned above, in-process build layer images 630 may be collected in build layer image database 711. Other in-process data may also be collected for use in training deep learning AI module 850. For example, the fast process melt pool data 712 acquired in-process by melt pool monitoring system 2035 may be stored in a binary database 713, and the sequential time-based data 714 generated by additive manufacturing machine 530 while a layer is being fabricated may be stored in a sequential time-based parameter database 715.

Figure 40:
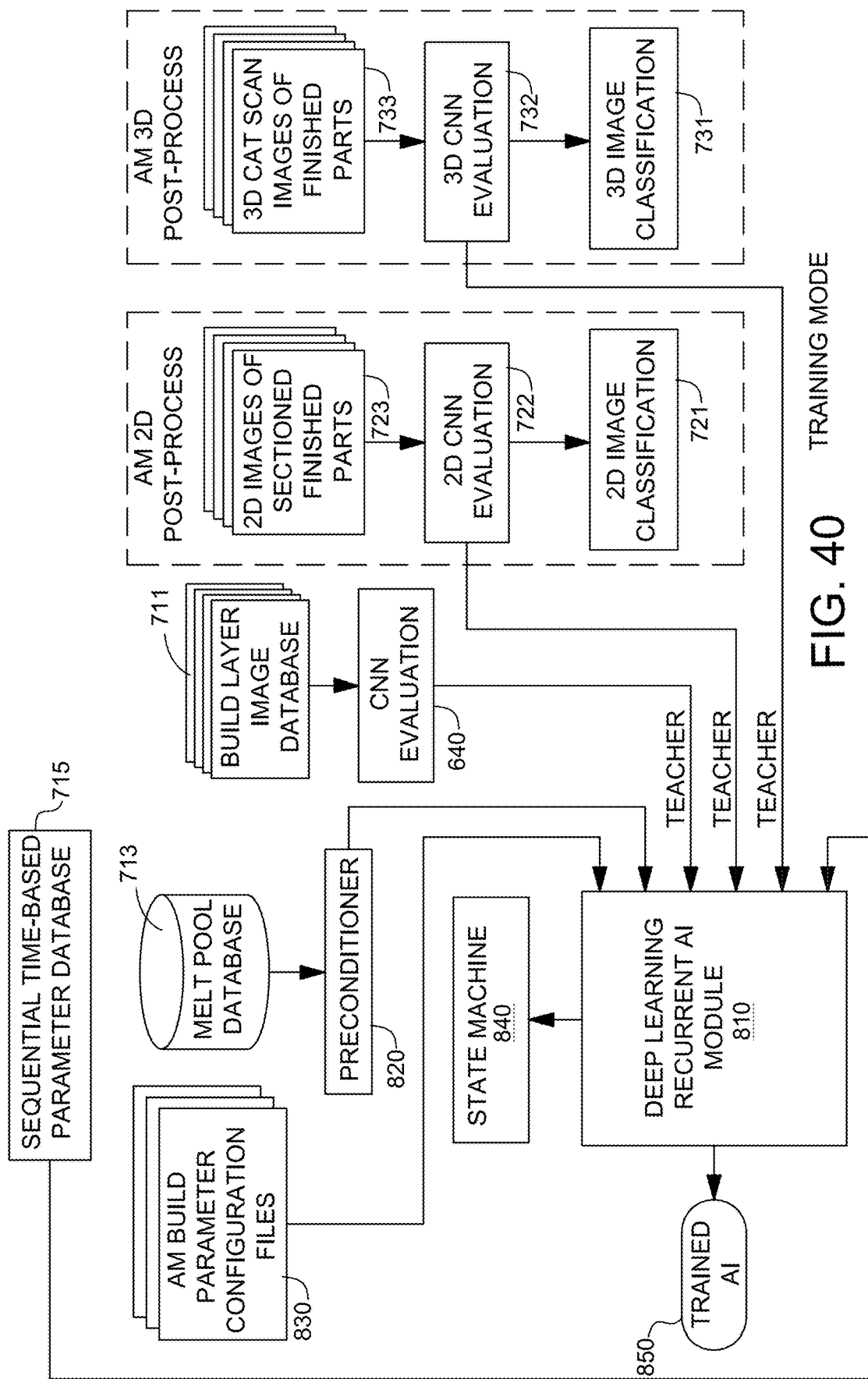
FIG. 40 is a flowchart disclosing an embodiment of a training configuration for the deep learning artificial intelligence additive manufacturing system.

Referring to FIG. 40, a configuration to train a deep learning AI system 800 is illustrated, which may utilize data from the augmented system 700 that may be collected as inputs to train and/or update 810 a deep learning recurrent AI 850.

For example, an output of the CNN evaluation 640 of the build layer image database 711 may act as a teacher input to the training 810 of the deep learning recurrent AI 850. An output of the 2D CNN evaluation 722 of the additive manufacture 2D post-process 723 may be utilized for part-quality classification and act as another teacher input to the training 810 of the deep learning recurrent AI 850. An output of the 3D CNN evaluation 732 of the additive manufacture 3D post-process 730, which may include CAT scans, may be utilized for part-quality assessment and act as yet another teacher input to the training 810 of the deep learning recurrent AI 850.

The fast process melt-pool monitoring sensor database 713 may be preconditioned 820 (e.g., accumulated, averaged, variance, covariance, etc.) over each build layer or build layer section before being utilized as an input to the training 810 of the trained deep learning recurrent AI 850. The preconditioning 820 may be adjustable for shorter or longer frame rates as necessary to synchronize with a control loop update period. The sequential time-based parameter database 715 may also be utilized as an input to the training 810 of the deep learning recurrent AI 850 for training, retraining, and/or updating purposes. To provide an additional additive manufacturing part 132 design parameter information (e.g., geometry, position, etc.), an additive manufacture build parameter configuration file 830 (e.g., Magics) from a part design database may also be utilized as an input to the training 810 of the deep learning recurrent AI 850.

The database inputs to the training 810 of the deep learning recurrent AI 850 may be synchronized correctly to perform effective the training 810 of the deep learning recurrent AI 850. The availability of the database inputs to the training 810 of the deep learning recurrent AI 850 may also effect the effectiveness of the training 810 of the deep learning recurrent AI 850. The deep learning AI system 800 may also include a state machine 840 output from the deep learning recurrent AI 850 that may be configured during the training 810 that may be used to facilitate a fast-loop closure of a melt-pool control process.

Thus, as shown in FIG. 40, the data collected as described in connection with FIG. 39 may be used as inputs to train deep learning AI module 850. The output of CNN 640 characterizing build layer images 630 may act as one teacher input provided to deep learning AI module 850 in a training mode of operation. Similarly, outputs from CNN 722 and CNN 732 respectively characterizing post-process images 722 and 732 may act as further teacher inputs provided to deep learning AI module 850 during the training mode of operation. Fast process melt pool data 712 may be preconditioned by preconditioner 820 and inputted to deep learning AI module 850 during the training mode of operation. Sequential time-based data 714 stored in sequential time-based parameter database 715 may also be provided as an input to deep learning AI module 850 during the training mode of operation. The initial additive manufacturing build parameters 830 may be provided as a further input to deep learning AI module 850 during the training mode of operation.

The various inputs to deep learning AI module 810 should be synchronized correctly to perform the training, and enough data must be available to make the training effective. An output from an LSTM component of deep learning AI module 810 may be provided to state machine 840 during the training mode of operation to later facilitate fast-loop closure of the melt pool control when the additive manufacturing system is operated in a regular production mode. The input to state machine 840 provides a record that may allow the input to the state machine control scheme states (FIG. 44) to be evaluated against control simulations to help evaluate the effect from the trained RNN 850 on the fast control loop 920.

Training AI module 850 using in-process and post-process information as described above will enable reliable determination of whether or not an additive manufacturing part and corresponding additive manufacturing process are good from several perspectives associated with good manufacturing practice. The entire set of data for the part build will be captured for the production record. First, the integrity of additive manufacturing configuration data files used to manufacture a part (i.e. "data integrity") may be demonstrated and certified. Second, the integrity of the additive manufacturing process used to build the part (i.e. "process integrity") may be demonstrated and certified. Third, it may be demonstrated and certified that the process performance generates good parts having high density, minimal or no porosity, and good internal grain structure (i.e. "performance integrity"). By way of analogy, the mentioned process certification for additive manufacturing parts may be similar to the Design Quality (DQ), Installation Quality (IQ), Operational Quality (OQ), and Performance Quality (PQ) metrics for providing verification and validation evidence that a medical device is functioning correctly to specification. IQ, OQ and PQ are analogous to data, process and manufacturing integrity, respectively. In this case, installation of the correct additive manufacturing build file is the IQ. Real-time verification that process integrity (OQ) is correct, and near real-time verification that manufacturing integrity (PQ) will come from the in-process and post-process components of the machine learning AI. The measure of goodness would be used by the machine learning AI module 810 to decide what level of goodness we actually have (through the learned recurrent memory of the non-linear relationship between the in-process measurements and the post-process measurements), and to then make automatic corrections to the process in real time such that goodness (indirectly estimated through non-linear correlation) will be maximized. DQ is equivalent to the additive manufacturing design rule checks associated with a design/build file, which may integrate ICME (Integrated Computational Materials Engineering) for metals or some other physics-based design protocols.

Trained deep learning AI module 850 may have a recurrent neural network (RNN) component combined with one or more CNNs to form a committee of neural networks. The RNN component may be implemented, for example, as LSTM to overcome problems such as the "vanishing or exploding gradient problem," or a Gated Recurrent Unit (GRU), which will allow the use of a large stack of recurrent networks that add process states and long-term memory capabilities to learn the complex, noisy and non-linear relationship between the fast in-process update data and the slow process output data Utilizing all of this data to train 810 the deep learning recurrent AI 850 may assist in predicting the appropriate additive manufacturing machine build parameters 610 that may be needed to control printing quality parts during manufacture. The trained deep learning AI module 850 may be used to close the slow layer-to-layer evaluation of part quality for enhanced slow process feedback control. AI module 850 may be configured as a computer or network of computers running AI intelligence software. For example, the software may be programmed in Python™ programming language supported by the Python Software Foundation using, as examples and without limitation TensorFlow, Theano or CNTK to implement the artificial neural network (ANN) AI.

Figure 42:
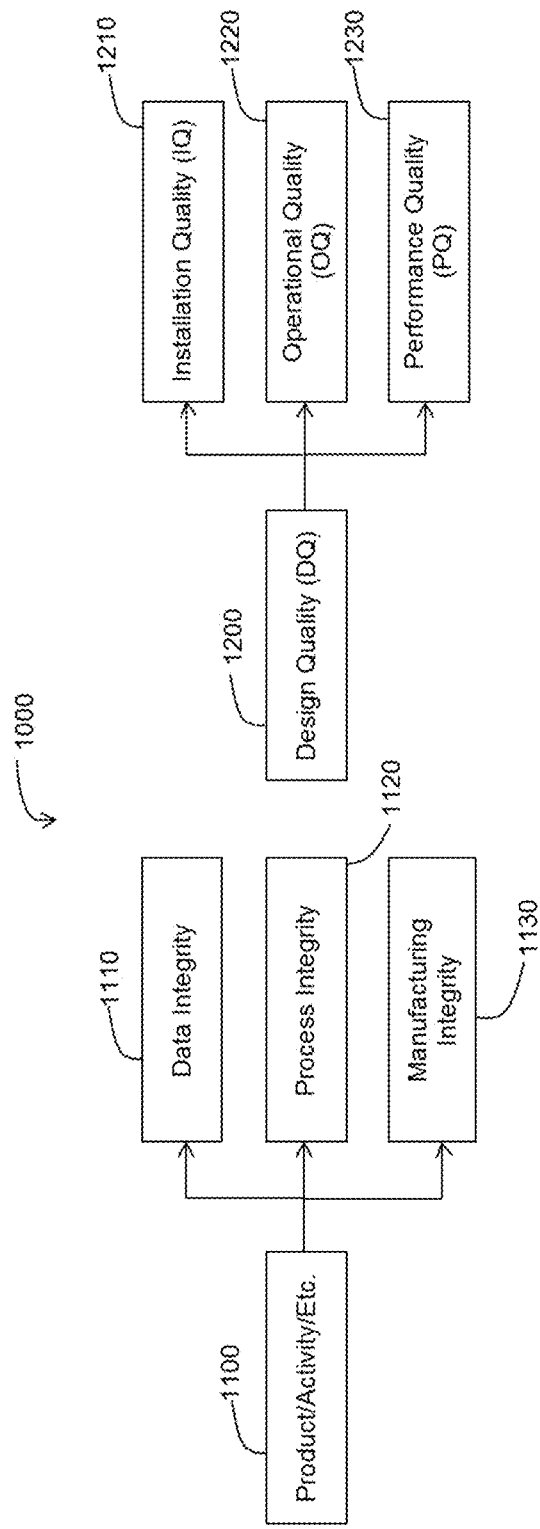
FIG. 42 is a flow chart of an embodiment of an additive manufacture machine learning process for process and design quality verification.

Referring to FIG. 42, an additive manufacture machine learning process 1000 (in-process and post-process) verification record may include key components for determining whether a part of manufacture is adequate for an intended purpose and acceptable under the requirements of the manufactured part 132. The additive manufacture machine learning process 1000 may include both a product integrity 1100 certification and a design quality 1200 certification.

The product integrity 1100 may include data integrity 1110, process integrity 1120, and manufacturing integrity 1130. The data integrity 1110 may include a certification and/or demonstration that the data files used to manufacture the parts are the correct data files for the manufacture process. The process integrity 1120 may include a certification and/or demonstration that the process used to manufacture the parts was the correct process for the manufacture of the parts. The manufacturing integrity 1130 may include a certification and/or demonstration that the process output generates parts of manufacture with the features associated with the part of manufacture (e.g., high density, no porosity, good internal grain structure, etc.). These certifications may be included in the verification that the additive manufacturing requirements have been met 265 for generation of the process hash 266, 84*i* and also as a part of the part post inspection 59.

The design quality 1200 may include installation quality 1210, operational quality 1220, and performance quality 1230. The design quality 1200 may be included as part of the design implementation requirements 51. For example, the installation quality 1210, the operational quality 1220, and the performance quality 1230 may include metrics for providing verification and validation evidence that a device is functioning correctly according to a specification such as the customer requirements 101 and may be included as part of the certificate of compliance 138 and the inspection record 136.

The installation quality 1210, the operational quality 1220, and the performance quality 1230 may include data, process, and manufacturing integrities, respectively. For example, installation of a correct additive manufacture build file 52 may be the installation quality 1210. Verification in real-time that the process integrity 1120 may be correct and verification near real-time that the manufacturing integrity 1130 may be from the in-process and post-process components of machine learning AI (e.g., the trained deep learning recurrent AI 850) and may be included in the product manufacturing information 109.

The machine learning AI may determine a level of accuracy that may be currently satisfied (e.g., through the learned recurrent memory of a non-linear relationship between the in-process measurements and the post-process measurements). The machine learning AI may then proceed with automatic corrections to the process in real-time such that accuracy of manufacture may be maximized (e.g., indirectly estimated through non-linear correlation). The machine learning summary metrics may be encoded in the part inspection process hash 84*k*.

The design quality 1200 may include additive manufacture design rule check (DRC) design/build files, which may integrate integrated computational materials engineering (ICME) for metals or other physics-based design protocols. The output from the design quality 1200 process may also be an input to the machine learning AI to be utilize in further adjustments in the system.

Figure 43:
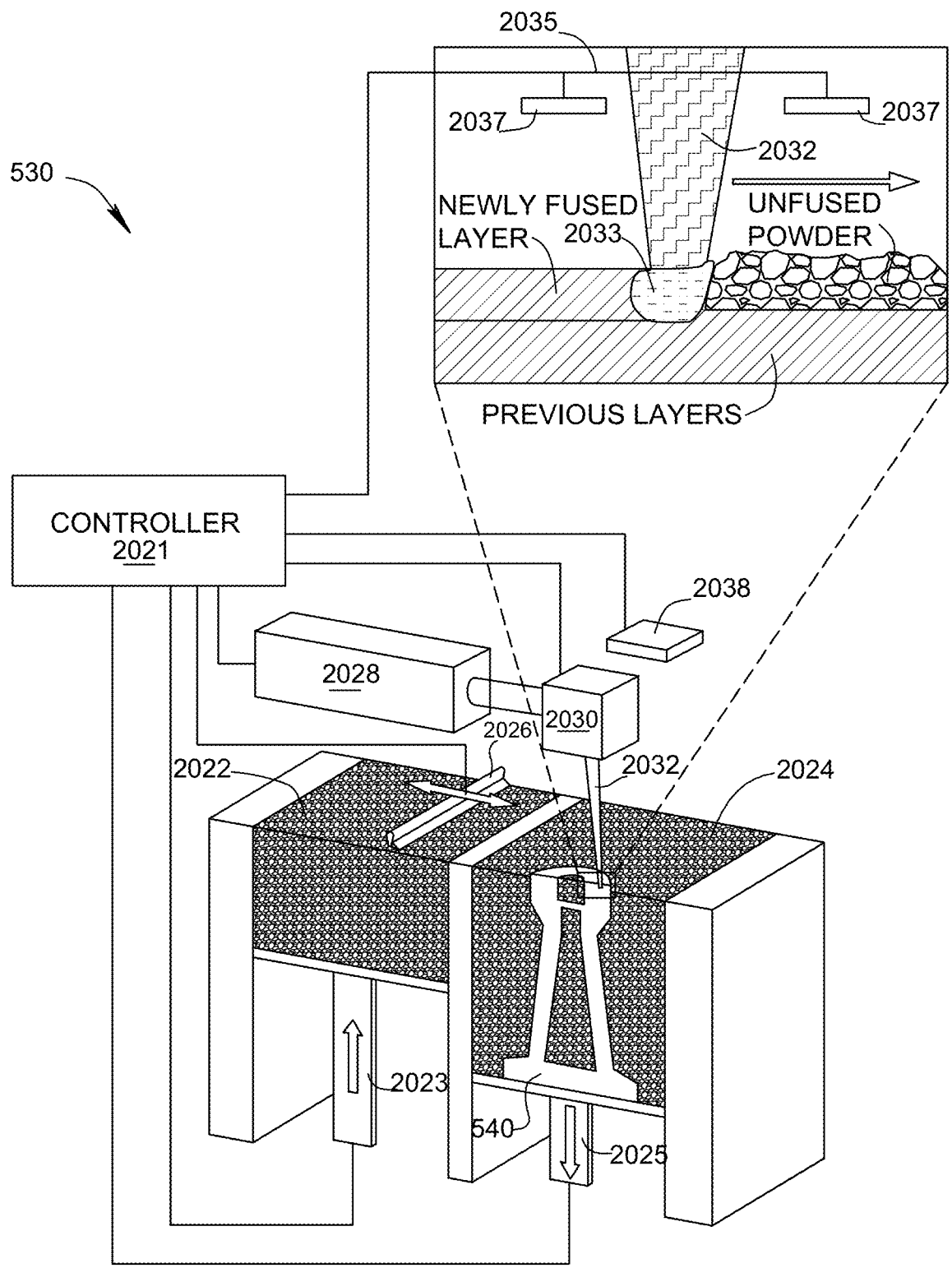
FIG. 43 is a schematic diagram of the additive manufacture machine shown in FIG. 38.

Additive manufacture machine 530, or alternatively machine 31, is shown in greater detail in FIG. 43. The additive manufacture machine 530 may be in the form of a laser powder bed machine of a type including a powder reservoir 2022, a powder bed 2024 in which a part 540 is built, and a powder scraper 2026 for transferring a new layer of powder from the powder reservoir 2022 into the powder bed 2024. The elevation of powder reservoir is adjusted by means of a powder delivery actuator 2023 and the elevation of the powder bed 2024 is adjusted by means of a fabrication actuator 2025. The additive manufacture machine 530 further includes an energy source 2028 in the form of a laser, and a scanner system 2030 for redirecting and scanning a beam 2032 from the energy source 2028 over each new layer of powder in the powder bed 2024 in a controlled manner to form part 540. As will be understood, the beam 2032 interacts with powder layer in the powder bed 2024 and forms a trailing melt pool 2033, which solidifies and fuses with part 540 to build the part. Additive manufacture machines of the type described above are available from Renishaw plc of the United Kingdom.

The additive manufacture machine 530 may be equipped with a melt-pool monitoring system 2035 having one or more melt pool sensors 2037 arranged to acquire real-time melt pool data representative of the melt pool 2033 in-process. The additive manufacture machine 530 is also equipped with a build layer image sensor 2038 arranged to acquire layer images of part layers in-process. Additionally, Spatial Frequency Modulated Imaging (SPIFI) could be utilized to glean information about the state of the melt pool 2033 directly through the beam 2032. The various components of the additive manufacture machine 530 are connected to a microprocessor-based controller 2021 configured to control the build process.

The additive manufacture system may include a build parameter configuration module 860 programmed to generate an initial set of build parameters for building part 540 in the additive manufacture machine 530. The initial set of build parameters may be stored as a build parameter configuration file 830 in memory accessible by processing and control electronics of the additive manufacture machine 530. The initial set of build parameters may be based at least in part on a geometric model of part 540 inputted to the build parameter configuration module 860. By way of non-limiting example, the geometric model may be provided as one or more digital CAD/CAM files describing part 540, such as digital supply files 510 or output files 125, and build parameter configuration module 860 may be a computer module programmed to read the CAD/CAM model information and generate laser control settings, scanner motion control commands, layer thickness settings, and other control parameters for operating the additive manufacture machine 530 to build part 540. Build parameter configuration module 860 may be part of the additive manufacture machine 530, or may be separate from the additive manufacture machine 530 and in communication therewith. An example of commercially available software for generating the additive manufacture build parameters from CAD/CAM files is MATERIALISE® Magics™ data preparation software available from Materialise N.V. of Belgium.

Figure 44:
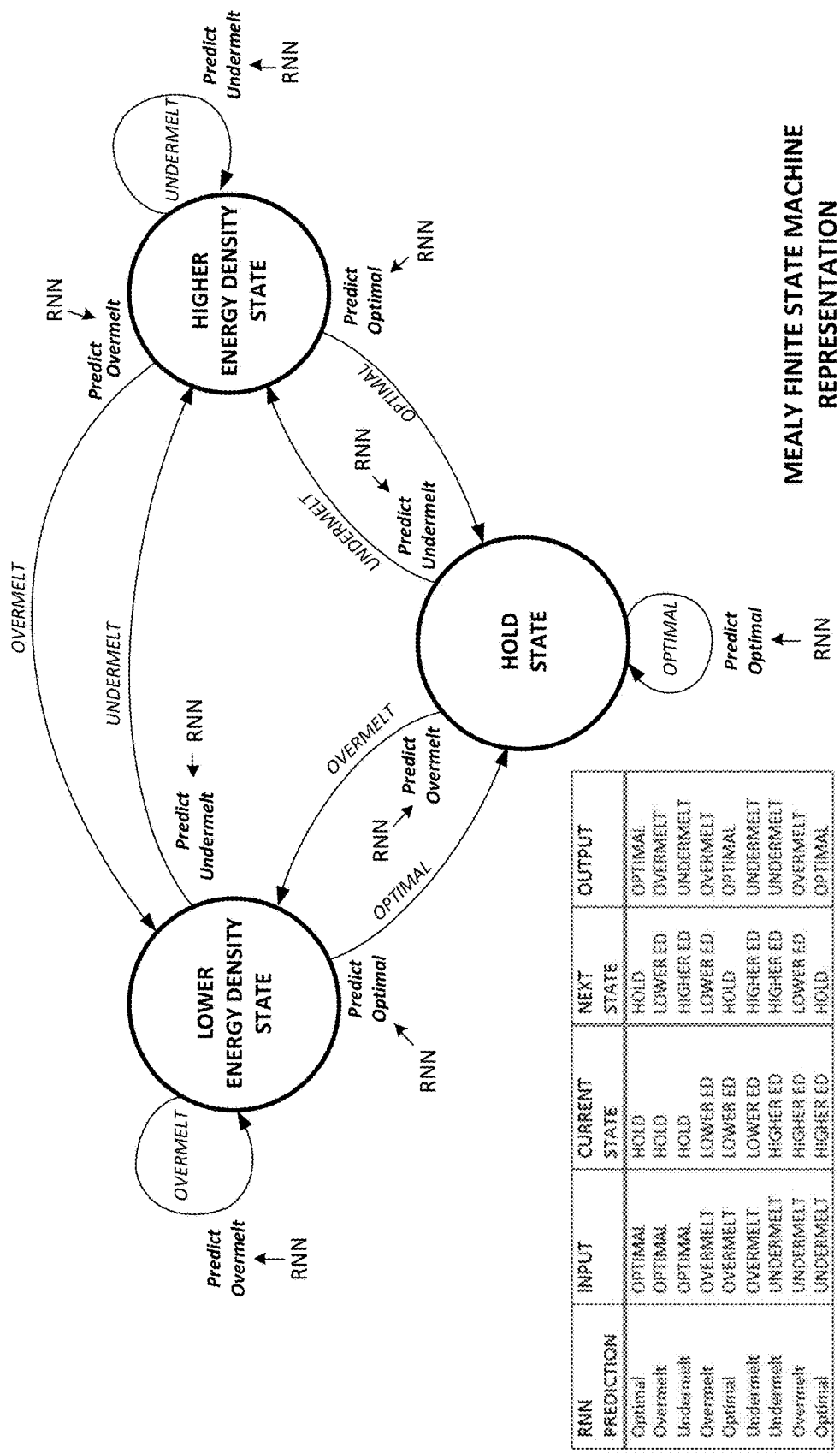
FIG. 44 is a state diagram of a simplified example that represents how a recurrent neural network (RNN) can interface to a Finite State Machine (FSM).

In FIG. 44, a simple example of state machine 840 is shown with three different states as represented by a Mealy FSM, where the outputs from each state depend on the current state and the inputs to the FSM. The three states are 'Hold' where the control scheme is maintained, 'Lower Energy Density' (Lower ED) where the control scheme favors lowering the specific energy density (ED) being input to the powder bed 2024 by beam 2032, and 'Higher Energy Density' (Higher ED) where the control scheme favors elevating the specific ED being input to the powder bed 2024 by beam 2032. Also in this example, the input to the FSM is an output from trained RNN 810 that predicts the condition of the melt pool 2033. The prediction is based on the FIG. 40 training imparted to RNN 810 by the FIG. 39 augmented data.

Each state in the FIG. 44 example represents a different or altered control scheme. These control schemes could be implemented as simple gain-controlled feedback loops or as complex stochastic optimal controllers. Those skilled in the art will recognize that this is merely a simplified example of how a state machine 840 for fast-loop 920 control could be interfaced with the output from a RNN 810, and that many other and more complex configurations are possible, including different control scheme states, as well as the way the control scheme states alter the many possible implementations of the underlying controllers.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

The present invention contemplates that many changes and modifications may be made. Therefore, while the presently-preferred form of the system has been shown and described, and several modifications and alternatives discussed, persons skilled in this art will readily appreciate that various additional changes and modifications may be made without departing from the scope of the invention, as defined and differentiated by the following claims.

What is claimed is:

1. A method for printing, verifying and authenticating additive manufactured products utilizing a plurality of computing devices, a plurality of additive printers, a distributed transaction register, and an extraterrestrial communication network comprising a plurality of terrestrial transceivers and a plurality of extraterrestrial transceivers, wherein the distributed transaction register comprises a blockchain, a plurality of nodes at different locations each with a copy of a ledger, the method comprising:

receiving, by a first computing device of the plurality of the computing devices, at least one customer requirement for a product;

developing, by said first computing device, from said at least one customer requirement, at least one manufacturing requirement for said product;

generating, by said first computing device, from said at least one manufacturing requirement, a product geometry file and at least one printer parameter;

recording, by said first computing device, a transaction based on said at least one manufacturing requirement to said distributed transaction register;

obtaining, by said first computing device, an output from said distributed transaction register in response to said recording said transaction on said distributed transaction register;

recording, by said first computing device, to said distributed transaction register, a first transaction based on said product geometry file;

in response to said recording said first transaction, obtaining, by said first computing device, a first output from said distributed transaction register, wherein said first output is associated with said first transaction and includes a first blockchain address;

transmitting, by said first computing device to a second computing device of the plurality of the computing devices, said first output over the extraterrestrial communication network, wherein said transmitting said first output over the extraterrestrial communication network further comprises sending said first output via a terrestrial transceiver of the plurality of the terrestrial transceivers;

receiving, by said second computing device, said first output via an extraterrestrial transceiver of the plurality of the extraterrestrial transceivers, wherein the second computing device is located in the outer space;

in response to said receiving said first output, generating, by said second computing device, a unique product code based on said first output;

receiving, by a 3D additive printer of the plurality of the additive printers, said product geometry file and said unique code, wherein the 3D additive printer is located in the outer space and is connected to said second computing device;

printing, by said 3D additive printer, a product using said product geometry file;

embedding, by said 3D additive printer, said unique product code to said product;

receiving, by said second computing device, an indication that said product has been printed by said 3D additive printer;

recording, by said second computing device, to said distributed transaction register, a second transaction based on said printing of said product and said first output;

in response to recording to said distributed transaction register, obtaining a second output from said distributed transaction register, wherein said second output is associated with said second transaction and includes a second blockchain address;

verifying, by said second computing device and using said unique code, said output, said first output, and said second output that said product was printed according to said at least one manufacturing requirement; and authenticating, by said second computing device, said product based on the verifying.

2. The method set forth in claim 1, wherein said at least one customer requirement for said product is selected from a group consisting of quality parameters, material composition requirements, product definitions, manufacturing requirements, and an IP artifact, and wherein said at least one manufacturing requirement for said product is selected from a group consisting of product size, product weight, product strength, product geometry, a computer aided design (CAD) file, and an IP artifact.

3. The method set forth in claim 1, wherein said extraterrestrial transceiver is located on a space colony, a space station, a spacecraft, a planet, a moon or an asteroid.

4. The method set forth in claim 1, wherein said terrestrial transceiver and said extraterrestrial transceiver are communicatively connected via a deep space network.

5. The method set forth in claim 1, wherein said recoding said first transaction further comprises recording said first transaction to a first block of said blockchain, said recording said second transaction further comprises recording said second transaction to a second block of said blockchain, wherein said second block is linked to the first block.

6. The method set forth in claim 5, wherein said first transaction further comprises a first transaction datum and said second transaction further comprises a second transaction datum.

7. The method set forth in claim 6, wherein said first transaction datum comprises a cryptographic hash digest based on said product geometry file and said second transaction datum comprises a cryptographic hash digest based on said printing of said product.

8. The method set forth in claim 1, wherein said embedding said unique product code based on said first output comprises printing said product with said unique product code or etching said product with said unique product code.

9. The method set forth in claim 1, further comprising obtaining, by said first computing device, a transaction record that is associated with said first transaction and said second transaction from said distributed transaction register.

\* \* \* \* \*